United States Patent
Abramov et al.

(10) Patent No.: US 12,319,447 B2
(45) Date of Patent: Jun. 3, 2025

(54) DEPLOYABLE WING SYSTEM FOR AIR VEHICLE

(71) Applicant: ISRAEL AEROSPACE INDUSTRIES LTD., Lod (IL)

(72) Inventors: Danny Abramov, Lod (IL); Yoav Heichal, Lod (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 18/000,960

(22) PCT Filed: Jun. 24, 2021

(86) PCT No.: PCT/IL2021/050773
§ 371 (c)(1),
(2) Date: Dec. 7, 2022

(87) PCT Pub. No.: WO2022/003672
PCT Pub. Date: Jan. 6, 2022

(65) Prior Publication Data
US 2023/0211902 A1    Jul. 6, 2023

(30) Foreign Application Priority Data
Jun. 29, 2020  (IL) .......................................... 275738

(51) Int. Cl.
*B64U 30/12* (2023.01)
*B64U 70/70* (2023.01)
(52) U.S. Cl.
CPC ............. *B64U 30/12* (2023.01); *B64U 70/70* (2023.01)
(58) Field of Classification Search
CPC .......... B64U 30/12; B64U 70/70; B64U 3/56; B64U 70/20; B64C 3/40; B64C 37/00; B64C 5/12
See application file for complete search history.

(56) References Cited

U.S. PATENT DOCUMENTS 5,035,378 A * 7/1991 Spanovich ................ B64C 3/40
74/105
5,118,052 A * 6/1992 Alvarez Calderon . B64U 20/50
89/1.801
(Continued)

FOREIGN PATENT DOCUMENTS

CN    104071336 A    10/2014
CN    106741847 A    5/2017
(Continued)

OTHER PUBLICATIONS

International Search Report and Written Opinion from International Application No. PCT/IL2021/050773 mailed Oct. 13, 2021.

*Primary Examiner* — Medhat Badawi
*Assistant Examiner* — Vicente Rodriguez
(74) *Attorney, Agent, or Firm* — Dorsey & Whitney LLP

(57) ABSTRACT

A wing system is provided for an air vehicle, the air vehicle having a fuselage including a fuselage longitudinal axis. The wing system includes a set of wings, configured for transitioning between a stowed configuration and a deployed configuration. The set of wings includes a first said wing having a first wing tip, a first wing longitudinal axis, and a first pivot axis; and a second said wing having a second wing tip, a second wing longitudinal axis, and a second pivot axis. The first pivot axis and the second pivot axis are non-coaxial. In the stowed configuration, the first wing and the second wing are in overlying relationship such that at least a majority of a pressure surface of one wing is facing a suction surface of the other wing, and the first wing tip is spaced from the second wing tip by a first lateral spacing. In the deployed configuration, the first wing is oriented with respect to the second wing such that the first wing tip is spaced from the second wing tip by a second lateral spacing greater than the first lateral spacing. The transitioning includes a pivoting operation, including: pivoting the first (Continued)

wing about the first pivot axis between the stowed configuration and the deployed configuration; and, pivoting the second wing about the second pivot axis between the stowed configuration and the deployed configuration.

25 Claims, 25 Drawing Sheets

(56) References Cited

U.S. PATENT DOCUMENTS

| | | | |
|---|---|---|---|
| 7,185,847 B1* | 3/2007 | Bouchard | F42B 10/12 |
| | | | 244/3.28 |
| 2012/0138727 A1 | 6/2012 | Fisher | |
| 2012/0280080 A1 | 11/2012 | Lubenow et al. | |
| 2013/0126666 A1* | 5/2013 | Brown | B64C 39/04 |
| | | | 244/2 |
| 2016/0355250 A1 | 12/2016 | Barnes et al. | |
| 2017/0057635 A1* | 3/2017 | Strayer | B63G 3/04 |
| 2017/0197702 A1* | 7/2017 | Alley | B64U 50/13 |
| 2017/0369150 A1 | 12/2017 | Finklea et al. | |
| 2021/0171185 A1* | 6/2021 | Brwon | B64C 3/56 |

FOREIGN PATENT DOCUMENTS

| | | |
|---|---|---|
| CN | 107284651 A | 10/2017 |
| CN | 107745800 A | 3/2018 |
| CN | 108177783 A | 6/2018 |
| CN | 110217392 A | 9/2019 |
| CN | 107380402 B | 10/2020 |
| EP | 3560820 A1 | 10/2019 |
| KR | 101688951 B1 | 12/2016 |
| KR | 101901891 B1 | 9/2018 |
| WO | 2020022972 A3 | 2/2020 |

* cited by examiner

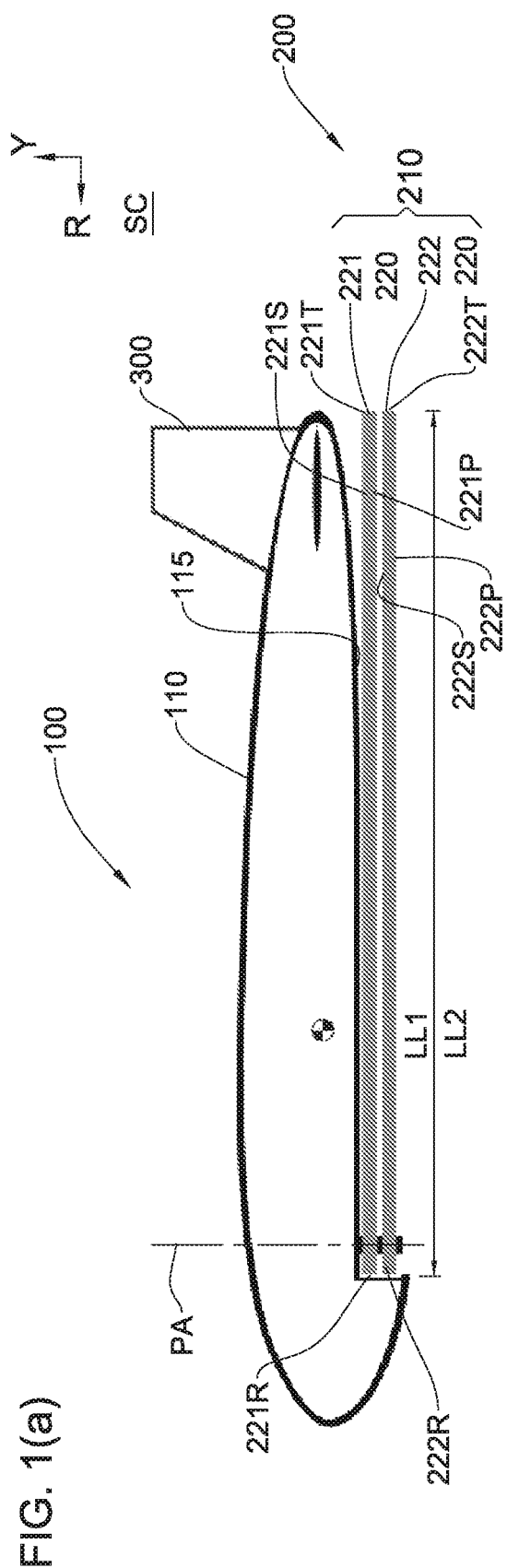
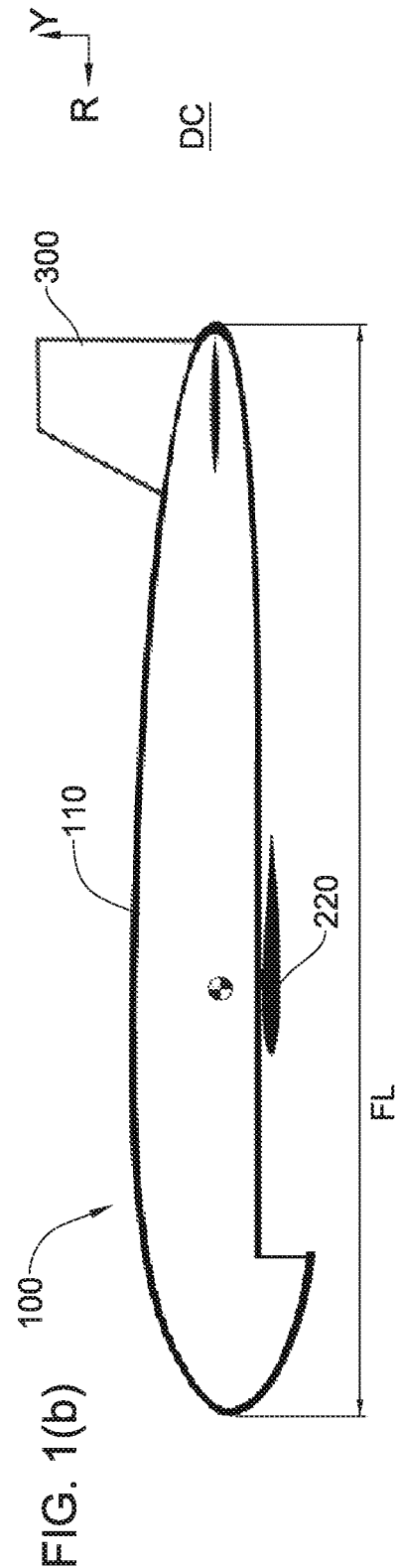
FIG. 1(a)
FIG. 1(b)

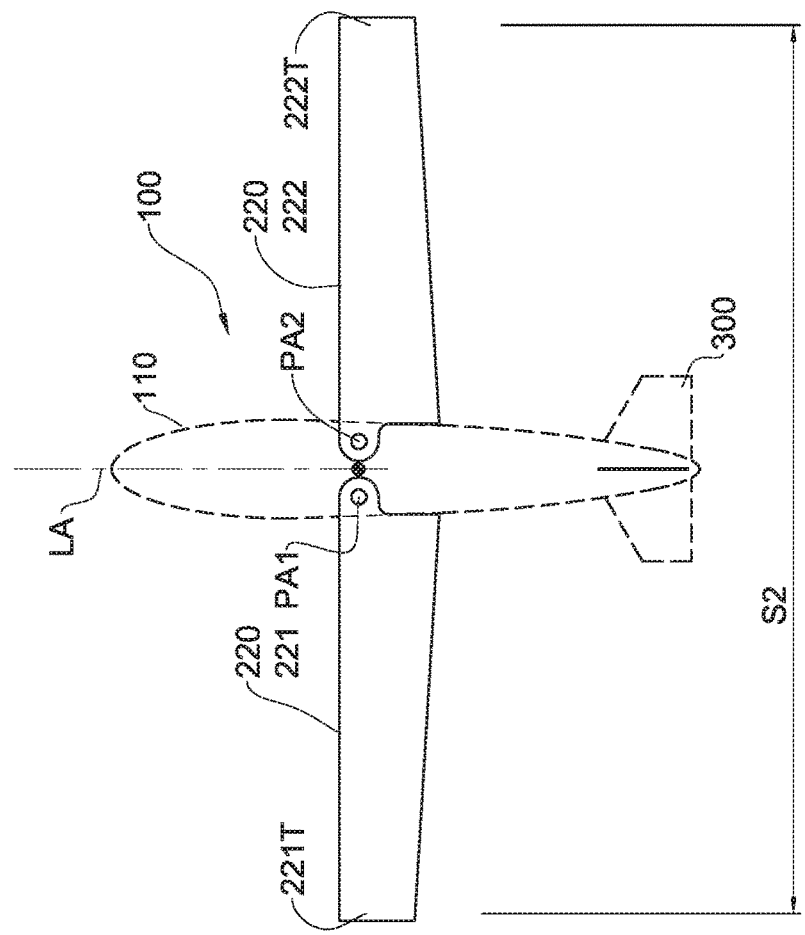
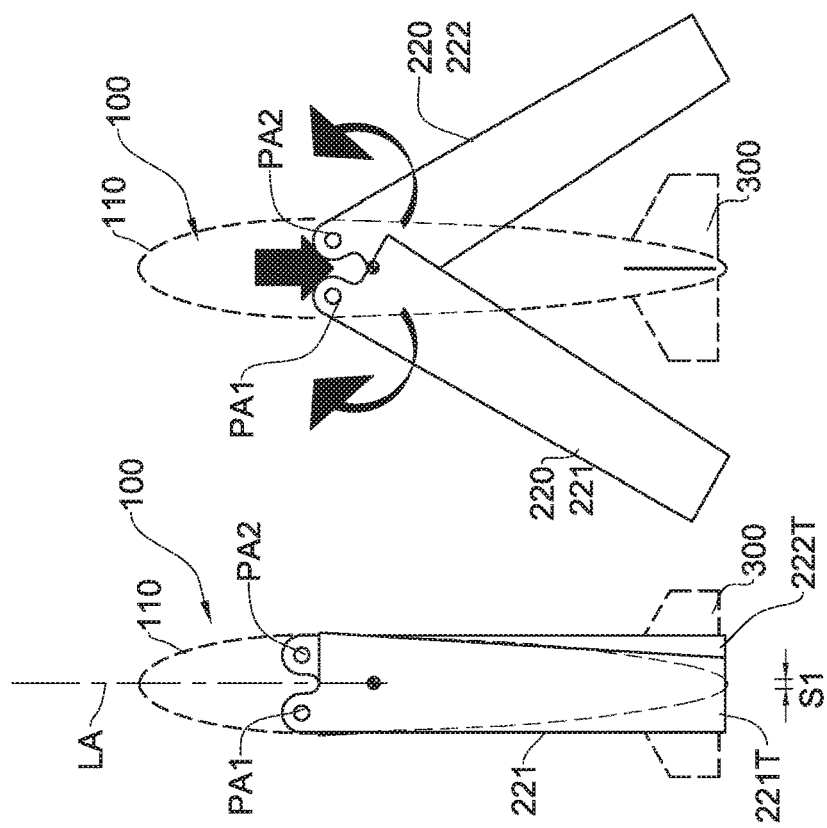
FIG. 2(a)  FIG. 2(b)  FIG. 2(c)

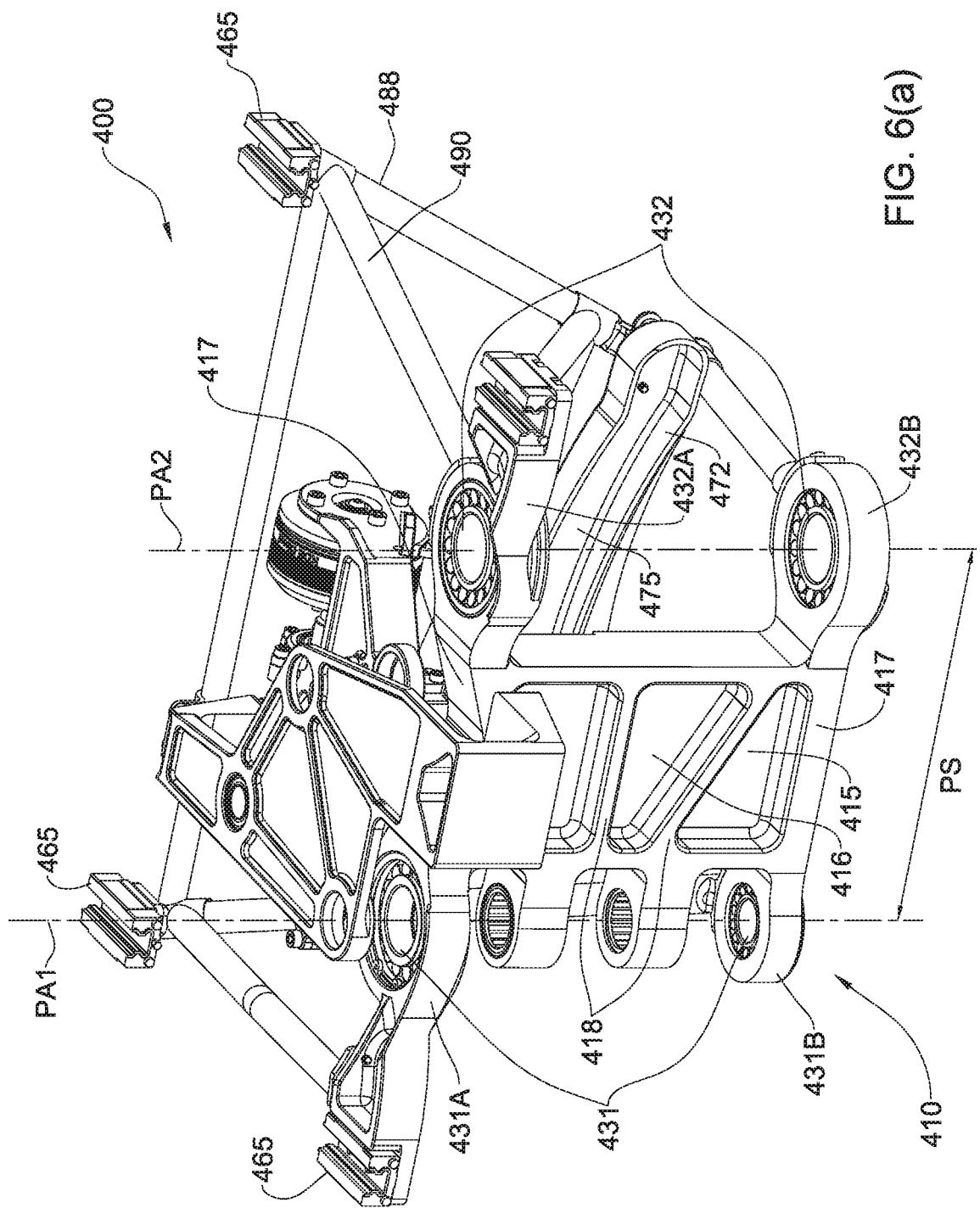

DEPLOYABLE WING SYSTEM FOR AIR VEHICLE

TECHNOLOGICAL FIELD

This invention relates to wing systems for an air vehicle, in to particular wing systems having deployable wings for providing aerodynamic flight capability to air vehicles.

BACKGROUND

Some types of air vehicles, for example some types of unmanned air vehicles (UAVs), are configured as subsonic air vehicles. In some cases, the air vehicle is launched with the lift-generating wings folded in close proximity to the fuselage, and the wings are subsequently deployed to enable aerodynamic flight.

Some examples of existing air vehicles having a deployable appendage include: Lockheed Martin Outrider; Area-I ALTIUS family; Green Dragon (IAI); UVision Hero 120; SkyStriker; VXAerospace Dash X; AeroVironment Switchblade; MBDA Viper Strike.

By way of non-limiting example, US 2012/138727 discloses a sonar buoy that includes a fuselage having a tube-like shape, one or more wings coupled to the fuselage, an engine coupled to the fuselage and operable to propel the sonar buoy through flight, and a guidance computer operable to direct the sonar buoy to a predetermined location. The sonar buoy further includes a sonar detachably coupled to the fuselage and forming at least a part of the fuselage, and a rocket motor detachably coupled to the fuselage. The one or more wings are operable to be folded into a position to allow the sonar buoy to be disposed within a launch tube coupled to a vehicle and to automatically deploy to an appropriate position for flight after the sonar buoy is launched from the launch tube. The rocket motor propels the sonar buoy from the launch tube and detaches from the fuselage after launch.

Further by way of non-limiting example, US 2012/280080 discloses a folding wing for an aircraft comprises first and second inboard wing sections, and first and second outboard wing sections. The first and second inboard wing sections rotate about a centerline hinge, and a centerline spring applies force to the first and second inboard wing sections to rotate the first and second inboard wing sections from a stowed position to a deployed position. At least one of the first and second inboard wing sections translates along the axis of rotation of the first and second inboard wing sections as they move from the stowed to the deployed positions. The first and second outboard wing sections rotate between the stowed and the deployed positions about first and second outboard hinges.

Further by way of non-limiting example, US 2017/369150 discloses a wing for an unmanned aerial vehicle, which includes a first body of the wing with a first end proximate a body of the vehicle. A second end is opposite the first end. A first joint is on the first end of the first main body of the wing. The joint rotatably couples the wing to the vehicle. A second joint is on the second end of the vehicle. A second body of the wing is rotatably coupled to the first body via the second joint.

Further by way of non-limiting example, US 2016/355250 discloses a deployment or hinge mechanism and, more particularly, a compact unmanned aerial vehicle (UAV) wing deployment mechanism. The deployment mechanism includes a hinged mechanism that stows in a stacked configuration and deploys in a level configuration.

Further by way of non-limiting example, WO 2002/2972 relates to a wing folding mechanism for a pair of wings comprising a lower wing and a co-operative upper wing extending opposite to each other in a deployment position and approach each other when rotated from respective remote ends to a resting position.

Further by way of non-limiting example, CN108177783A discloses a training type unmanned aerial vehicle, comprising a head, a body, a main wing mechanism, a tail wing mechanism, a power device and a parachute.

Further by way of non-limiting example, CN107745800A discloses an unmanned aerial vehicle for architectural municipal gardens. The unmanned aerial vehicle comprises a fuselage and two wing devices respectively arranged at two sides of the fuselage.

Further by way of non-limiting example, CN107380402 relates to an unmanned aerial vehicle with folding wings. The unmanned aerial vehicle with the folding wings comprises a fuselage, the wings, horizontal tails, vertical tails, a folding wing releasing mechanism and a fixing base, and positioning holes are formed in the wings, the horizontal tails and the vertical tails; and positioning clamp columns are arranged on the fixing base, and the positioning clamp columns are matched with the positioning holes.

Further by way of non-limiting example, CN107284651 relates to a folding type wing. The folding type wing is mainly formed by parts of a wing supporting framework, a sliding rail, skin-covered supporting ribs, a covering skin, a wing motion device and the like.

Further by way of non-limiting example, CN106741847A discloses a launching type unmanned aerial vehicle (UAV) and a system and an implementing method thereof.

GENERAL DESCRIPTION

According to a first aspect of the presently disclosed subject matter there is provided a wing system for an air vehicle, the air vehicle having a fuselage including a fuselage longitudinal axis, the wing system comprising:
  a set of wings, configured for transitioning between a stowed configuration and a deployed configuration, the set of wings including:
    a first said wing having a first wing tip, a first wing longitudinal axis, and a first pivot axis;
    a second said wing having a second wing tip, a second wing longitudinal axis, and a second pivot axis;
    wherein said first pivot axis and said second pivot axis are non-coaxial;
    wherein in the stowed configuration, the first wing and the second wing are in overlying relationship such that at least a majority of a pressure surface of one of said first wing and said second wing is facing a suction surface of the other one of said one of said first wing and said second wing, and said first wing tip is spaced from said second wing tip by a first lateral spacing; and
    wherein in the deployed configuration, the first wing is oriented with respect to the second wing such that said first wing tip is spaced from said second wing tip by a second lateral spacing greater than said first lateral spacing;
  and wherein said transitioning comprises a pivoting operation, comprising:
    pivoting said first wing about said first pivot axis between the stowed configuration and the deployed configuration;

pivoting said second wing about said second pivot axis between the stowed configuration and the deployed configuration.

For example, the wing system is configured for providing a levelling operation configured for levelling the first wing and the second wing with respect to one another from the overlying relationship in the stowed configuration, to a leveled relationship in the deployed configuration. For example, the wing system is configured for providing said levelling operation concurrent with said transitioning between said stowed configuration and said deployed configuration.

Additionally or alternatively, for example, the wing system is configured for synchronizing said levelling operation with said pivoting operation.

Additionally or alternatively, for example, the wing system is configured for providing a translation operation configured for selectively translating the first wing and the second wing along a stroke direction through a stroke length, between a first axial position corresponding to the stowed configuration, and a second axial position corresponding to the deployed configuration. For example, the wing system is configured for providing said translation operation concurrent with said transitioning between said stowed configuration and said deployed configuration.

Additionally or alternatively, for example, the wing system is configured for synchronizing said translation operation with said pivoting operation.

Additionally or alternatively, for example, in the stowed configuration, the first wing and the second wing are configured in said overlying relationship for being oriented with respect to the fuselage section such that the first wing longitudinal axis and the second wing longitudinal axis are each nominally parallel with the fuselage longitudinal axis.

Additionally or alternatively, for example, in the deployed configuration, the first wing is oriented with respect to the fuselage section such that the first wing longitudinal axis is non-parallel with respect to the fuselage longitudinal axis.

Additionally or alternatively, for example, said first pivot axis is parallel with respect to said second pivot axis.

Additionally or alternatively, for example, said first pivot axis is laterally spaced with respect to said second pivot axis by a lateral spacing.

Additionally or alternatively, for example, the wing system comprises a deployment mechanism configured for selectively transitioning the first wing and the second wing between said stowed configuration and said deployed configuration. For example, said deployment mechanism comprises an actuator configured for selectively driving operation of the deployment mechanism. Additionally or alternatively, for example, said deployment mechanism is configured for self locking. Additionally or alternatively, for example, said first wing comprises a first pivot shaft coaxial with the first pivot axis, and wherein said second wing comprises a second pivot shaft coaxial with the second pivot axis; for example, said deployment mechanism comprises a load bearing bulkhead, wherein said first wing is pivotably mounted to said load bearing bulkhead via said first pivot shaft, and said second wing is pivotably mounted to said load bearing bulkhead via said second pivot shaft. Additionally or alternatively, for example, said deployment mechanism is configured for providing in said pivoting operation a pivoting synchronization operation comprising synchronizing pivoting of said first wing about said first pivot axis in a first rotational direction with pivoting of said second wing about said second pivot axis in a second rotational direction, opposite to said first rotational direction. For example, said deployment mechanism comprises a meshed gear arrangement for providing said synchronization operation. For example, said meshed gear arrangement comprises a first gear wheel fixedly mounted to said first pivot shaft and co-axial with said first pivot axis, and a second gear wheel fixedly mounted to said second pivot shaft and co-axial with said second pivot axis, wherein said first gear wheel is meshed with respect to said second gear wheel. For example, said actuator comprises a motor operatively coupled to said meshed gear arrangement and configured for selectively providing a torque to at least one of said first gear wheel and said second gear wheel to drive said meshed gear arrangement to thereby provide said synchronization operation. For example, said actuator comprises a motor gear wheel meshed with at least one of said first gear and said second gear to drive said meshed gear arrangement for providing said synchronization operation.

Additionally or alternatively, for example, said deployment mechanism comprises a leveling arrangement for providing and for synchronizing said levelling operation with said pivoting operation. For example, the deployment mechanism includes one of the following:

wherein at least one of said first wing and said second wing is movably mounted to the respective said first shaft or said second shaft with respect to one degree of freedom in translation parallel to the respective said first pivot axis or said second pivot axis;

wherein said first wing is fixedly mounted to said first shaft, and wherein said second wing is movably mounted to said second shaft with respect to one degree of freedom in translation parallel to said second pivot axis;

wherein said first wing is fixedly mounted to said first shaft, and wherein said second wing is movably mounted to said second shaft with respect to one degree of freedom in translation parallel to said second pivot axis, and, wherein said second shaft is in the form of a male spline shaft, and wherein the said second wing is movably mounted to said second shaft via a female spline coupling complementary to said male spline shaft.

Additionally or alternatively, for example, said leveling arrangement comprises a cam arrangement operatively coupled to the second wing.

For example, said cam arrangement comprises a cam follower and a cam rail. For example, said cam rail comprises at least one helical cam rail, fixedly mounted with respect to said load-bearing bracket and having a helical axis co-axial with said second pivot axis, and wherein said cam follower fixedly mounted to the second wing, such that movement of the cam follower along said cam rail causes the second wing to translate along said degree of freedom with respect to said second pivot shaft in said levelling operation.

Additionally or alternatively, for example, said deployment mechanism comprises a translation arrangement configured for synchronizing said translation operation with said pivoting operation. For example, said translation arrangement comprises a rail system configured to be fixedly mounted to the air vehicle, and wherein said bracket is moveably mounted to said rail system to enable said bracket to be translated along said stroke direction through said stroke length. For example, said translation arrangement comprises a rack and pinion arrangement, comprising a pinion gear rotatably mounted to said bracket, and a rack gear mounted in fixed spatial relationship with respect to said rail system, wherein said pinion gear is coupled with said meshed gear arrangement, such that actuation of said meshed gear system causes rotation of said pinion gear, which in turn turns with respect to the rack gear causing translation of the load-bearing bracket along said stroke direction. For example, said translation arrangement comprises at least two said pinion gears of different diameter one from the other, each said pinion gear being alternately rotatably mounted to said bracket to correspondingly provide a different said stroke length.

Additionally or alternatively, for example, said first wing comprises a first wing root and wherein said first pivot shaft is located at or near said first wing root, and wherein said second wing comprises a second wing root and wherein said second pivot shaft is located at or near said seconds wing root.

According to the first aspect of the presently disclosed subject matter there is also provided an air vehicle comprising the wing system according to the first aspect of the presently disclosed subject matter.

For example, the air vehicle comprises a fuselage, and wherein the at least one wing system is mounted to a lower side of the fuselage. Alternatively, the air vehicle comprises a fuselage, and wherein the at least one wing system is mounted to an upper side of the fuselage.

Additionally or alternatively, for example, the air vehicle is a UAV.

According to a second aspect of the presently disclosed subject matter there is provided a deployment mechanism for a wing system for an air vehicle, the wing system comprising a set of wings including a first wing and a second wing, the deployment mechanism being configured for enabling transitioning the wing system between a stowed configuration and a deployed configuration, and comprising:
  a first shaft configured for enabling the first wing to be mounted thereto, the first shaft having a first pivot axis, a second shaft configured for enabling the second wing to be mounted thereto, the second shaft having a second pivot axis, wherein said first pivot axis and said second pivot axis are non-coaxial, and wherein in the stowed configuration the first shaft and the second shaft are configured for mounting the first wing and the second wing, respectively, in overlying arrangement;
  a pivoting arrangement configured for providing and synchronizing a pivoting operation comprising pivoting of said first shaft about said first pivot axis in a first rotational direction with pivoting of said second shaft about said second pivot axis in a second rotational direction, opposite to said first rotational direction;
  a leveling arrangement for providing and for synchronizing a levelling operation with said pivoting operation, wherein in operation of the deployment arrangement the leveling arrangement is, in said levelling operation, configured for transitioning the first wing and the second wing with respect to one another from a non-leveled relationship in the stowed configuration, to a leveled relationship in the deployed configuration.

For example, the deployment mechanism is configured for synchronizing said levelling operation with said pivoting operation.

Additionally or alternatively, for example, the wing system is further configured for providing a translation operation configured for selectively translating the first wing and the second wing along a stroke direction through a stroke length, between a first axial position corresponding to the stowed configuration, and a second axial position corresponding to the deployed configuration.

Additionally or alternatively, for example, said deployment mechanism comprises a translation arrangement configured for synchronizing a translation operation with said pivoting operation, wherein said translation operation is configured for selectively translating, in operation of the deployment system, the first wing and the second wing along a stroke direction through a stroke length, between a first axial position corresponding to the stowed configuration, and a second axial position corresponding to the deployed configuration.

Additionally or alternatively, for example, the deployment mechanism is configured for synchronizing said translation operation with said pivoting operation.

Additionally or alternatively, for example, said translation arrangement comprises a rail system configured to be fixedly mounted to the air vehicle, and wherein said bracket is moveably mounted to said rail system to enable said bracket to be translated along said stroke direction through said stroke length.

Additionally or alternatively, for example, said first pivot axis is parallel with respect to said second pivot axis, and wherein said first pivot axis is laterally spaced with respect to said second pivot axis by a lateral spacing.

Additionally or alternatively, for example, said deployment mechanism comprises an actuator configured for selectively driving operation of the deployment mechanism, and wherein optionally said deployment mechanism is configured for self locking.

Additionally or alternatively, for example, said first wing comprises a first pivot shaft coaxial with the first pivot axis, and wherein said second wing comprises a second pivot shaft coaxial with the second pivot axis.

Additionally or alternatively, for example, said deployment mechanism comprises a load bearing bulkhead, wherein said first wing is pivotably mounted to said load bearing bulkhead via said first pivot shaft, and said second wing is pivotably mounted to said load bearing bulkhead via said second pivot shaft.

Additionally or alternatively, for example, said deployment mechanism is configured for providing in said pivoting operation a pivoting synchronization operation comprising synchronizing pivoting of said first wing about said first pivot axis in a first rotational direction with pivoting of said second wing about said second pivot axis in a second rotational direction, opposite to said first rotational direction.

Additionally or alternatively, for example, said deployment mechanism comprises a meshed gear arrangement for providing said synchronization operation.

Additionally or alternatively, for example, said meshed gear arrangement comprises a first gear wheel fixedly mounted to said first pivot shaft and co-axial with said first pivot axis, and a second gear wheel fixedly mounted to said second pivot shaft and co-axial with said second pivot axis, wherein said first gear wheel is meshed with respect to said second gear wheel.

Additionally or alternatively, for example, said actuator comprises a motor operatively coupled to said meshed gear arrangement and configured for selectively providing a torque to at least one of said first gear wheel and said second gear wheel to drive said meshed gear arrangement to thereby provide said synchronization operation.

Additionally or alternatively, for example, said actuator comprises a motor gear wheel meshed with at least one of said first gear and said second gear to drive said meshed gear arrangement for providing said synchronization operation.

Additionally or alternatively, for example, at least one of said first wing and said second wing is movably mounted to the respective said first shaft or said second shaft with respect to one degree of freedom in translation parallel to the respective said first pivot axis or said second pivot axis.

Additionally or alternatively, for example, said first wing is fixedly mounted to said first shaft, and wherein said second wing is movably mounted to said second shaft with respect to one degree of freedom in translation parallel to said second pivot axis.

Additionally or alternatively, for example, said second shaft is in the form of a male spline shaft, and wherein the said second wing is movably mounted to said second shaft via a female spline coupling complementary to said male spline shaft.

Additionally or alternatively, for example, said leveling arrangement comprises a cam arrangement operatively coupled to the second wing.

Additionally or alternatively, for example, said cam arrangement comprises a cam follower and a cam rail.

Additionally or alternatively, for example, said cam rail is a helical cam rail, fixedly mounted with respect to said load-bearing bracket and having a helical axis co-axial with said second pivot axis, and wherein said cam follower fixedly mounted to the second wing, such that movement of the cam follower along said helical cam rail causes the second wing to translate along said degree of freedom with respect to said second pivot shaft in said levelling operation.

Additionally or alternatively, for example, said translation arrangement comprises a rail system configured to be fixedly mounted to the air vehicle, and wherein said bracket is moveably mounted to said rail system to enable said bracket to be translated along said stroke direction through said stroke length.

Additionally or alternatively, for example, said translation arrangement comprises a rack and pinion arrangement, comprising a pinion gear rotatably mounted to said bracket, and a rack gear mounted in fixed spatial relationship with respect to said rail system, wherein said pinion gear is coupled with said meshed gear arrangement, such that actuation of said meshed gear system causes rotation of said pinion gear, which in turn turns with respect to the rack gear causing translation of the load-bearing bracket along said stroke direction.

Additionally or alternatively, for example, said translation arrangement comprises at least two said pinion gears of different diameter one from the other, each said pinion gear being alternately rotatably mounted to said bracket to correspondingly provide a different said stroke length.

According to the second aspect of the presently disclosed subject matter there is also provided a wing system comprising the deployment mechanism according to the second aspect of the presently disclosed subject matter.

According to the second aspect of the presently disclosed subject matter there is also provided an air vehicle comprising the wing system according to the second aspect of the presently disclosed subject matter.

For example, the air vehicle comprises a fuselage, and wherein the at least one wing system is mounted to a lower side of the fuselage. Alternatively, the air vehicle comprises a fuselage, and wherein the at least one wing system is mounted to an upper side of the fuselage.

Additionally or alternatively, for example, the air vehicle is a UAV.

According to a third aspect of the presently disclosed subject matter there is provided a deployment mechanism for a wing system for an air vehicle, the wing system comprising a set of wings including a first wing and a second wing, the deployment mechanism being configured for enabling transitioning the wing system between a stowed configuration and a deployed configuration, and comprising:

a first shaft configured for enabling the first wing to be mounted thereto, the first shaft having a first pivot axis, a second shaft configured for enabling the second wing to be mounted thereto, the second shaft having a second pivot axis, wherein said first pivot axis and said second pivot axis are non-coaxial, and wherein in the stowed configuration the first shaft and the second shaft are configured for mounting the first wing and the second wing, respectively, in overlying arrangement;

a pivoting arrangement configured for providing and synchronizing a pivoting operation comprising pivoting of said first shaft about said first pivot axis in a first rotational direction with pivoting of said second shaft about said second pivot axis in a second rotational direction, opposite to said first rotational direction;

a translation arrangement configured for synchronizing a translation operation with said pivoting operation, wherein said translation operation is configured for selectively translating, in operation of the deployment system, the first wing and the second wing along a stroke direction through a stroke length, between a first axial position corresponding to the stowed configuration, and a second axial position corresponding to the deployed configuration.

For example, the deployment mechanism is configured for synchronizing said translation operation with said pivoting operation.

Additionally or alternatively, for example, said deployment mechanism comprises a leveling arrangement for providing and for synchronizing a levelling operation with said pivoting operation, wherein in operation of the deployment arrangement the leveling arrangement is, in said levelling operation, configured for transitioning the first wing and the second wing with respect to one another from a non-leveled relationship in the stowed configuration, to a leveled relationship in the deployed configurations. For example, the deployment mechanism is configured for synchronizing said levelling operation with said pivoting operation.

Additionally or alternatively, for example, said first pivot axis is parallel with respect to said second pivot axis, and wherein said first pivot axis is laterally spaced with respect to said second pivot axis by a lateral spacing.

Additionally or alternatively, for example, said deployment mechanism comprises an actuator configured for selectively driving operation of the deployment mechanism, and wherein optionally said deployment mechanism is configured for self locking.

Additionally or alternatively, for example, said first wing comprises a first pivot shaft coaxial with the first pivot axis, and wherein said second wing comprises a second pivot shaft coaxial with the second pivot axis.

Additionally or alternatively, for example, said deployment mechanism comprises a load bearing bulkhead, wherein said first wing is pivotably mounted to said load bearing bulkhead via said first pivot shaft, and said second wing is pivotably mounted to said load bearing bulkhead via said second pivot shaft.

Additionally or alternatively, for example, said deployment mechanism is configured for providing in said pivoting operation a pivoting synchronization operation comprising synchronizing pivoting of said first wing about said first pivot axis in a first rotational direction with pivoting of said second wing about said second pivot axis in a second rotational direction, opposite to said first rotational direction.

Additionally or alternatively, for example, said deployment mechanism comprises a meshed gear arrangement for providing said synchronization operation.

Additionally or alternatively, for example, said meshed gear arrangement comprises a first gear wheel fixedly mounted to said first pivot shaft and co-axial with said first pivot axis, and a second gear wheel fixedly mounted to said second pivot shaft and co-axial with said second pivot axis, wherein said first gear wheel is meshed with respect to said second gear wheel.

Additionally or alternatively, for example, said actuator comprises a motor operatively coupled to said meshed gear arrangement and configured for selectively providing a torque to at least one of said first gear wheel and said second gear wheel to drive said meshed gear arrangement to thereby provide said synchronization operation.

Additionally or alternatively, for example, said actuator comprises a motor gear wheel meshed with at least one of said first gear and said second gear to drive said meshed gear arrangement for providing said synchronization operation.

Additionally or alternatively, for example, at least one of said first wing and said second wing is movably mounted to the respective said first shaft or said second shaft with respect to one degree of freedom in translation parallel to the respective said first pivot axis or said second pivot axis.

Additionally or alternatively, for example, said first wing is fixedly mounted to said first shaft, and wherein said second wing is movably mounted to said second shaft with respect to one degree of freedom in translation parallel to said second pivot axis.

Additionally or alternatively, for example, said second shaft is in the form of a male spline shaft, and wherein the said second wing is movably mounted to said second shaft via a female spline coupling complementary to said male spline shaft.

Additionally or alternatively, for example, said leveling arrangement comprises a cam arrangement operatively coupled to the second wing.

Additionally or alternatively, for example, said cam arrangement comprises a cam follower and a cam rail.

Additionally or alternatively, for example, said cam rail is a helical cam rail, fixedly mounted with respect to said load-bearing bracket and having a helical axis co-axial with said second pivot axis, and wherein said cam follower fixedly mounted to the second wing, such that movement of the cam follower along said helical cam rail causes the second wing to translate along said degree of freedom with respect to said second pivot shaft in said levelling operation.

Additionally or alternatively, for example, said deployment mechanism comprises a translation arrangement configured for synchronizing said translation operation with said pivoting operation.

Additionally or alternatively, for example, said translation arrangement comprises a rail system configured to be fixedly mounted to the air vehicle, and wherein said bracket is moveably mounted to said rail system to enable said bracket to be translated along said stroke direction through said stroke length.

Additionally or alternatively, for example, said translation arrangement comprises a rack and pinion arrangement, comprising a pinion gear rotatably mounted to said bracket, and a rack gear mounted in fixed spatial relationship with respect to said rail system, wherein said pinion gear is coupled with said meshed gear arrangement, such that actuation of said meshed gear system causes rotation of said pinion gear, which in turn turns with respect to the rack gear causing translation of the load-bearing bracket along said stroke direction.

Additionally or alternatively, for example, said translation arrangement comprises at least two said pinion gears of different diameter one from the other, each said pinion gear being alternately rotatably mounted to said bracket to correspondingly provide a different said stroke length.

According to the third aspect of the presently disclosed subject matter there is also provided a wing system comprising the deployment mechanism according to the third aspect of the presently disclosed subject matter.

According to the third aspect of the presently disclosed subject matter there is also provided an air vehicle comprising the wing system according to the third aspect of the presently disclosed subject matter.

For example, the air vehicle comprises a fuselage, and wherein the at least one wing system is mounted to a lower side of the fuselage. Alternatively, the air vehicle comprises a fuselage, and wherein the at least one wing system is mounted to an upper side of the fuselage.

Additionally or alternatively, for example, the air vehicle is a UAV.

According to a fourth aspect of the presently disclosed subject matter there is provided a wing system for an air vehicle, the air vehicle having a fuselage including a fuselage section and a fuselage longitudinal axis, the wing system comprising:
 a set of wings, including a first said wing having a first wing longitudinal axis, and a second said wing having a second wing longitudinal axis, and configured for transitioning between a stowed configuration and a deployed configuration;
 wherein in the stowed configuration, the first wing and the second wing are generally aligned with the fuselage longitudinal axis; and
 wherein in the deployed configuration, the first wing is oriented with respect to the second wing such that the wings tips are more spaced from one another than in the stowed configuration;
 and further comprising a deployment mechanism configured for selectively providing a wing pivoting operation, comprising:
  pivoting said first wing about a first pivot axis between the stowed configuration and the deployed configuration;
  pivoting said second wing about a second pivot axis between the stowed configuration and the deployed configuration;
  wherein said first pivot axis and said second pivot axis are non-coaxial;
 the deployment mechanism being further configured for selectively providing a displacement operation concurrent with the wing pivoting operation, said displacement operation comprising translating the first wing and the second wing through a stroke length concurrent with said pivoting, between a first axial position corresponding to the stowed configuration, and a second axial position corresponding to the deployed configuration;
 wherein said deployment mechanism is configured for enabling changing a magnitude of said stroke length while unaffecting said wing pivoting operation.

For example, said deployment mechanism comprises a translation arrangement configured for synchronizing said translation operation with said pivoting operation, wherein said translation operation is configured for selectively translating, in operation of the deployment system, the first wing and the second wing along a stroke direction through a stroke length, between a first axial position corresponding to the stowed configuration, and a second axial position corresponding to the deployed configuration.

Additionally or alternatively, for example, the deployment mechanism is configured for synchronizing said translation operation with said pivoting operation.

Additionally or alternatively, for example, said translation arrangement comprises a rail system configured to be fixedly mounted to the air vehicle, and wherein said bracket is moveably mounted to said rail system to enable said bracket to be translated along said stroke direction through said stroke length.

Additionally or alternatively, for example, said translation arrangement comprises a rack and pinion arrangement, comprising a pinion gear rotatably mounted to said bracket, and a rack gear mounted in fixed spatial relationship with respect to said rail system, wherein said pinion gear is coupled with said meshed gear arrangement, such that actuation of said meshed gear system causes rotation of said pinion gear, which in turn turns with respect to the rack gear causing translation of the load-bearing bracket along said stroke direction.

Additionally or alternatively, for example, said translation arrangement comprises at least two said pinion gears of different diameter one from the other, each said pinion gear being alternately rotatably mounted to said bracket to correspondingly provide a different said stroke length.

Additionally or alternatively, for example, said first pivot axis is parallel with respect to said second pivot axis, and wherein said first pivot axis is laterally spaced with respect to said second pivot axis by a lateral spacing.

Additionally or alternatively, for example, said deployment mechanism comprises an actuator configured for selectively driving operation of the deployment mechanism, and wherein optionally said deployment mechanism is configured for self locking.

Additionally or alternatively, for example, said first wing comprises a first pivot shaft coaxial with the first pivot axis, and wherein said second wing comprises a second pivot shaft coaxial with the second pivot axis.

Additionally or alternatively, for example, said deployment mechanism comprises a load bearing bulkhead, wherein said first wing is pivotably mounted to said load bearing bulkhead via said first pivot shaft, and said second wing is pivotably mounted to said load bearing bulkhead via said second pivot shaft.

Additionally or alternatively, for example, said deployment mechanism is configured for providing in said pivoting operation a pivoting synchronization operation comprising synchronizing pivoting of said first wing about said first pivot axis in a first rotational direction with pivoting of said second wing about said second pivot axis in a second rotational direction, opposite to said first rotational direction.

Additionally or alternatively, for example, said deployment mechanism comprises a meshed gear arrangement for providing said synchronization operation.

Additionally or alternatively, for example, said meshed gear arrangement comprises a first gear wheel fixedly mounted to said first pivot shaft and co-axial with said first pivot axis, and a second gear wheel fixedly mounted to said second pivot shaft and co-axial with said second pivot axis, wherein said first gear wheel is meshed with respect to said second gear wheel.

Additionally or alternatively, for example, said actuator comprises a motor operatively coupled to said meshed gear arrangement and configured for selectively providing a torque to at least one of said first gear wheel and said second gear wheel to drive said meshed gear arrangement to thereby provide said synchronization operation.

Additionally or alternatively, for example, said actuator comprises a motor gear wheel meshed with at least one of said first gear and said second gear to drive said meshed gear arrangement for providing said synchronization operation.

Additionally or alternatively, for example, said deployment mechanism is comprises a leveling arrangement for providing and for synchronizing a levelling operation with said pivoting operation, wherein in operation of the deployment arrangement the leveling arrangement is, in said levelling operation, configured for transitioning the first wing and the second wing with respect to one another from a non-leveled relationship in the stowed configuration, to a leveled relationship in the deployed configuration.

For example, the deployment mechanism is configured for synchronizing said levelling operation with said pivoting operation.

Additionally or alternatively, for example, at least one of said first wing and said second wing is movably mounted to the respective said first shaft or said second shaft with respect to one degree of freedom in translation parallel to the respective said first pivot axis or said second pivot axis.

Additionally or alternatively, for example, said first wing is fixedly mounted to said first shaft, and wherein said second wing is movably mounted to said second shaft with respect to one degree of freedom in translation parallel to said second pivot axis.

Additionally or alternatively, for example, said second shaft is in the form of a male spline shaft, and wherein the said second wing is movably mounted to said second shaft via a female spline coupling complementary to said male spline shaft.

Additionally or alternatively, for example, said leveling arrangement comprises a cam arrangement operatively coupled to the second wing.

Additionally or alternatively, for example, said cam arrangement comprises a cam follower and a cam rail.

Additionally or alternatively, for example, said cam rail is a helical cam rail, fixedly mounted with respect to said load-bearing bracket and having a helical axis co-axial with said second pivot axis, and wherein said cam follower fixedly mounted to the second wing, such that movement of the cam follower along said helical cam rail causes the second wing to translate along said degree of freedom with respect to said second pivot shaft in said levelling operation.

According to a fourth aspect of the presently disclosed subject matter there is also provided a deployment mechanism for a wing system for an air vehicle, the wing system comprising a set of wings including a first wing and a second wing, the deployment mechanism being configured for enabling transitioning the wing system between a stowed configuration and a deployed configuration, and comprising:

a deployment mechanism configured for selectively providing a wing pivoting operation, comprising:
        pivoting said first wing about a first pivot axis between the stowed configuration and the deployed configuration;
        pivoting said second wing about a second pivot axis between the stowed configuration and the deployed configuration;
        wherein said first pivot axis and said second pivot axis are non-coaxial;
    the deployment mechanism being further configured for selectively providing a displacement operation concurrent with the wing pivoting operation, said displacement operation comprising translating the first wing and the second wing through a stroke length concurrent with said pivoting, between a first axial position corresponding to the stowed configuration, and a second axial position corresponding to the deployed configuration;

wherein said deployment mechanism is configured for enabling changing a magnitude of said stroke length while unaffecting said wing pivoting operation.

For example, said deployment mechanism comprises a translation arrangement configured for synchronizing said translation operation with said pivoting operation, wherein said translation operation is configured for selectively translating, in operation of the deployment system, the first wing and the second wing along a stroke direction through a stroke length, between a first axial position corresponding to the stowed configuration, and a second axial position corresponding to the deployed configuration.

Additionally or alternatively, for example, the deployment mechanism is configured for synchronizing said translation operation with said pivoting operation.

Additionally or alternatively, for example, said translation arrangement comprises a rail system configured to be fixedly mounted to the air vehicle, and wherein said bracket is moveably mounted to said rail system to enable said bracket to be translated along said stroke direction through said stroke length.

Additionally or alternatively, for example, said translation arrangement comprises a rack and pinion arrangement, comprising a pinion gear rotatably mounted to said bracket, and a rack gear mounted in fixed spatial relationship with respect to said rail system, wherein said pinion gear is coupled with said meshed gear arrangement, such that actuation of said meshed gear system causes rotation of said pinion gear, which in turn turns with respect to the rack gear causing translation of the load-bearing bracket along said stroke direction.

Additionally or alternatively, for example, said translation arrangement comprises at least two said pinion gears of different diameter one from the other, each said pinion gear being alternately rotatably mounted to said bracket to correspondingly provide a different said stroke length.

Additionally or alternatively, for example, said first pivot axis is parallel with respect to said second pivot axis, and wherein said first pivot axis is laterally spaced with respect to said second pivot axis by a lateral spacing.

Additionally or alternatively, for example, said deployment mechanism comprises an actuator configured for selectively driving operation of the deployment mechanism, and wherein optionally said deployment mechanism is configured for self locking.

Additionally or alternatively, for example, said first wing comprises a first pivot shaft coaxial with the first pivot axis, and wherein said second wing comprises a second pivot shaft coaxial with the second pivot axis.

Additionally or alternatively, for example, said deployment mechanism comprises a load bearing bulkhead, wherein said first wing is pivotably mounted to said load bearing bulkhead via said first pivot shaft, and said second wing is pivotably mounted to said load bearing bulkhead via said second pivot shaft.

Additionally or alternatively, for example, said deployment mechanism is configured for providing in said pivoting operation a pivoting synchronization operation comprising synchronizing pivoting of said first wing about said first pivot axis in a first rotational direction with pivoting of said second wing about said second pivot axis in a second rotational direction, opposite to said first rotational direction.

Additionally or alternatively, for example, said deployment mechanism comprises a meshed gear arrangement for providing said synchronization operation.

Additionally or alternatively, for example, said meshed gear arrangement comprises a first gear wheel fixedly mounted to said first pivot shaft and co-axial with said first pivot axis, and a second gear wheel fixedly mounted to said second pivot shaft and co-axial with said second pivot axis, wherein said first gear wheel is meshed with respect to said second gear wheel.

Additionally or alternatively, for example, said actuator comprises a motor operatively coupled to said meshed gear arrangement and configured for selectively providing a torque to at least one of said first gear wheel and said second gear wheel to drive said meshed gear arrangement to thereby provide said synchronization operation.

Additionally or alternatively, for example, said actuator comprises a motor gear wheel meshed with at least one of said first gear and said second gear to drive said meshed gear arrangement for providing said synchronization operation.

Additionally or alternatively, for example, said deployment mechanism is comprises a leveling arrangement for providing and for synchronizing a levelling operation with said pivoting operation, wherein in operation of the deployment arrangement the leveling arrangement is, in said levelling operation, configured for transitioning the first wing and the second wing with respect to one another from a non-leveled relationship in the stowed configuration, to a leveled relationship in the deployed configuration.

For example, the deployment mechanism is configured for synchronizing said levelling operation with said pivoting operation.

Additionally or alternatively, for example, at least one of said first wing and said second wing is movably mounted to the respective said first shaft or said second shaft with respect to one degree of freedom in translation parallel to the respective said first pivot axis or said second pivot axis.

Additionally or alternatively, for example, said first wing is fixedly mounted to said first shaft, and wherein said second wing is movably mounted to said second shaft with respect to one degree of freedom in translation parallel to said second pivot axis.

Additionally or alternatively, for example, said second shaft is in the form of a male spline shaft, and wherein the said second wing is movably mounted to said second shaft via a female spline coupling complementary to said male spline shaft.

Additionally or alternatively, for example, said leveling arrangement comprises a cam arrangement operatively coupled to the second wing.

Additionally or alternatively, for example, said cam arrangement comprises a cam follower and a cam rail.

Additionally or alternatively, for example, said cam rail is a helical cam rail, fixedly mounted with respect to said load-bearing bracket and having a helical axis co-axial with said second pivot axis, and wherein said cam follower fixedly mounted to the second wing, such that movement of the cam follower along said helical cam rail causes the second wing to translate along said degree of freedom with respect to said second pivot shaft in said levelling operation.

According to the fourth aspect of the presently disclosed subject matter there is also provided a wing system comprising the deployment mechanism according to the fourth aspect of the presently disclosed subject matter.

According to the fourth aspect of the presently disclosed subject matter there is also provided an air vehicle comprising the wing system according to the fourth aspect of the presently disclosed subject matter.

For example, the air vehicle comprises a fuselage, and wherein the at least one wing system is mounted to a lower side of the fuselage. Alternatively, the air vehicle comprises a fuselage, and wherein the at least one wing system is mounted to an upper side of the fuselage.

Additionally or alternatively, for example, the air vehicle is a UAV.

According to the fourth aspect of the presently disclosed subject matter there is also provided a method of operating an air vehicle, comprising:
  providing an air vehicle as defined according to the fourth aspect of the presently disclosed subject matter;
  providing a said magnitude of said stroke length while unaffecting said wing pivoting operation According to a fifth aspect of the presently disclosed subject matter there is also provided a method of operating an air vehicle, comprising:
  providing an air vehicle as defined herein with respect to any one of the first, second third or fourth aspect of the presently disclosed subject matter;
  selectively operating the respective wing system to transition the wing system from the stowed configuration to the deployed configuration.

For example, the method further comprises:
  selectively operating the respective wing system to transition the wing system from the deployed configuration to the stowed configuration.

According to a sixth aspect of the presently disclosed subject matter there is also provided a method of operating an air vehicle, comprising:
  (a) providing an air vehicle as defined as defined herein with respect to any one of the first, second third or fourth aspect of the presently disclosed subject matter, the air vehicle in the stowed configuration encapsulated in a fairing;
  (b) launching the encapsulated air vehicles;
  (c) separating the air vehicle from the fairing;
  (d) selectively operating the respective wing system to transition the wing system from the stowed configuration to the deployed configuration.

For example, step (b) comprises any one of:
  launching the encapsulated air vehicle via a launch barrel;
  launching the encapsulated air vehicle using a booster rocket;
  launching the encapsulated air vehicle from a carrier aircraft.

Additionally or alternatively, for example, step (b) comprises launching the encapsulated air vehicle to a predetermined altitude and a predetermined forward speed.

A feature of at least one example of the presently disclosed subject matter is that a wing system is provided for an air vehicle, in which in said stowed configuration, the respective first wing and second wing of each wing set is compactly folded over one another with respect to the fuselage lateral sides while enabling maximizing wing span in the deployed configuration.

Another feature of at least one example of the presently disclosed subject matter is that a wing system is provided for an air vehicle, in which in said stowed configuration, the respective first wing and second wing of each wing set is compactly folded over one another with respect to the fuselage lateral sides while enabling providing long endurance and/or enhanced aerodynamic efficiency and/or minimize energy consumption with respect to the air vehicle in the deployed configuration.

Another feature of at least one example of the presently disclosed subject matter is that a wing system is provided for an air vehicle, in which in said stowed configuration, the respective first wing and second wing of each wing set is compactly folded over one another with respect to the fuselage lateral sides while enabling low speed flight for the air vehicle in the deployed configuration.

Another feature of at least one example of the presently disclosed subject matter is that a wing system is provided for an air vehicle, in which in said stowed configuration, the respective first wing and second wing of each wing set is compactly folded over one another with respect to the fuselage lateral sides while providing stability to the air vehicle during deployment and at the deployed configuration.

Another feature of at least one example of the presently disclosed subject matter is that a wing system is provided for an air vehicle, in which in said stowed configuration, the respective first wing and second wing of each wing set can be maximized while still remaining within the "footprint" of the fuselage.

Another feature of at least one example of the presently disclosed subject matter is that a wing system is provided for an air vehicle, in which the respective first wing and second wing of each wing set can have long spans while enabling the air vehicle to be packed into a small packaging volume, for example within an aerodynamic fairing.

Another feature of at least one example of the presently disclosed subject matter is that a wing system is provided for an air vehicle, in which the length of the wings can be chosen for the particular air vehicles while maintain the ability to position the wings, in the deployed configuration, with the desired proximity to air vehicle center of mass.

Another feature of at least one example of the presently disclosed subject matter is that a wing system is provided for an air vehicle, in which the respective deployment mechanism can be adapted to provide a variety of different magnitudes for the stroke length, while essentially unchanging the magnitude of the angular displacements of the wings about the respective pivot axes, enabling the same deployment mechanism to be easily adapted for installation in a variety of air vehicles, in which the required stroke length can be different in each air vehicle.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which:

FIG. 1(a) shows in side view an air vehicle comprising a wing system according to a first example of the presently disclosed subject matter, wherein the wing system is in the stowed configuration; FIG. 1(b) shows in side view the example of the air vehicle of FIG. 1(a) in the deployed configuration.

FIG. 2(a) schematically illustrates in top view the example of the wing system of FIG. 1(a) in the stowed configuration; FIG. 2(b) schematically illustrates in top view the example of the wing system of FIG. 1(a) in a position intermediate the stowed configuration and the deployed configuration; FIG. 2(c) schematically illustrates in top view the example of the wing system of FIG. 1(a) in the deployed configuration.

FIG. 6(a) shows in isometric top-aft-side view, part of the deployment mechanism of the example of FIGS. 4(a) to 4(d)

DETAILED DESCRIPTION

Figure 2D:
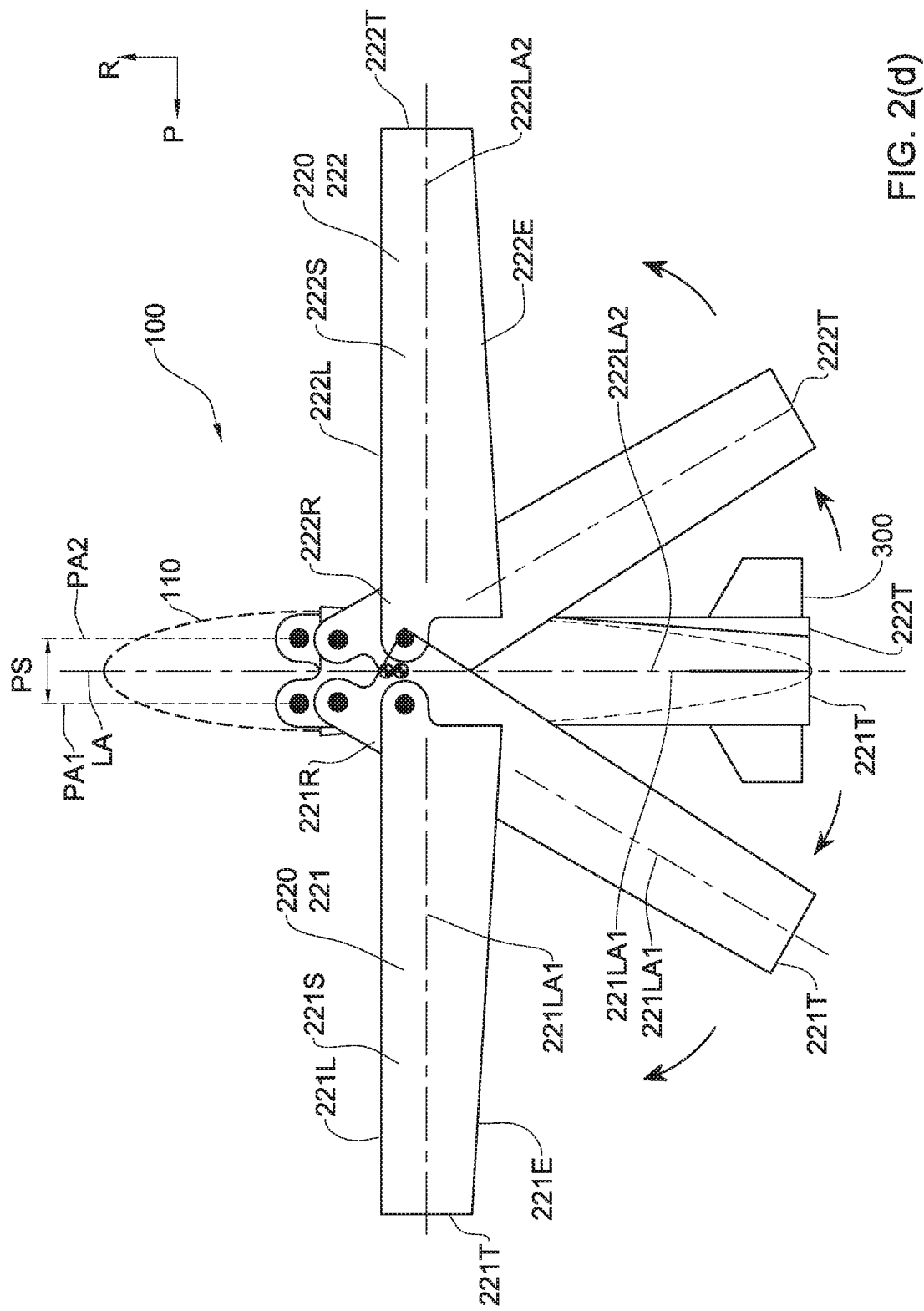
FIG. 2(d) schematically illustrates in composite top view the example of the wing system of FIG. 2(a), FIG. 2(b) and FIG. 2(c).

Referring to FIGS. 1(a) and 1(b), an air vehicle according to a first example of the presently disclosed subject matter, generally designated 100, comprises a wing system 200, which is per se novel.

In at least this example, the air vehicle 100 is a powered, fixed-wing type air vehicle, comprising a subsonic configuration, having a fuselage section 110 (also referred to herein as the fuselage 110), said wing system 200, a suitable propulsion system (not shown), and an empennage 300—for example (but not limited to) including a tailplane and vertical stabilizers. Furthermore, while the presently disclosed subject matter finds particular application in UAV aircraft, the presently disclosed subject matter can also be applied to manned aircraft, mutatis mutandis, in particular to general aviation, subsonic transport, naval aviation, and so on, for example. In alternative variations of this example, and in other examples, the air vehicle 100 can instead be configured as an un-powered, fixed-wing type subsonic/transonic air vehicle. In yet other alternative variations of this example, and in other examples, the air vehicle 100 can instead be configured as a powered, fixed-wing type transonic or supersonic air vehicle, manned or unmanned.

The air vehicle 100 further comprises a control system comprising a controller (not shown) configured for operating the air vehicle 100 at least within the flight envelope thereof.

As will become clearer herein, the wing system 200 has a stowed configuration SC, and a deployed configuration DC. Furthermore, the wing system 200 is deployable between the stowed configuration SC, and the deployed configuration DC.

While the wing system 200 in the illustrated example is disclosed herein in relation to the main lift-generating wings of the air vehicle, in other implementations of the presently discloses subject matter the concept and operation of the wing system 200 can instead be applied to an empennage, for example the vertical stabilizer or horizontal stabilizes, or to a canard arrangement for example, mutatis mutandis.

While the air vehicle in the illustrated example is disclosed herein as having a wing system with one set of wings, in alternative variations of this example the wing system can have more than one set of wings, for example two wing sets. In such a case, for example, a first wing set deploys the wings in a forward direction, while the second wing set deploys its wings in an aft direction, thereby providing a tandem wing arrangement. The two sets of wings can be mounted together to the underside of the fuselage, or can be mounted together to the upper side of the fuselage, or one set can be mounted to the underside of the fuselage while the other set can be mounted to the upper side of the fuselage.

The wing system 200 comprises a set of wings 210, configured for transitioning between the stowed configuration and the deployed configuration, the set of wings 210 comprising two wings 220, in particular a first wing 221 and a second wing 222. In the illustrated examples, the first wing 221 is provided on the port side, and is therefore also referred to herein as the port wing, while the second wing 222 is provided on the starboard side, and is therefore also referred to herein as the starboard wing. However, in other alternative variations of this example, the first wing 221 can refer to the starboard wing, while the second wing 222 can refer to the port wing, mutatis mutandis.

Thus, unless otherwise specified herein, the reference numeral 220 shall also refer to each one of the first wing 221 and the second wing 222.

Referring in particular to FIGS. 2(a), 2(b), 2(c) and 2(d), each said wing 220 is pivotably mounted with respect to the fuselage 110 about a respective pivot axis PA, thereby enabling the wings 220 to each pivot about its respective axis PA between the stowed configuration SC and the deployed configuration DC.

Thus, the first wing 221 is pivotably mounted with respect to the fuselage 110 about a respective first pivot axis PA1, thereby enabling the first wing 221 to pivot about its respective first pivot axis PA1 between the stowed configuration SC and the deployed configuration DC Similarly, the second wing 222 is pivotably mounted with respect to the fuselage 110 about a respective second pivot axis PA2, thereby enabling the second wing 222 to pivot about its respective second pivot axis PA2 between the stowed configuration SC and the deployed configuration DC.

According to an aspect of the presently disclosed subject matter, the first pivot axis PA1 and the second pivot axis PA1 are non-coaxial. In at least this example, the first pivot axis PA1 and the second pivot axis PA2 are parallel to one another, and spaced by pivot spacing PS.

However, in alternative variations of this example, and in other examples, respective pivot axes PA of the two wings 220 are not parallel, for example non-parallel and spaced. In such cases, the respective pivot axes PA of the two wings 220 can intersect at a location above or below the wings 220, such that at the vertical location of the wings 220 (i.e., along a direction parallel to the yaw axis Y), the pivot axes are also spaced from one another.

In at least this example, the first pivot axis PA1 and the second pivot axis PA2 are each parallel to the yaw axis Y of the air vehicle 100. However, in alternative variations of this example, the first pivot axis PA1 and the second pivot axis PA2 are each inclined to the yaw axis Y, for example along a plane parallel to the yaw-roll plane of the air vehicle.

In at least this example, the first pivot axis PA1 and the second pivot axis PA2 are each orthogonal to the longitudinal axis LA of the air vehicle 100.

In at least this example, the first pivot axis PA1 and the second pivot axis PA2 are each parallel to, or set at a small angle with respect to, the thickness of each wing 220 of the air vehicle 100.

In at least this example, the first pivot axis PA1 and the second pivot axis PA2 are each orthogonal to the chord of each wing 220 of the air vehicle 100.

The first wing 221 and the second wing 222 are essentially mirror images of one another, and are otherwise substantially identical with the exception that at least in this example, a portion of each wing 220 in the vicinity of the respective pivot axis PA can be different to one another.

In at least this example, the air vehicle 100 is configured for being accommodated or otherwise encapsulated in a fairing (not shown), while the wing system 200 is in the stowed configuration SC. For example, such a fairing enables the air vehicle 100 to be isolated from aerodynamic forces as the air vehicle 100 is accelerated to required speed and altitude, and/or such a fairing can protect the air vehicle while in storage or while being transported. For example the air vehicle 100 can be accelerated to required speed and altitude via an external launch system, for example a launch barrel, or for example via a booster rocket (as a payload thereof for example), or for example can be delivered to required altitude and required speed via a carrier air vehicle, which can be manned or unmanned.

In at least the example of FIGS. 1(a) and 1(b), the wings 220 are below the fuselage 110, that is, the suction surface of the uppermost wing 220 (for example the first wing 221) of the wing system 200 is facing a bottom portion 115 of the fuselage 110. However, in at least one alternative variation of the example of FIG. 1, the wings 220 can be above the fuselage, that is, the pressure surface of the lowermost wing 220 (for example the second wing 222) of the wing system 200 is facing an upper portion of the fuselage 110.

Each wing 220 is based on (i.e., the wing 220 comprises a plurality of aerofoil sections each corresponding to) suitable aerofoils according to the configuration of the air vehicle and other factors—for example whether the air vehicle is optimized for subsonic flight, transonic flight, or supersonic flight, and so on.

In particular, in at least this example and other examples, the wings 220 are configured as lift-generating wings capable of providing sufficient lift to enable aerodynamic flight for the air vehicle 100. Furthermore, the wings 220 can include control surfaces, for example, flaps, ailerons and so on, for providing stability and control to the air vehicle.

While in this example the wings 220 are in plan form generally trapezoidal (i.e., having a taper) or any other shape, in alternative variations of this example, the wings can have a generally rectangular plan form, or any other suitable plan form.

While in this example the wings 220 are zero swept (i.e., having zero sweep angle) in the deployed configuration, in alternative variations of this example, the wings can have a positive sweep angle or a negative sweep angle in the deployed configuration. For example, such swept wings can be of particular use in transonic and/or supersonic air vehicles. In other examples, such swept wings can be of particular use in subsonic/transonic air vehicles due to center of gravity position and related static margin and stability considerations.

Referring in particular to FIG. 1(a) and FIG. 2(d), the first wing 221 comprises a first wing tip 221T, a first wing root 221R, a first wing leading edge 221L, a first wing trailing edge 221E, a first wing suction surface 221S and a first wing pressure surface 221P, and a first wing longitudinal axis 221LA1. The first wing 221 also has a first longitudinal length LL1, root to tip, in a direction parallel to first wing longitudinal axis 221LA1.

The second wing 222 comprises a second wing tip 222T, a second wing root 222R, a second wing leading edge 222L, a second wing trailing edge 222E, a second wing suction surface 222S and a second wing pressure surface 222P, and a second wing longitudinal axis 222LA2. The second wing 222 also has a second longitudinal length LL2, root to tip, in a direction parallel to second wing longitudinal axis 222LA2.

In at least this example, in the stowed configuration SC, the first wing 221 and the second wing 222 are in an overlying relationship such as to provide a compact arrangement with respect to the fuselage and minimize the overall dimensions of the air vehicle 100 in the stowed configuration. For example, such a compact form can be useful when the air vehicle 100 is to be accommodated in a fairing and/or when packaging the air vehicle for transport or storage.

In at least this example, in the deployed configuration DC, the first wing 221 and the second wing 222 are in a spatial relationship with respect to one another and to the fuselage 110 such as to enable the wings to interact with an airflow such as to thereby generate aerodynamic lift to enable aerodynamic flight for the air vehicle 100.

Referring again to FIGS. 1(a) to 2(d), in the stowed configuration SC, the first wing 221 and the second wing 222 are in overlying relationship, i.e., with respect to one another.

In such overlying relationship, and referring in particular to FIG. 1(a) and FIG. 2(a), at least a majority of a pressure surface 221P of the first wing 221 is facing the suction surface 222S of the second wing 222, and said first wing tip is spaced from said second wing tip by a first lateral spacing.

In such overlying relationship the first wing longitudinal axis 221LA1 and the second wing longitudinal axis 222LA2 are nominally parallel with one another—either actually parallel to one another, or close thereto, for example within ±10° to one another, or within ±15° to one another, or within ±20° to one another.

At least in this example, in the stowed configuration SC, the first wing 221 and the second wing 222 are configured in the aforesaid overlying relationship for being oriented with respect to the fuselage 110 such that the first wing longitudinal axis 221LA1 and the second wing longitudinal axis 222LA2 are each nominally parallel with the fuselage longitudinal axis LA.

Also as will become clearer herein, in the deployed configuration DC, the first wing 221 is oriented with respect to the fuselage 110 such that the first wing longitudinal axis 221LA1 is non-parallel, for example depending on the sweep angle orthogonal or at another suitable angle between 0° and 90°, with respect to the fuselage longitudinal axis LA. Furthermore, in the deployed configuration DC, the second wing 222 is oriented with respect to the fuselage 110 such that the second wing longitudinal axis 222LA2 is non-parallel, for example depending on the sweep angle orthogonal or at another suitable angle between 0° and 90°, with respect to the fuselage longitudinal axis LA.

For example, and referring for example to FIG. 2(d), in the stowed configuration SC, the first wing 221 and the second wing 222 are oriented with respect to the fuselage 110 such that the first wing longitudinal axis 221LA1 and the second wing longitudinal axis 222LA2 are each nominally parallel with the longitudinal axis LA of the fuselage 110.

In at least this example, in the deployed configuration DC, the first wing longitudinal axis 240LA1 and the second wing longitudinal axis 222LA2 are each nominally parallel with the pitch axis P of the air vehicle 100. However, in alternative variations of this example, in which the wings 220 can be anhedral or dihedral, and/or have non-zero sweep, the first wing longitudinal axis 240LA1 and the second wing longitudinal axis 222LA2 can each be non-parallel with the pitch axis P.

Referring in particular to FIG. 2(a) and FIG. 2(c), at least in this example, in the stowed configuration SC, the first wing 221 and the second wing 222 are configured in the aforesaid overlying relationship for being oriented with respect to the fuselage 110 such that the first wing tip 221T is spaced from the second wing tip 222T by a first spacing S1, while in the deployed configuration DC the wings are pivoted away from one another such that the first wing tip 221T is spaced from the second wing tip 222T by a second spacing S2, wherein the second spacing S2 is greater than the first spacing S1. In at least this example, the first spacing S1 is nominally zero, i.e., the first wing tip 221T is generally overlying the second wing tip 222T; furthermore, in at least in this example, the second spacing S2 corresponds to the span of the wings.

As mentioned above, the wing system 200 is configured for transitioning set of wings 210 between the stowed configuration SC and the deployed configuration DC. According to an aspect of the presently disclosed subject matter, the aforesaid transitioning comprises a pivoting operation, comprising:

pivoting the first wing 221 about the first pivot axis PA1 between the stowed configuration SC and the deployed configuration DC;

pivoting the second wing 222 about the second pivot axis PA2 between the stowed configuration SC and the deployed configuration DC.

Figure 3A:
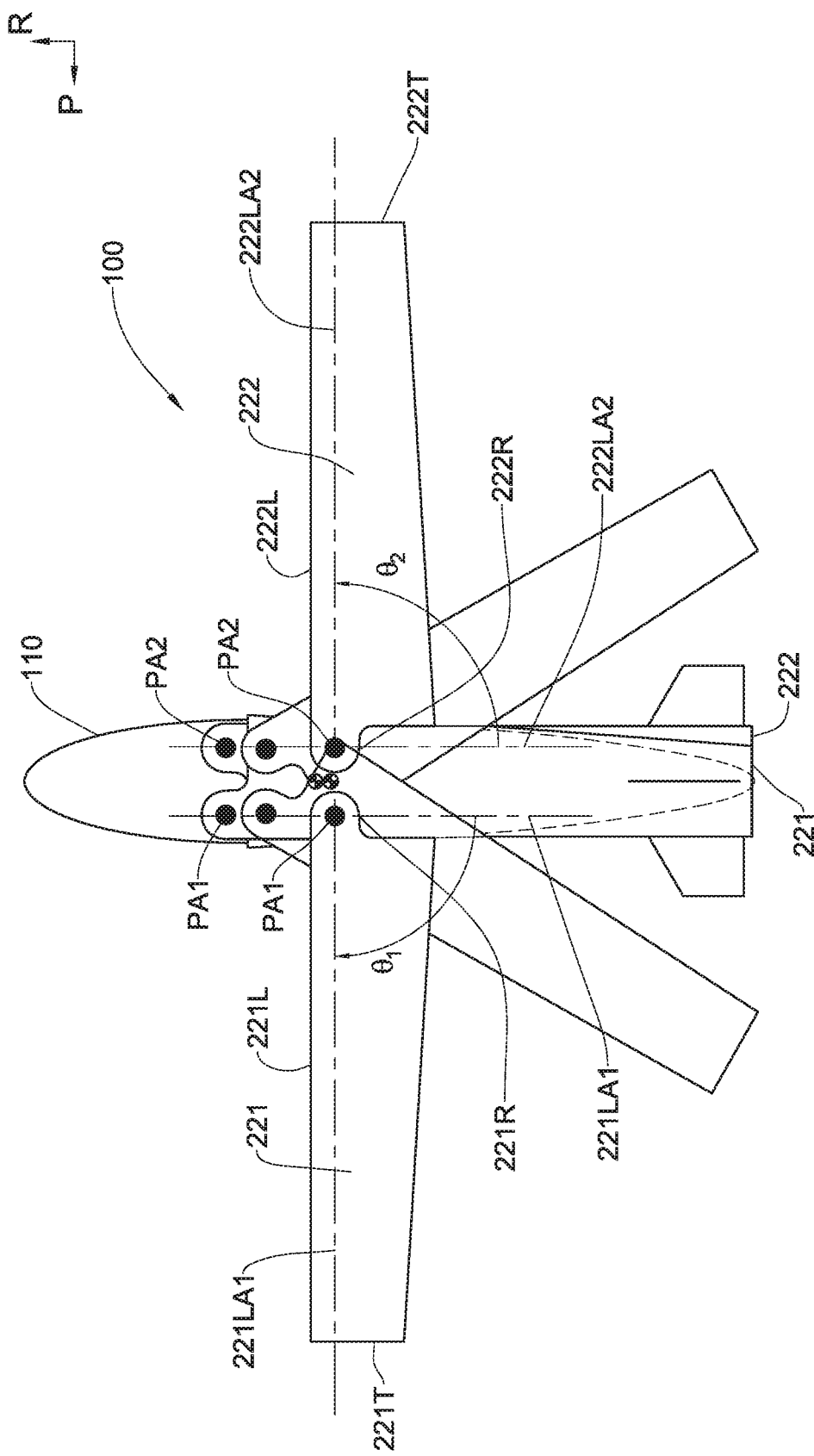
FIG. 3(a) schematically illustrates in composite top view the pivoting operation of the example of the air vehicle of FIG. 2(d)
Figure 3B:
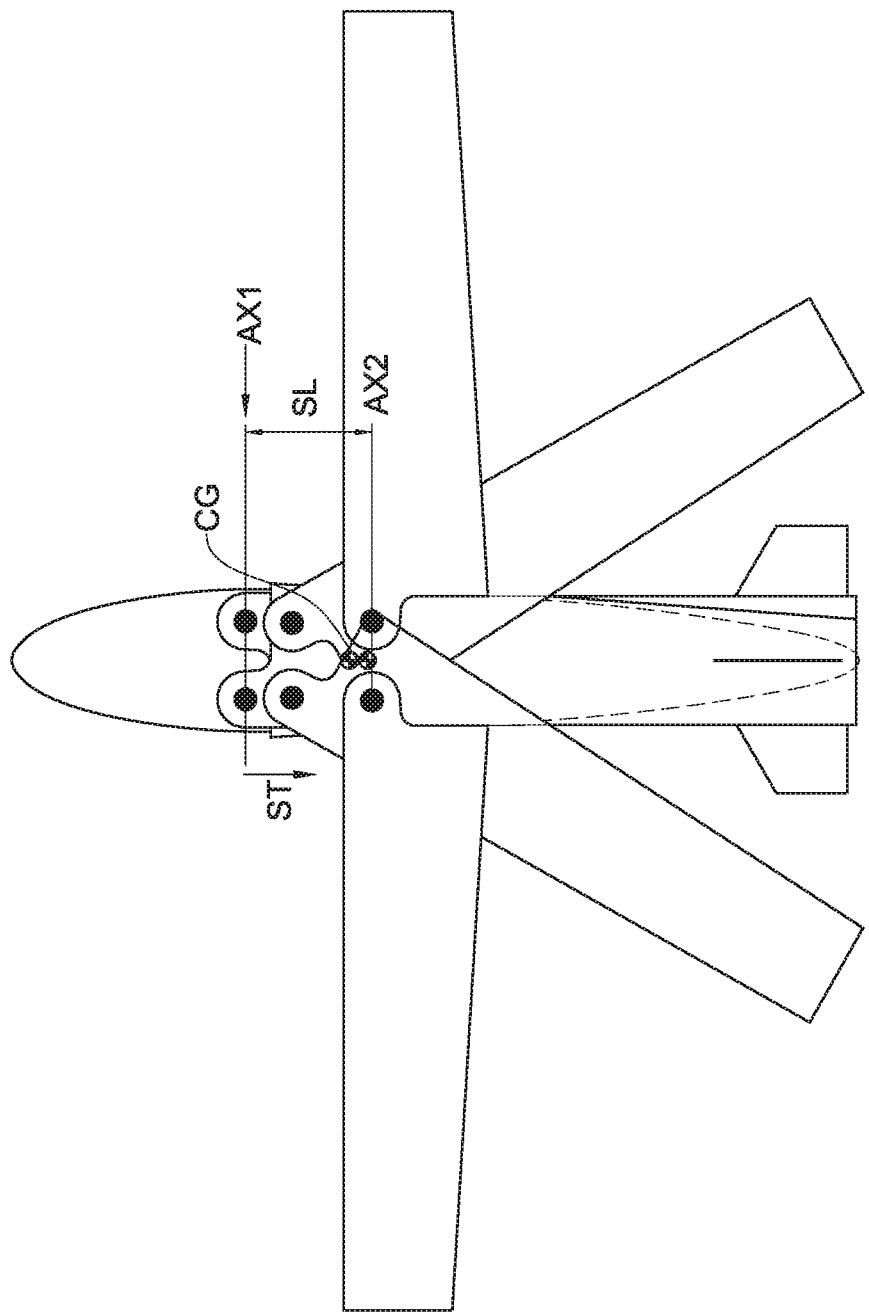
FIG. 3(b) schematically illustrates in composite top view the translation operation of the example of the air vehicle of FIG. 2(d).
Figure 4A:
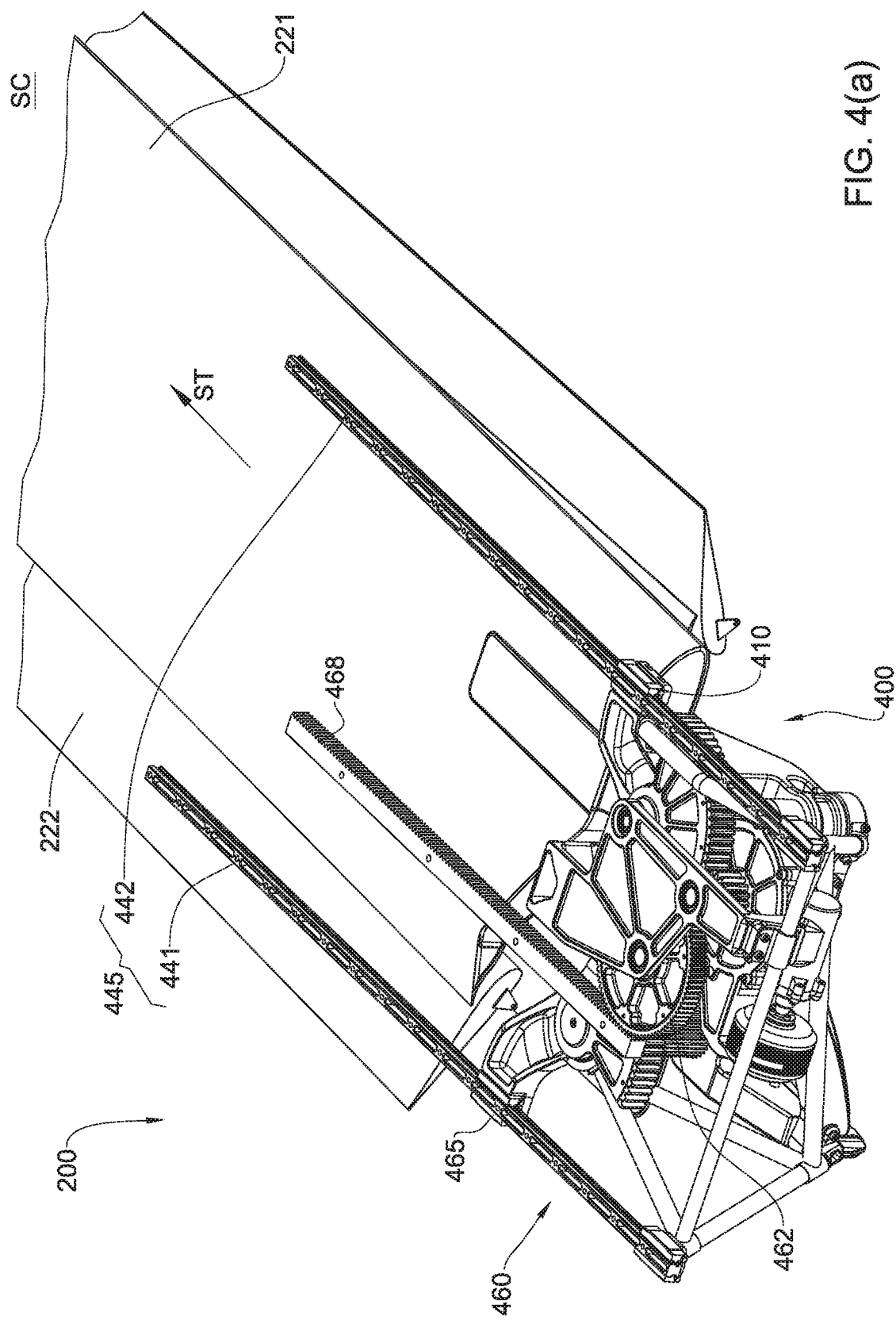
FIG. 4(a) shows in isometric top-front-side view, a deployment mechanism for a wing system according to a first example of the presently disclosed subject matter, wherein the wing system is in the stowed configuration.
Figure 4B:
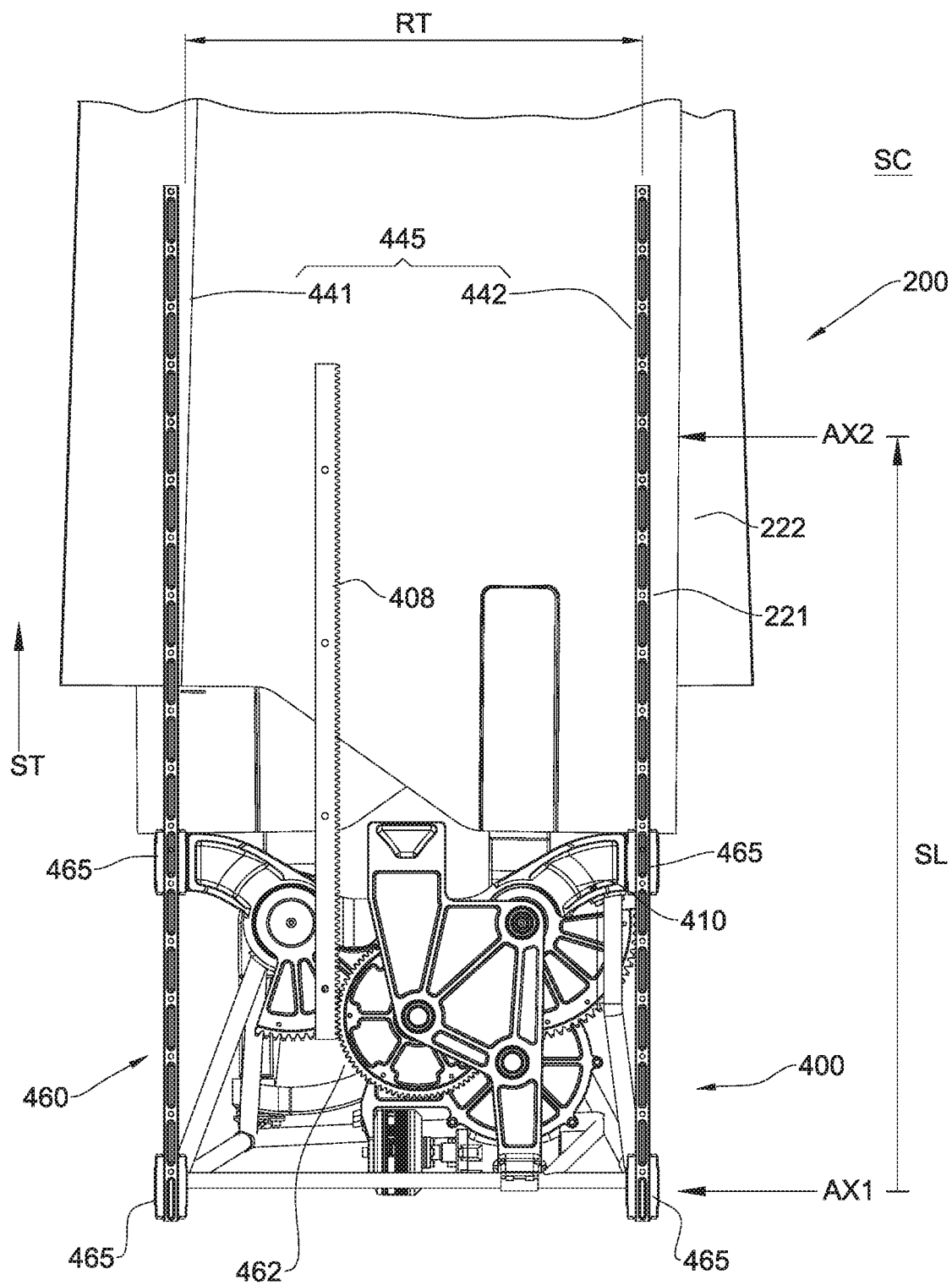
FIG. 4(b) shows in top view the example of the deployment mechanism of FIG. 4(a) in the stowed configuration.
Figure 4C:
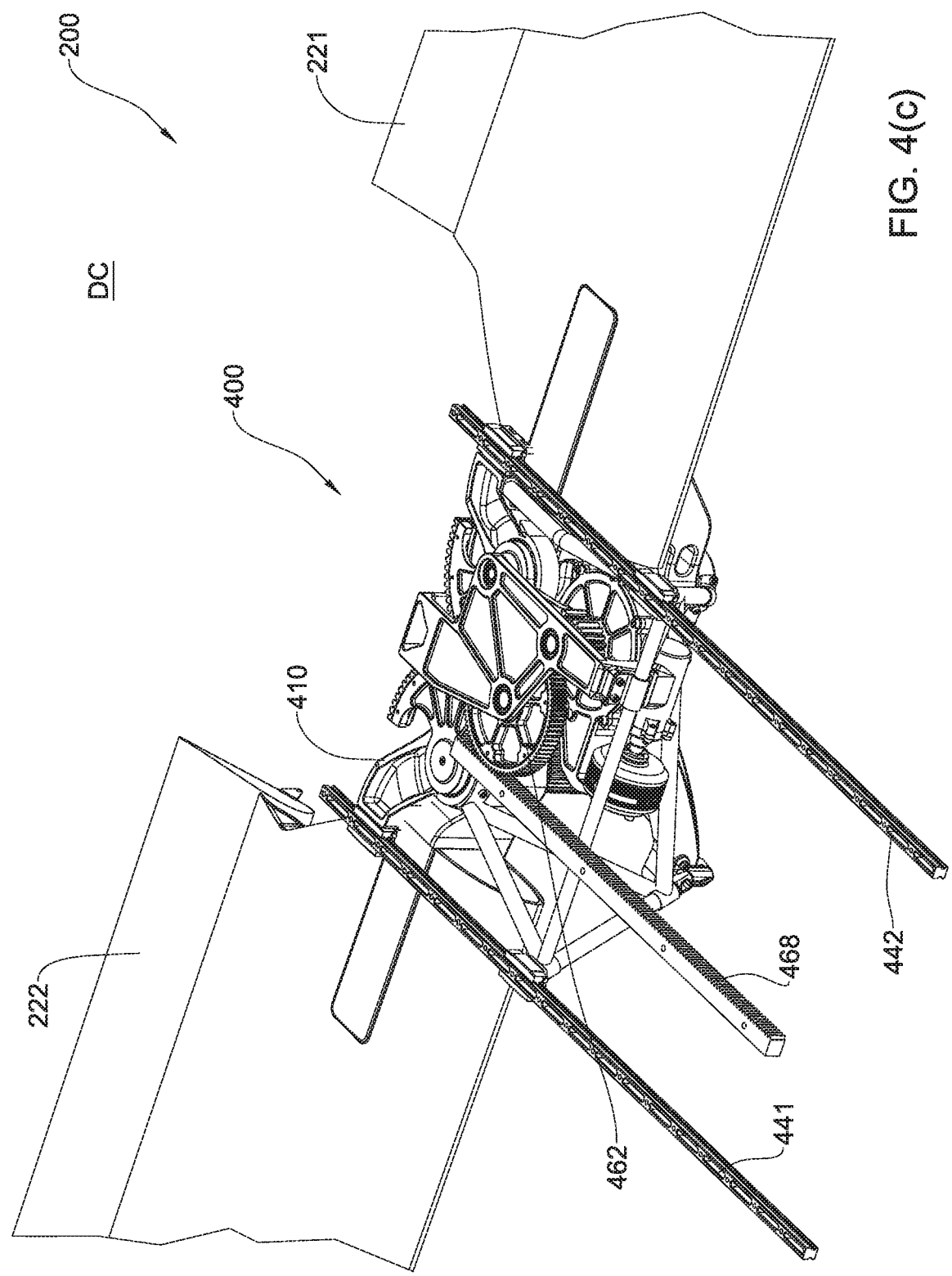
FIG. 4(c) shows in isometric top-front-side view, the example of the deployment mechanism of FIG. 4(a) in the deployed configuration.
Figure 4D:
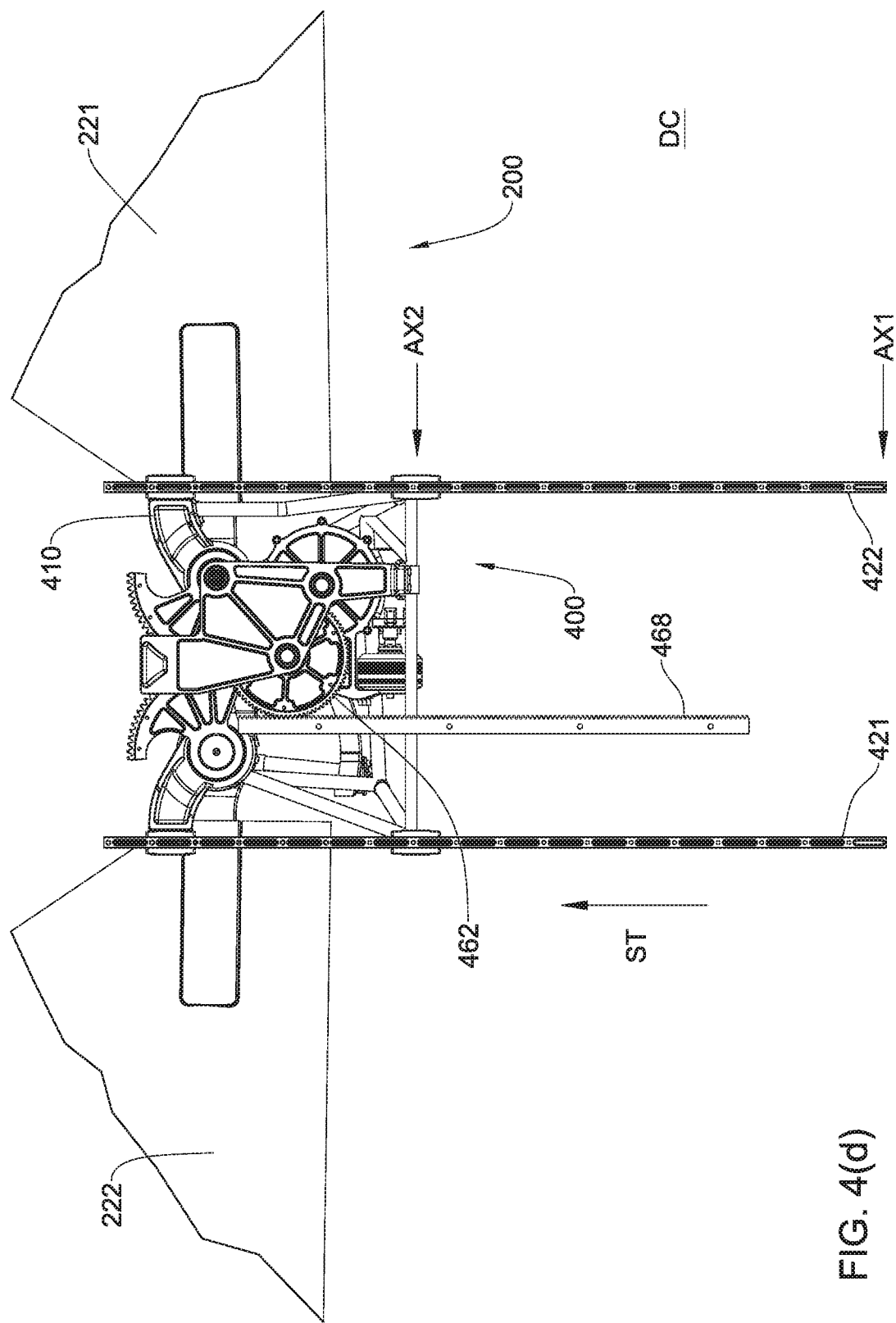
FIG. 4(d) shows in top view the example of the air vehicle of FIG. 4(c) in the deployed configuration.

In at least this example, and referring to FIG. 3, the wing system 200 is configured for pivoting the first wing 221 about the first pivot axis PA1, concurrently with pivoting the second wing 222 about the second pivot axis PA2. Furthermore, in transitioning between the stowed configuration SC and the deployed configuration DC via the pivoting operation:

the first wing 221 is pivoted about the first pivot axis PA1 by a non-zero first angular displacement $\theta_1$; and the second wing 222 is pivoted about the second pivot axis PA2 by a non-zero second angular displacement $\theta_2$.

It is to be noted that pivoting the first wing 221 about the first pivot axis PA1 by a non-zero first angular displacement $\theta_1$ essentially rotates the first wing 221 to project generally laterally from the fuselage 110, thereby orienting the first leading edge 221L towards the forward end of the air vehicle 100 and the first trailing edge 221E towards the aft end of the air vehicle 100, and concurrently essentially increases the spacing of the first wing tip 221T with respect to the fuselage 110, while concurrently the spacing of the first wing root 221R with respect to the fuselage 110 can remain unchanged, or changed by a much smaller amount.

Similarly, pivoting the second wing 222 about the second pivot axis PA2 by a non-zero second angular displacement $\theta_2$ essentially rotates the second wing 222 to project generally laterally from the fuselage 110, thereby orienting the second leading edge 222L towards the forward end of the air vehicle 100 and the second trailing edge 222E towards the aft end of the air vehicle 100, and concurrently essentially increases the spacing of the second wing tip 222T with respect to the fuselage 110, while concurrently the spacing of the second wing root 222R with respect to the fuselage 110 can remain unchanged, or changed by a much smaller amount.

In at least this example, the non-zero first angular displacement $\theta_1$ and the non-zero second angular displacement $\theta_2$ are equal in magnitude to one another, though they are in opposite rotational directions. For example, each one of the non-zero first angular displacement $\theta_1$ and the non-zero second angular displacement $\theta_2$ can be within any one of the following ranges: 35° to 155°; 35° to 100°; 35° to 90°; 45° to 90°; 60° to 90°; 75° to 90°. For example, each one of the non-zero first angular displacement $\theta_1$ and the non-zero second angular displacement $\theta_2$ can be any one of the following angles: 35°, 40°, 45°, 50°, 60°, 75°, 90°, 110°, 120°, 130°, 140°, 155°°.

In particular, the wing system 200 in at least this example is configured for synchronizing the pivoting operation, such that the following two pivoting motions of the wings 221, 222 are synchronized with one another, and thus are synchronized to so that the wings 221, 222 start pivoting together and finish pivoting together:

pivoting the first wing 221 about the first pivot axis PA1 between the stowed configuration SC and the deployed configuration DC;

pivoting the second wing 222 about the second pivot axis PA2 between the stowed configuration SC and the deployed configuration DC As will become clearer below, and referring in particular to FIGS. 1(a) and 1(b), the wing system 200 in at least this example is configured for providing a levelling operation configured for levelling the first wing 221 and the second wing 222 with respect to one another from the overlying relationship in the stowed configuration SC, to a leveled relationship in the deployed configuration DC. Thus, prior to the levelling operation (FIG. 1(*a*)), and in the stowed configuration SC, the first wing 221 and the second wing 222 are at different positions along a direction parallel to the yaw axis Y of the air vehicle 100. On the other hand after the levelling operation is completed (FIG. 1(*b*)), and in the deployed configuration DC, the first wing 221 and the second wing 222 are at the same position along a direction parallel to the yaw axis Y of the air vehicle 100.

In at least this example, and as will become clearer herein, the levelling operation is configured for translating the second wing 222 (in this example in an upwards direction) to the level of the first wing 221, which remains at the location along a direction parallel to the yaw axis Y while pivoting between the stowed configuration SC and the deployed configuration DC. However in alternative variations of this example, and in other examples, the levelling operation can instead be configured for translating the first wing 221 (for example in a downward direction) to the level of the second wing 222, which remains at the location along a direction parallel to the yaw axis Y while pivoting between the stowed configuration SC and the deployed configuration DC. In yet other alternative variations of this example, and in other examples, the levelling operation can instead be configured for translating both the first wing 221 and the second wing 222, to a common location along a direction parallel to the yaw axis Y while pivoting between the stowed configuration SC and the deployed configuration DC, such a location being different from the original corresponding locations of the first wing 221 and the second wing 222 at the stowed configuration SC.

In at least this example, and as will become clearer herein, the wing system 200 is configured for providing the aforesaid levelling operation concurrent with the aforesaid transitioning between the stowed configuration SC and the deployed configuration DC. In particular, the wing system 200 in at least this example is configured for proving the levelling operation concurrent with the pivoting operation. In particular, the wing system 200 in at least this example is configured for synchronizing the levelling operation with the pivoting operation.

Referring in particular to FIG. 3(*b*). in at least this example, and as will become clearer herein, the wing system 200 is also configured for providing a translation operation configured for selectively translating the first wing 221 and the second wing 222 along a stroke direction ST through a stroke length SL, between a first axial position AX1 corresponding to the stowed configuration SC, and a second axial position AX2 corresponding to the deployed configuration DC.

In at least this example, and as will become clearer herein, the stroke direction ST is in the aft direction with respect to the air vehicle 100. Thus, the first axial position AX1 forward of the second axial position AX2. In alternative variations of this example, the stroke direction can be in the forward direction, for example in examples in which the deployment mechanism is configured for translating the wing system from an aft portion of the air vehicle to a forward portion of the air vehicle.

In at least this example, and as will become clearer herein, the wing system 200 is configured for providing the aforesaid translation operation concurrent with the aforesaid transitioning between SC and the deployed configuration DC. In particular, the wing system 200 in at least this example is configured for providing the aforesaid translation operation concurrent with the aforesaid pivoting operation. In particular, the wing system 200 in at least this example is configured for synchronizing the aforesaid translation operation with the aforesaid pivoting operation.

It is to be noted that by providing translation operation and the aforesaid pivoting operation, it is possible to maximize the first longitudinal length LL1 and second longitudinal length LL2, respectively of the first wing 221 and the second wing 222 with respect to the fuselage length FL, while at the same time ensuring that the neutral point of the air vehicle remains at an axial position with respect to the center of gravity CG consistent with the desired static stability of the air vehicle. For example, the transition operation shift the wings aft, and thus the neutral point of the configuration can be close to or aft of the center of gravity to provide required static margin.

As is known in the art, aircraft stability is maintained when the location of the neutral point is aft of the aircraft center of mass, for example by 10%, 15% 20% of mean aerodynamic chord of the wings 220.

In at least this example, the first longitudinal length LL1 and second longitudinal length LL2, respectively of the first wing 221 and the second wing 222, are each in the range of 70% to 90% of the fuselage length FL.

In alternative variations of this example, the first longitudinal length LL1 and second longitudinal length LL2 can each be equal to or greater than the fuselage length FL. In examples in which the first longitudinal length LL1 and second longitudinal length LL2 are each greater than the fuselage length FL, the aircraft packaging volume in the stowed configuration SC can be greater than the fuselage volume of the fuselage 110; nevertheless, it is considered that such a configuration for the air vehicle provides a reduced overall volume as compared with configurations in which the wings cannot be translated along the fuselage axis or as compared with configurations in which the wings must be stowed one besides the other, thereby still providing maximal use of the available volume for enclosing the air vehicle in the stowed configuration—for example inside the aforementioned fairing.

In yet other alternative variations of this example, the first longitudinal length LL1 and second longitudinal length LL2 can each be much less than the fuselage length F, for example less than 70% of the fuselage length FL.

Referring in particular to FIG. 2(*a*), FIG. 2(*b*), FIG. 2(*c*), and FIG. 2(*d*), the wing system 200 further comprises a deployment system 400 configured for selectively transitioning the wing system 200, in particular the set of wings 210, and the first wing 221 and the second wing 222, between the stowed configuration SC and the deployed configuration DC, in particular from the stowed configuration SC to the deployed configuration DC. The deployment system 400 can be operatively connected to the controller to enable the controller to operate the deployment system 400 and in particular thereby cause the deployment system 400 to transition the wing system 200 between the stowed configuration SC and the deployed configuration DC, in particular from the stowed configuration SC to the deployed configuration DC, and optionally back from the deployed configuration DC to the stowed configuration SC.

Figure 5:
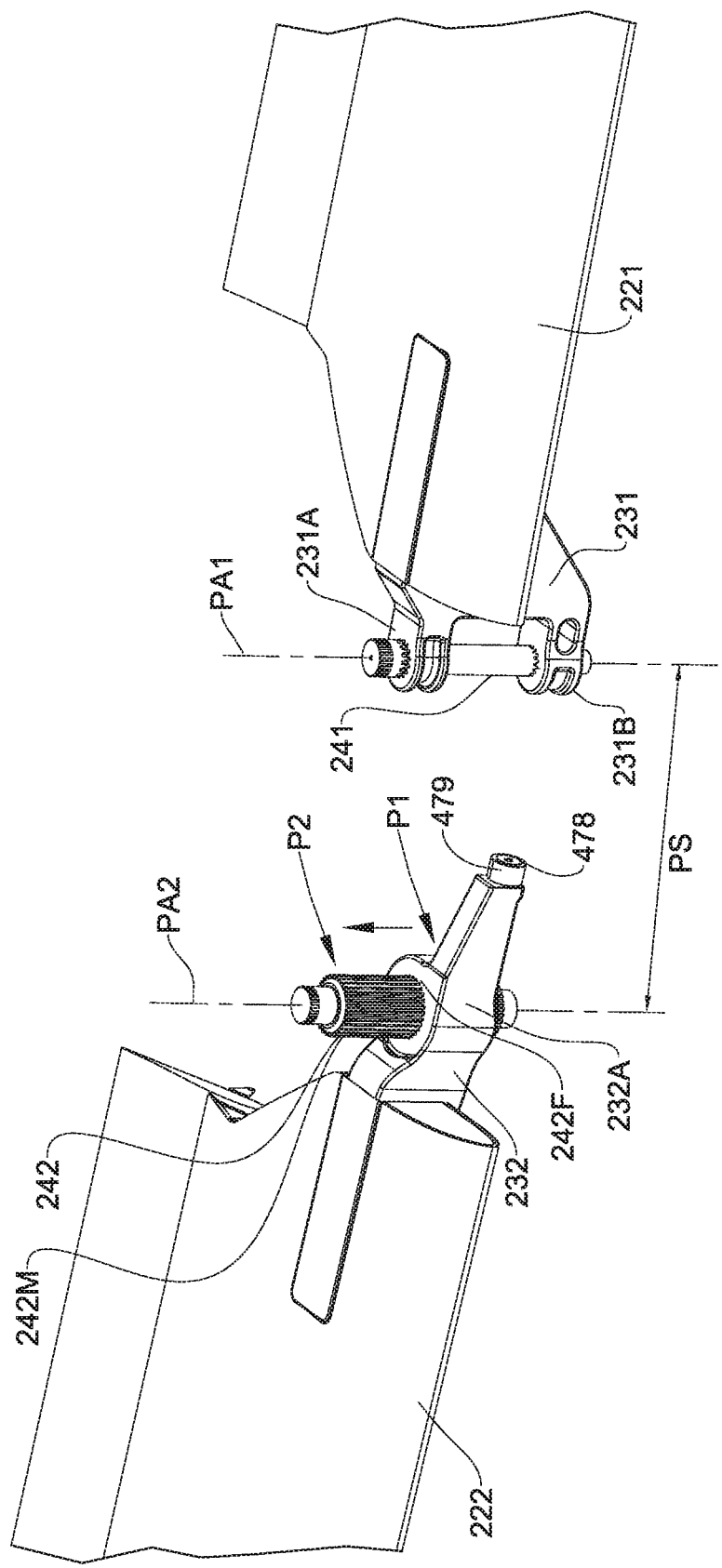
FIG. 5 shows in isometric top-front-side view, part of the deployment mechanism and part of the wings of the example of FIGS. 4(a) to 4(d), in the deployed configuration.

Referring in particular to FIG. 5, the first wing 221 comprises a first pivot shaft 241 coaxial with the first pivot axis PA1, and the second wing comprises a second pivot shaft 242 coaxial with the second pivot axis PA2. The first pivot shaft 241 and the second pivot shaft 242 can be considered to be part of the deployment system 400.

The first wing 221 is fixedly mounted to the first shaft 241. For example, the first wing 221 comprises a first shaft bracket 231 fixedly connected to the first wing 221, for example at a location to minimize torsion loads on the first shaft 241. Such a first shaft bracket 231 can be in the form of a wing root joiner or a wing root fitting.

For example such a location can be at or near to the main spar of the first wing 221, for example in examples where the first wing 221 is constructed with such a main spar. In these or other examples, for example, such a location can be at a chordwise position along the chord of the first wing 221 at or near the first wing root 221R, i.e., of the root chord, from the leading edge thereof. For example such a chordwise position can be about 25% of the root chord and/or about 1% to 2% of the root chord forward of the aerodynamic center of the first wing 221 (for example about 1% to 2% of the root chord forward of the aerodynamic center of the first wing root 221R). The first shaft bracket 231 has two spaced projections 231A, 231B to which the first shaft 241 is affixed.

The second wing 222 is movably mounted to the second shaft 242. For example, the second wing 222 comprises a second shaft bracket 232 fixedly connected to the second wing 222, for example at a location to minimize torsion loads on the first shaft 241. Such a second shaft bracket 241 can be in the form of a wing root joiner or a wing root fitting.

For example such a location can be at or near to the main spar of the second wing 222, for example in examples where the second wing 222 is constructed with such a main spar. In these or other examples, for example, such a location can be at a chordwise position along the chord of the second wing 222 at or near the second wing root 222R, i.e., of the root chord, from the leading edge thereof. For example such a chordwise position can be about 25% of the root chord and/or about 1% to 2% of the root chord forward of the aerodynamic center of the second wing 222 (for example about 1% to 2% of the root chord forward of the aerodynamic center of the second wing root 222R). The second shaft bracket 232 has a projection 232A to which the second shaft 242 is movably mounted.

In particular, the second wing 222 is movably mounted to the second shaft 242 with respect to one degree of freedom in translation parallel to the second pivot axis PA2. In other words, while the second wing 222 is mounted to the second shaft 242, the second wing 222 can nevertheless move in translation with respect to the second shaft 242 in a direction parallel to the second pivot axis PA2, between a first position P1 corresponding to the stowed configuration SC, and a second position P2 corresponding to the deployed configuration DC, while concurrently transfer torque between the second wing 222 and the second shaft 242.

The first pivot shaft 241 and the second pivot shaft 242 are configured for supporting loads from the first wing 221 and the second wing 222, including the bending moment of the respective wing, the twisting (pitching) moment of the respective wing, the shear forces of the respective wing, and the torque required to deploy the respective wing and keep the respective wing in deployed position corresponding to the deployed configuration DC.

In at least this example, the deployment mechanism 400 comprises a spline arrangement, and thus the second shaft 242 is in the form of, or comprises, a male spline shaft 242M. The second wing 222 is movably mounted to the second shaft 242 via a female spline coupling spline coupling 242F complementary to the male spline shaft 242M.

The engaged splines between the female spline coupling 242F and the male spline shaft 242M enable rotational movement of the male spline shaft 242M to be transmitted to the second wing 222 via the female spline coupling 242F. At the same time, the engaged splines between the female spline coupling 242F and the male spline shaft 242M allow relative translation between the female spline coupling 242F and the male spline shaft 242M along a direction parallel to the second pivot axis PA2, and thus relative translation between the second wing 222 and the second shaft 242 along a direction parallel to the second pivot axis PA2.

In at least some alternative variations of this example, the spline arrangement can be replaced with a machine key arrangement. Such a machine key can also transfer torque in the coupling while still allowing axial movement of the female part of the key with respect to the male part of the key.

Thus, the first pivot shaft 241 is located at or near the first wing root 221R, and the second pivot shaft 242 is located at or near the second wing root 222R.

Figure 6B:
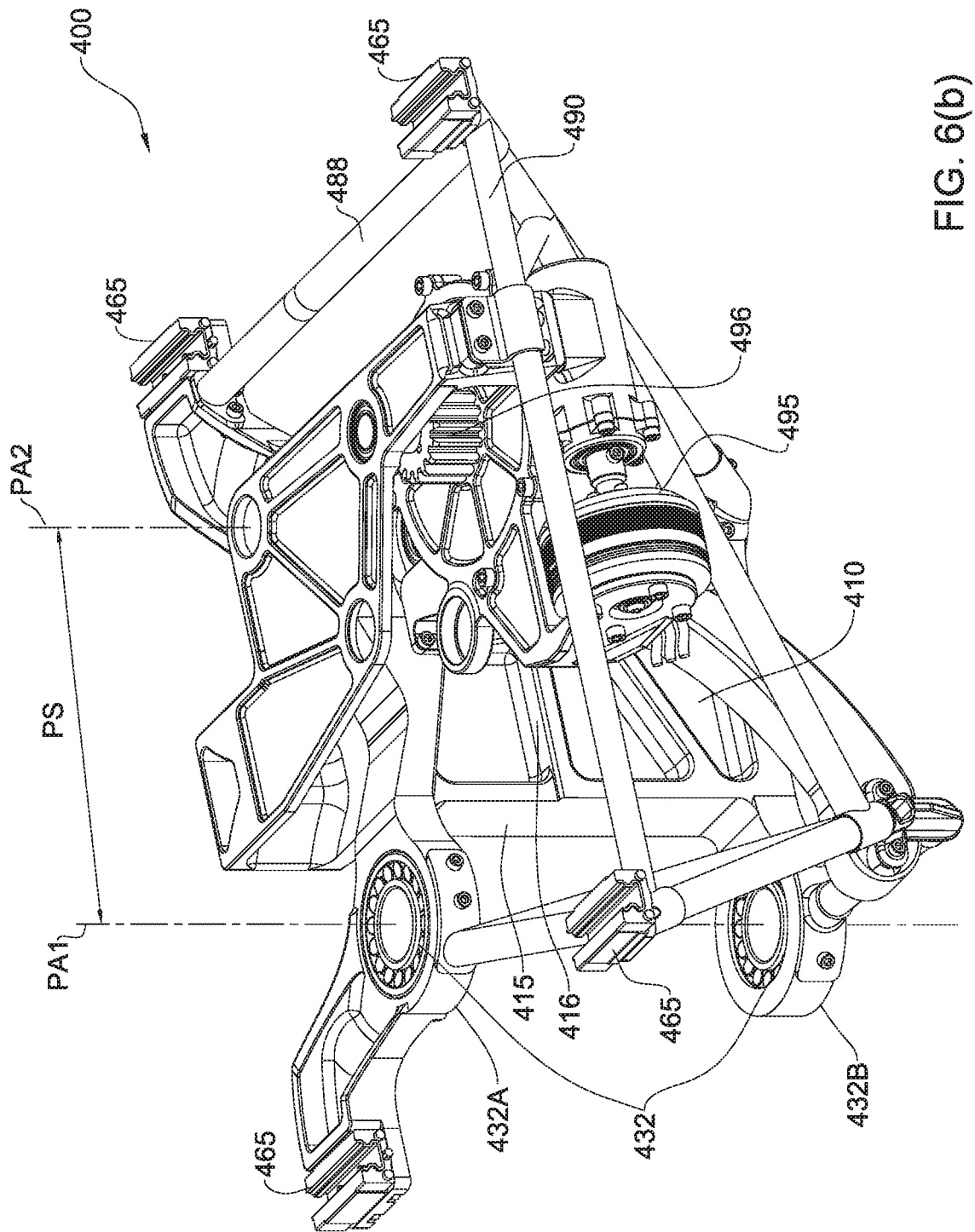
FIG. 6(b) shows in isometric top-front-side view, part of the deployment mechanism of the example of FIGS. 4(a) to 4(d).
Figure 7A:
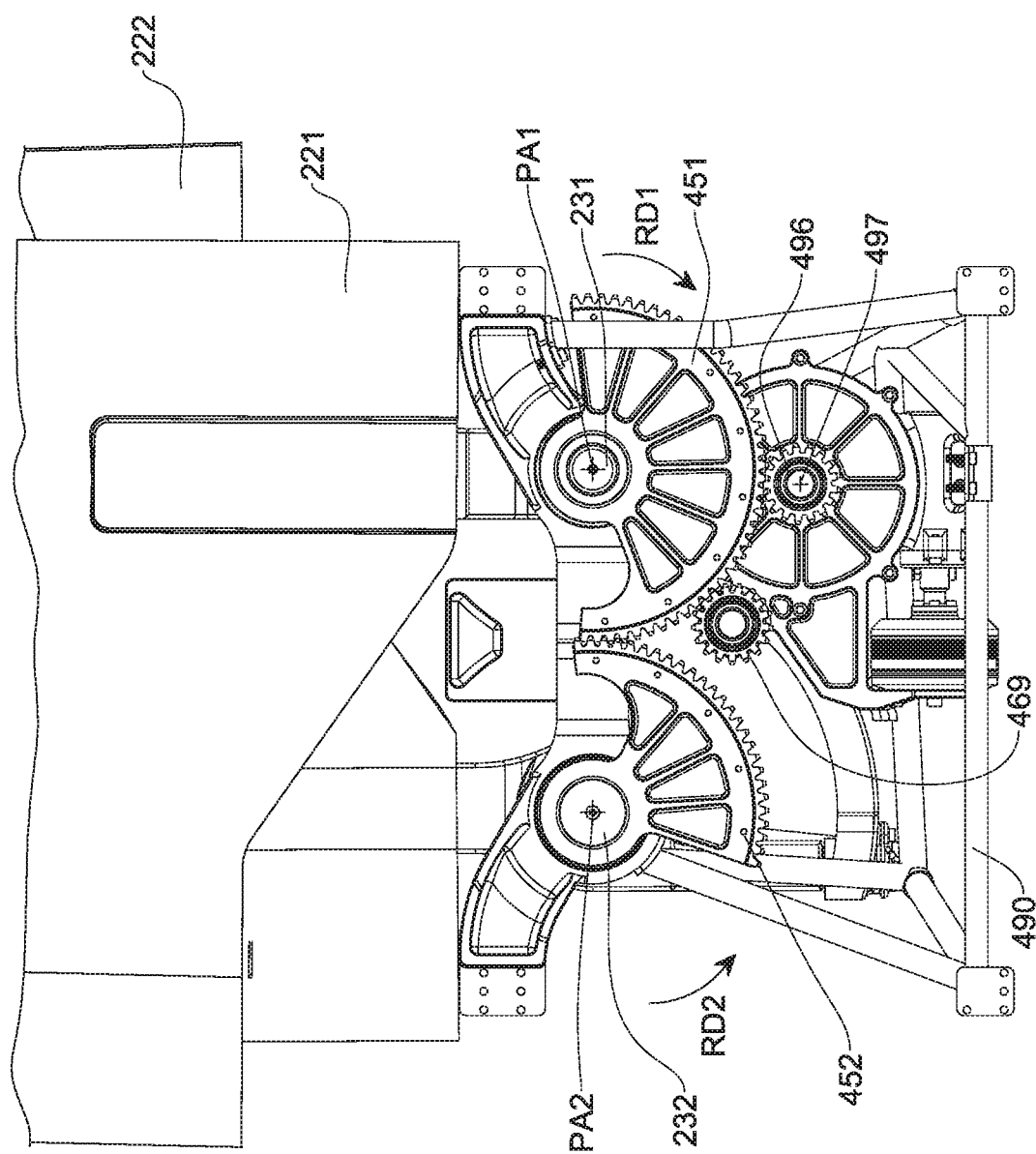
FIG. 7(a) shows in top view, part of the deployment mechanism and part of the wings of the example of FIGS. 4(a) to 4(d), in the stowed configuration.
Figure 7B:
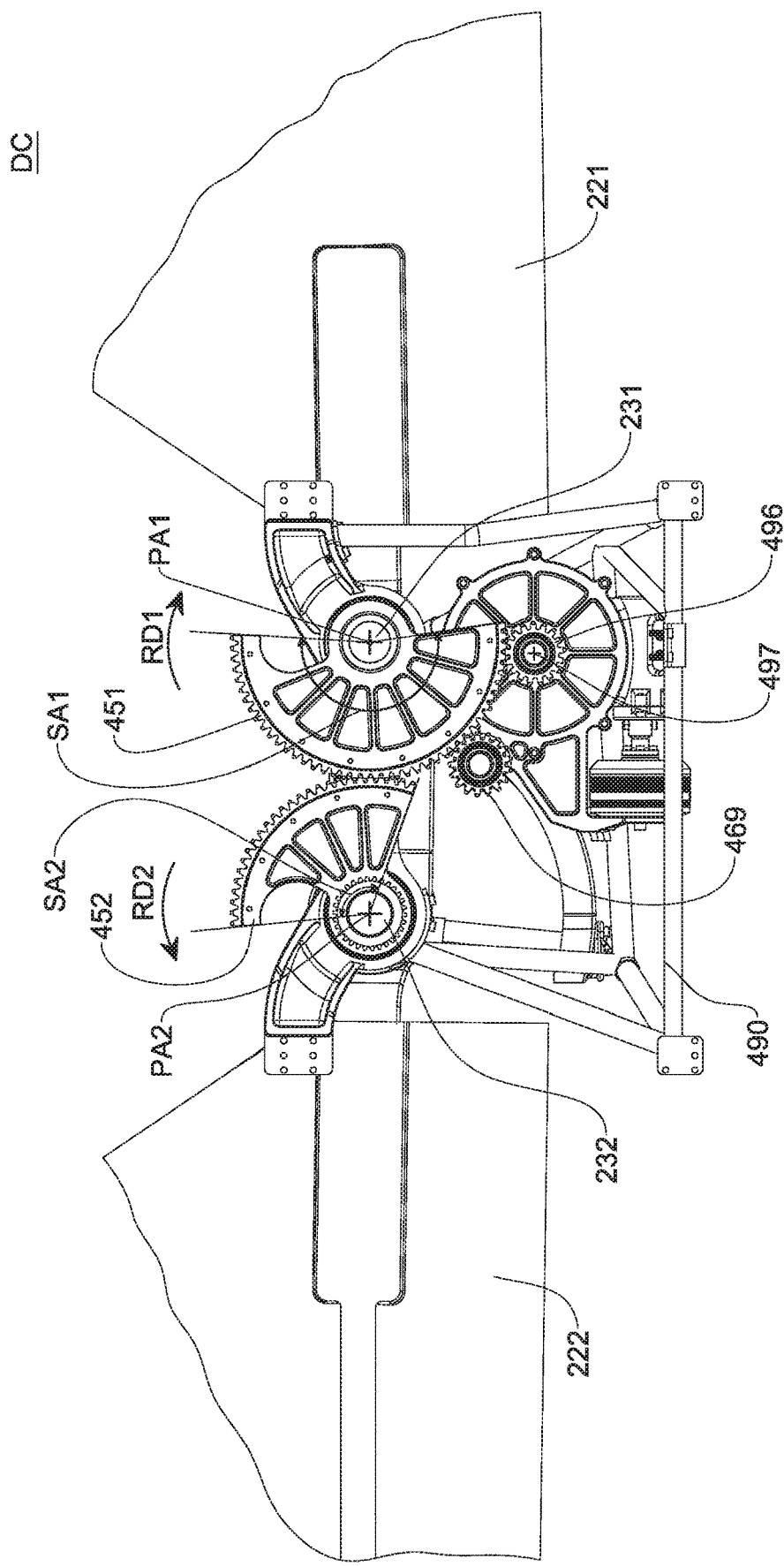
FIG. 7(b) shows in top view, part of the deployment mechanism and part of the wings of the example of FIGS. 4(a) to 4(d), in the deployed configuration.

Referring in particular to FIG. 6(*a*) and FIG. 6(*b*), the deployment mechanism 400 comprises a load bearing bulkhead 410. The first wing 221 is pivotably mounted to the load bearing bulkhead 410 via the first pivot shaft 241, while the second wing 222 is pivotably mounted to the load bearing bulkhead 410 via the second pivot shaft 242, as best seen in FIG. 7(*a*) and FIG. 7(*b*). The load bearing bulkhead 410 is a structural member capable of bearing loads from the first wing 221 and the second wing 222 during flight of the air vehicle 100, and for supporting the wing system 200 in the stowed configuration SC, in the deployed confutation DC, and throughout the transition between the stowed configuration SC and the deployed confutation DC. In at least this example, the load bearing bulkhead 410 comprises a load bearing central section 415. In at least this example, the central section 415 is of general I-beam construction, including a upper and lower flanges 417 spaced by web 416, and stiffener elements 418.

Without being bound by theory, inventors consider that load bearing bulkhead 410 supports wing bending moments and wing shear forces, thereby operating as a central load bearing member which, in the deployed configuration DC, provides contiguity between the first wing 221 and the second wing 222, to essentially form a continuous wing spar or the like which spans from the first wing tip 221T to the second wing 222T. The inventors further consider that such a configuration can minimize or prevent exposure of the air vehicle fuselage with respect to potentially harmful bending and twisting moments which can be generated by the wings during flight. In other words, if the port and starboard wings, in particular the port and starboard wing spars, are instead connected directly to the fuselage rather than to the load bearing bulkhead, the fuselage would be exposed to very high bending and twisting moments. In the above examples in which the wings are coupled to a load bearing bulkhead which are together translated along the fuselage longitudinal axis, such a configuration can essentially provide weight savings by being able to allow omitting additional load bearing structures in the fuselage to enable the fuselage to support the wings bending and twisting moments along the fuselage area in which the wings are translated. The inventors further consider that such a configuration can generate very low loads in the interface between the fuselage and the wings.

The load bearing bulkhead 410 further comprises a first bearing arrangement 431 fixed to one lateral side of the central section 415 via first bracket projections 431A, 431B, in which the bearing arrangement 431 has a plurality of spaced bearings aligned with the first pivot axis PA1. The load bearing bulkhead 410 also comprises a second bearing arrangement 432 fixed to the other lateral side of the central section 415 via second bracket projections 432A, 432B, in which the bearing arrangement 432 has a plurality of spaced bearings aligned with the second pivot axis PA2. The load bearing bulkhead 410 is dimensioned such as to provide the aforementioned spacing PS between the first pivot axis PA1 and the second pivot axis PA2. In some examples such bearings can be ball bearing arrangements or the like, while in other examples, such bearings can be in the from of sleeves or bushes.

The first shaft 241 is rotatably mounted to the load bearing bulkhead 410 via the bearings of the first bearing arrangement 431, enabling pivoting of the first wing 221 with respect to the load bearing bulkhead 410 about the first pivot axis PA1.

The second shaft 242, in particular the male spline shaft 242M, is rotatably mounted to the load bearing bulkhead 410 via the bearings of the second bearing arrangement 432, enabling pivoting of the second wing 222 with respect to the load bearing bulkhead 410 about the second pivot axis PA2, via the female spline coupling 242F.

The deployment mechanism 400 in at least this example is configured for providing, in the aforesaid pivoting operation, a pivoting synchronization operation with respect to the pivoting about the first pivot axis PA1 and the second pivot axis PA2. In such a pivoting synchronization operation, pivoting of the first wing 221 about the first pivot axis PA1 in a first rotational direction RD1 is synchronized with pivoting of the second wing 222 about the second pivot axis PA1 in a second rotational direction RD2, opposite to said first rotational direction RD1. Accordingly, and referring again to FIG. 7(*a*) and FIG. 7(*b*), the deployment mechanism 400 comprises a meshed gear arrangement 450 for providing the aforesaid synchronization operation.

Without being bound by theory, inventors consider that such synchronization ensures or at least enhances stabilization of the air vehicle during transitioning of the wing system 200 between the stowed configuration SC and the deployed configuration DC. Furthermore, such synchronization complies with at least some regulatory standards.

The meshed gear arrangement 450 comprises a first gear wheel 451 and a second gear wheel 452.

The first gear wheel 451 is fixedly mounted to the first pivot shaft 231 and co-axial with the first pivot axis PA1. While in at least this example, first gear wheel 451 is in the form of a spur gear, with radially projecting straight-cut teeth, in alternative variations of this example, the first gear wheel 451 can have any other suitable teeth arrangement, for example helical teeth or herringbone teeth.

The second gear wheel 452 is fixedly mounted to the second pivot shaft 232 and co-axial with the second pivot axis PA2. While in at least this example, second gear wheel 452 is in the form of a spur gear, with radially projecting straight-cut teeth, in alternative variations of this example, the second gear wheel 452 can have any other suitable teeth arrangement, for example helical teeth or herringbone teeth.

The first gear wheel 451 is meshed directly with respect to the second gear wheel 452, and thus have similar types of teeth arrangement. Thus, for example, as the first gear wheel 451 is turned or otherwise pivoted about the first pivot axis PA1 in one rotational direction, for example rotational direction RD1, the second gear wheel 452 is automatically turned or otherwise pivoted about the second pivot axis PA2 in the other rotational direction, for example rotational direction RD2, and vice versa.

The deployment mechanism 400 further comprises a support structure 488, in at least this example in the form of frame 490, for supporting and facilitating mounting of the deployment mechanism 400 with respect to load bearing bulkhead 410.

The deployment mechanism 400 comprises an actuator 495 configured for selectively driving operation of the deployment mechanism 400. The actuator 495 is configured for selectively providing a torque to at least one of the first gear wheel 451 and the second gear wheel 452 to drive the meshed gear arrangement 450, to thereby provide the synchronization operation, as well as driving the pivoting operation per se.

In at least this example, the actuator 495 is configured for driving the deployment mechanism 400 to enable the wing system 200 to reversibly transition from the stowed configuration SC to the deployed confutation DC, and thus to also enable the wing system 200 to transition from the deployed confutation DC to the stowed configuration SC. Such a transitioning from the deployed confutation DC to the stowed configuration SC can be useful when for example when it is desired to land the air vehicle 100 in implementation of this and other examples in which the air vehicle lacks a landing gear or in which the landing gear can be malfunctioning or damaged. In such cases, landing the air vehicle with the wing system in the stowed configuration SC can potentially minimize impact damage to the air vehicle 100 and to the wing system 200 in particular. For example, the air vehicle 100 can be further configured with a deployable parachute and/or air cushion to further potentially minimize impact damage to the air vehicle 100 or to the wing system 200 in particular during landing.

In at least this example, the actuator 495 comprises a motor, for example an electrical motor, operatively coupled to the meshed gear arrangement 450. However, in alternative variations of this example, the actuator 495 can comprise any other suitable actuator, for example a linear actuator, a rotary actuator, a loaded spring, pyro-technique device, a parachute, or any other type of device or system that is configured for providing the energy needed for the deployment mechanism 400 to enable the wing system 200 to (optionally reversibly) transition from the stowed configuration SC to the deployed confutation DC. For example, the actuator 495 is operatively coupled to the meshed gear arrangement 450, via a worm and gear transmission or helical screw transmission.

In at least this example, the actuator 495 is operatively coupled to the controller, so that the controller thereby selectively operates the deployment mechanism 400 to transition between the stowed configuration SC and the deployed confutation DC.

In at least this example, the actuator 495 is operatively coupled to the meshed gear arrangement 450 to enable selectively driving the deployment mechanism 400, and further comprises a self-lock device to ensure that the meshed gear arrangement 450, and thus the deployment mechanism 400, is locked at any given position, regardless if the motor is energized or not, so long as the actuator 495 is not driving the meshed gear arrangement 450. In other words, the meshed gear arrangement 450, and thus the deployment mechanism 400, is locked at any given position and can only be moved out of the position by the rotation of the motor or actuator 495.

For example, such shallow-pitch worm-gear transmissions and shallow-pitch screw (linear) transmissions are characterized by the fact that they can only be moved by the input shafts but they cannot be moved by their output shafts. In this example, such an input shaft is connected to the actuator 495 (which is for example in the form of a motor) while such output shaft is essentially connected (for example via the meshed gear arrangement 450) to the wings 221, 222. Thus any force generated by or applied to the wings 221, 222 cannot cause rotation about the respective pivot axes because the transmission is locked for any movement originating from the output shaft.

Such "self-lock" characteristics are enhanced when the coupling is via a screw with very shallow pitch (for example via a worm gear with very shallow pitch).

In at least this example, the actuator 495 is operatively coupled to a motor gear wheel 496, for example directly or via any suitable gear arrangement. The motor gear wheel 496 is meshed with at least one of the first gear wheel 451 and the second gear wheel 452 to drive the meshed gear arrangement 450, to thereby provide the aforesaid synchronization operation. While in this example the motor gear wheel 496 is meshed with the first gear wheel 451, in alternative variations of this example the motor gear wheel 496 can instead be meshed with the second gear wheel 452, mutatis mutandis Thus, as the actuator 495 selectively drives and turns the motor gear wheel 496, the motor gear wheel 496 turns the first gear wheel 451 which is thus pivoted about the first pivot axis PA1 in one rotational direction, for example rotational direction RD1. Concurrently the first gear wheel 451 turns the second gear wheel 452 which is thus pivoted about the second pivot axis PA2 in the other rotational direction, for example rotational direction RD2, thereby providing the aforesaid pivoting operation and the aforesaid synchronization operation.

It is to be noted that the deployment arrangement 400 is configured for pivoting the first gear wheel 451 (and thus the first shaft 241 and the first wing 221) about the first pivot axis PA1 by the non-zero first angular displacement $\theta_1$, and for pivoting the second gear wheel 452 (and thus the second shaft 242 and the second wing 222) about the second pivot axis PA2 by the non-zero second angular displacement $\theta_2$. In at least this example, the non-zero first angular displacement $\theta_1$ and the non-zero second angular displacement $\theta_2$ are equal in magnitude to one another (although in mutually opposite rotational directions), and thus the first gear wheel 451 and the second gear wheel 452 have the same diameter, in particular at least the same pitch diameter.

It is further to be noted that the deployment arrangement 400 is configured for limiting pivoting the first gear wheel 451 (and thus the first shaft 241 and the first wing 221) about the first pivot axis PA1 by the non-zero first angular displacement $\theta_1$, and for limiting pivoting the second gear wheel 452 (and thus the second shaft 242 and the second wing 222) about the second pivot axis PA2 by the non-zero second angular displacement $\theta_2$. For such limiting, the deployment arrangement 400 can comprise suitable mechanism for so doing, for example a mechanical stop can be provided.

In at least this example, the motor gear wheel 496 is in the form of a pinion having a diameter smaller than the diameter of the first gear wheel 451 or of the second gear wheel 452.

It is further to be noted that at least in this example, the first gear wheel 451 and the second gear wheel 452 are each in the form of a respective sector gear, in which each such respective sector gear is in the form of a portion of a full gear wheel, including the central opening (via which it is connected to the respective first shaft 231 or second shaft 232) and a sector portion of the gear wheel including the arc portion of the rim with its teeth. Such an arrangement using sector gears can be useful in saving weight and/or providing a more compact arrangement. However, in alternative variations of this example, the first gear wheel 451 and the second gear wheel 452 can each be in the form of a respective full circle gear.

The first gear wheel 241 is meshed with the first gear wheel 241 as well as the motor gear wheel 496. In at least this example, the center of rotation 497 of the motor gear wheel 496 is provided forward of the first pivot axis PA1 and of the second pivot axis PA2, and thus, the corresponding sector portion of the first gear wheel 241 has a corresponding first sector angle SA1 (i.e., the angle made by the corresponding arc at the center or rotation, i.e., the first pivot axis PA1) nominally equal to the sum of the non-zero first angular displacement $\theta_1$, plus an additional angular portion $\theta_W$ to ensure that the first gear wheel 241 is meshed with the first gear wheel 241 throughout the entirety the pivoting of the first gear wheel 241 about non-zero first angular displacement $\theta_1$. For example, the first sector angle SA1 can be about 5%, 10% or 20% larger than the sum of the non-zero first angular displacement $\theta_1$ and angular portion $\theta_W$. For example, the first sector angle SA1 can be any one of the following angles: 95°, 100°, 145°, 160°, 180°, 200°, 210°, 220°, 230°, 240°, 250°.

The second gear wheel 242 is only meshed with the second gear wheel 242, and thus, the corresponding sector portion of the second gear wheel 242 has a corresponding second sector angle SA2 (i.e., the angle made by the corresponding arc at the center or rotation, i.e., the second pivot axis PA2) nominally equal to the non-zero second angular displacement $\theta_2$. For example, the second sector angle SA2 can be about 5%, 10% or 20% larger than the non-zero second angular displacement $\theta_2$. For example, the second sector angle SA2 can be any one of the following angles: 40°, 45°, 50°, 60°, 75°, 90°, 95°, 100°, 110°, 120°, 130°, 140°, 150°, 160°, 165°.

The actuator 495 and motor gear wheel 496 are mounted with respect to the load bearing bulkhead 410 via the aforesaid support structure 488, which in at least this example is in the form of frame 490.

Figure 8A:
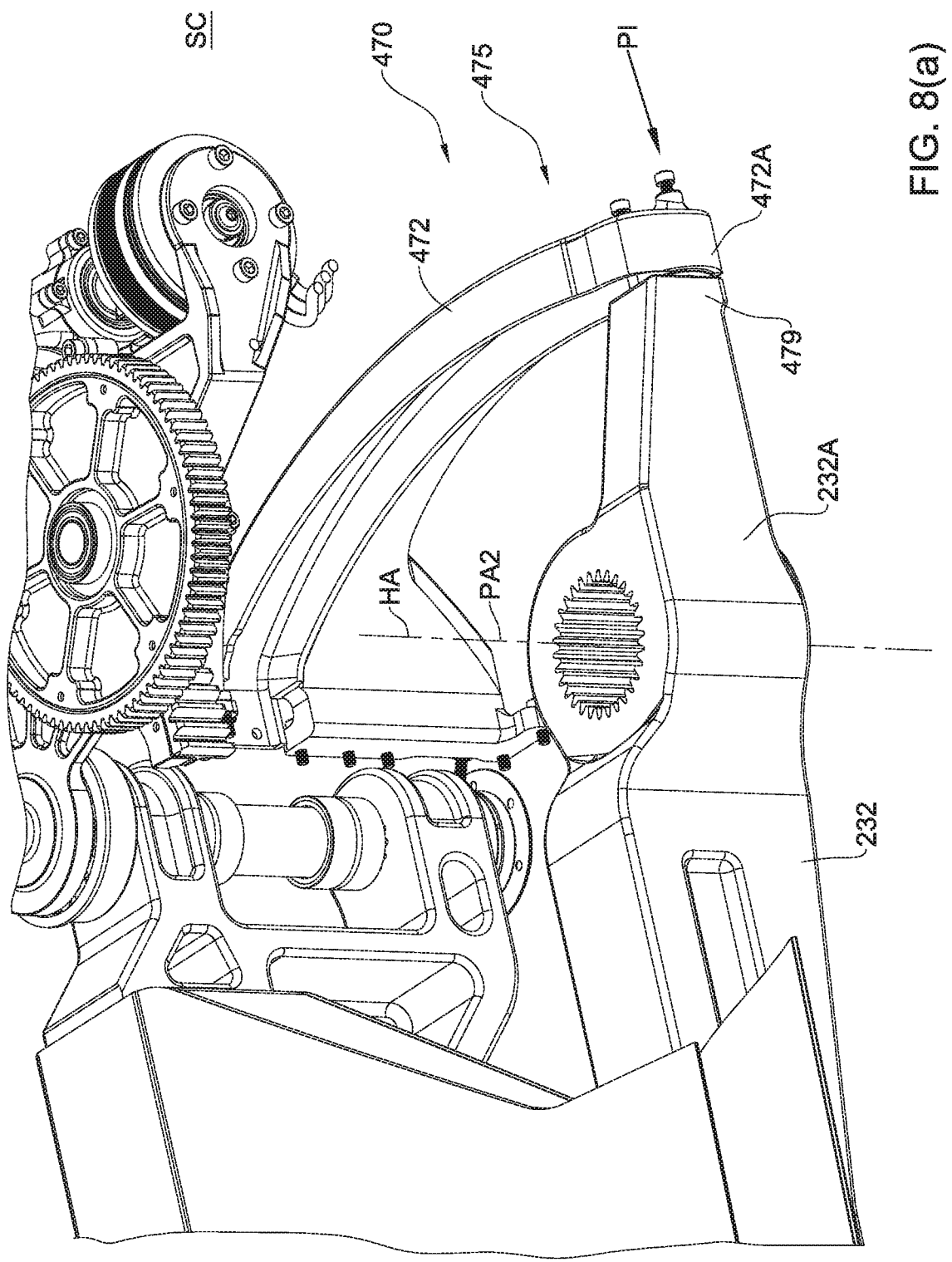
FIG. 8(a) shows in partial isometric top-aft-side view, part of the deployment mechanism, including part of the leveling mechanism, and part of the wings of the example of FIGS. 4(a) to 4(d), in the stowed configuration.
Figure 8B:
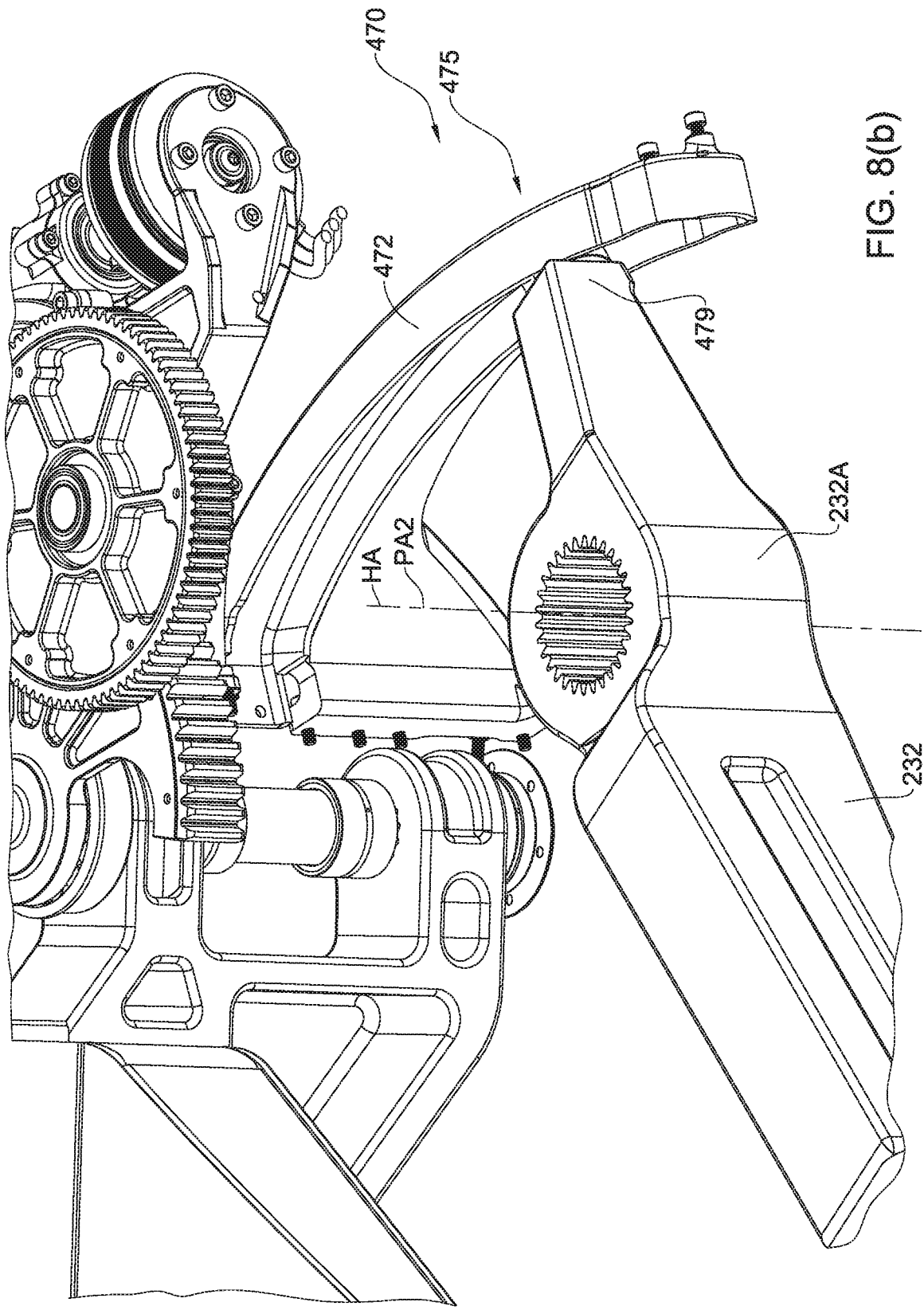
FIG. 8(b) shows in partial isometric top-aft-side view, the example of FIG. 8(a) in a position intermediate the stowed configuration and the deployed configuration.
Figure 8C:
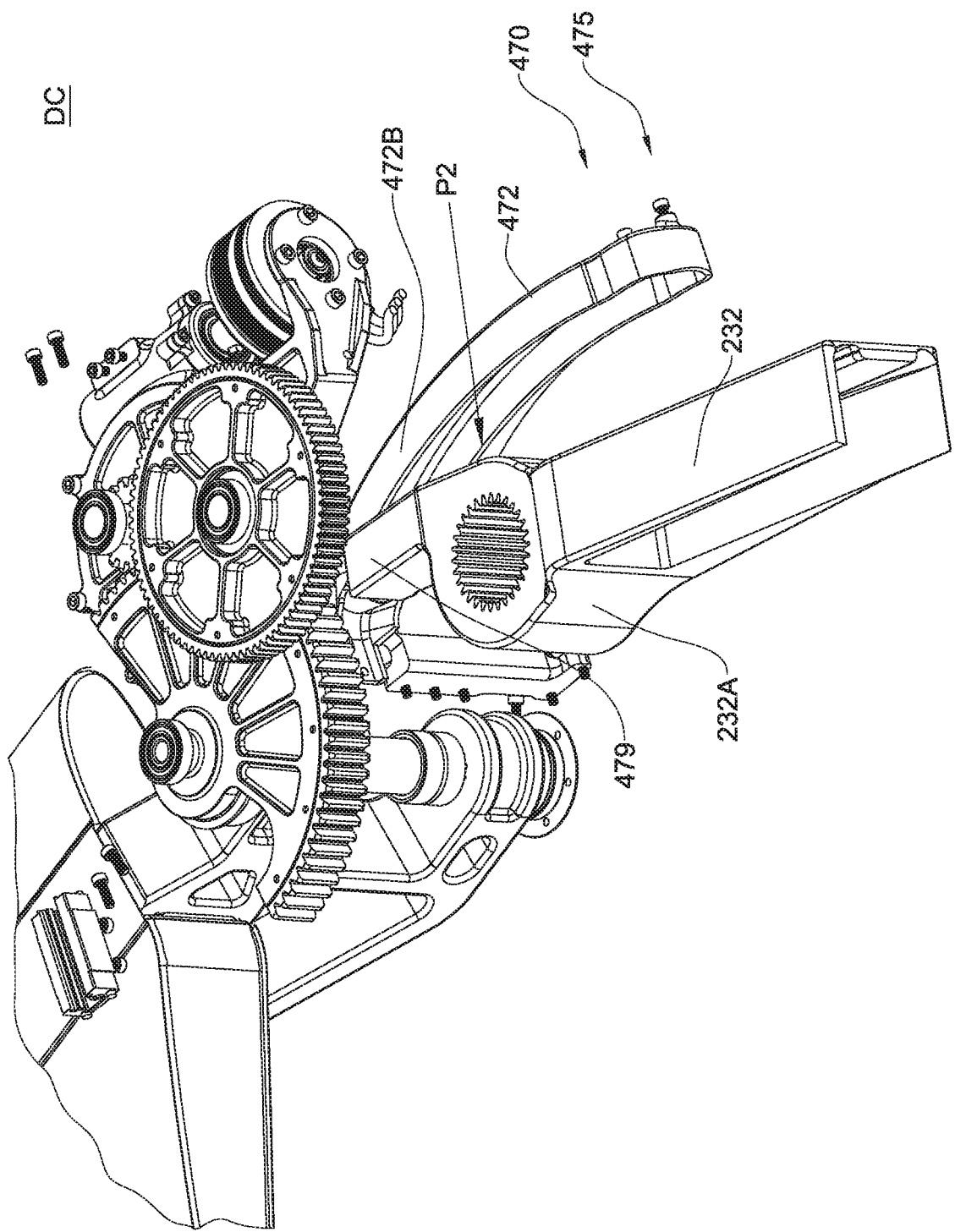
FIG. 8(c) shows in partial isometric top-aft-side view, the example of FIG. 8(a) in the deployed configuration.
Figure 9A:
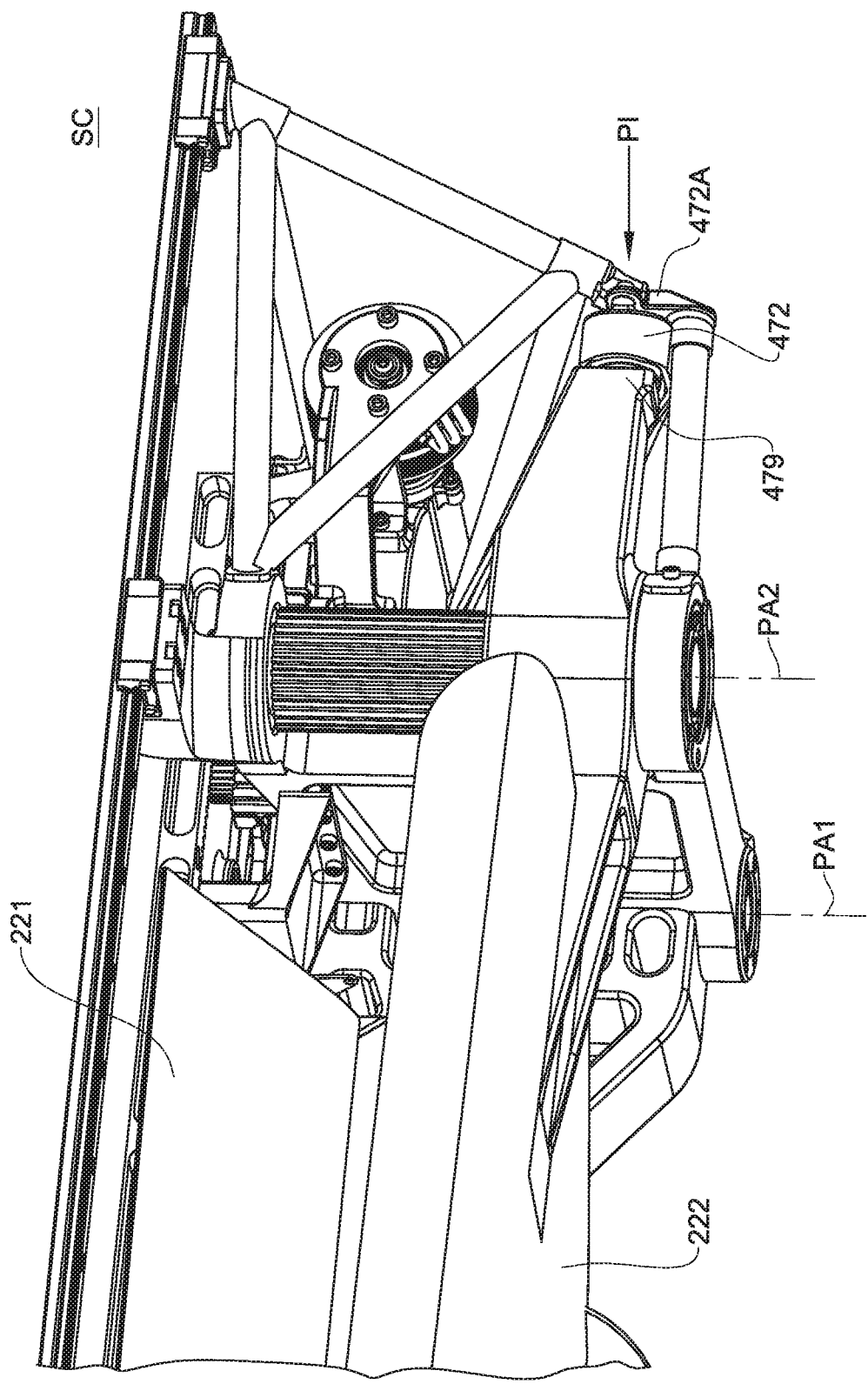
FIG. 9(a) shows in partial isometric bottom-aft-side view, the deployment mechanism, including the leveling mechanism, and part of the wings of the example of FIGS. 4(a) to 4(d), in the stowed configuration.
Figure 9B:
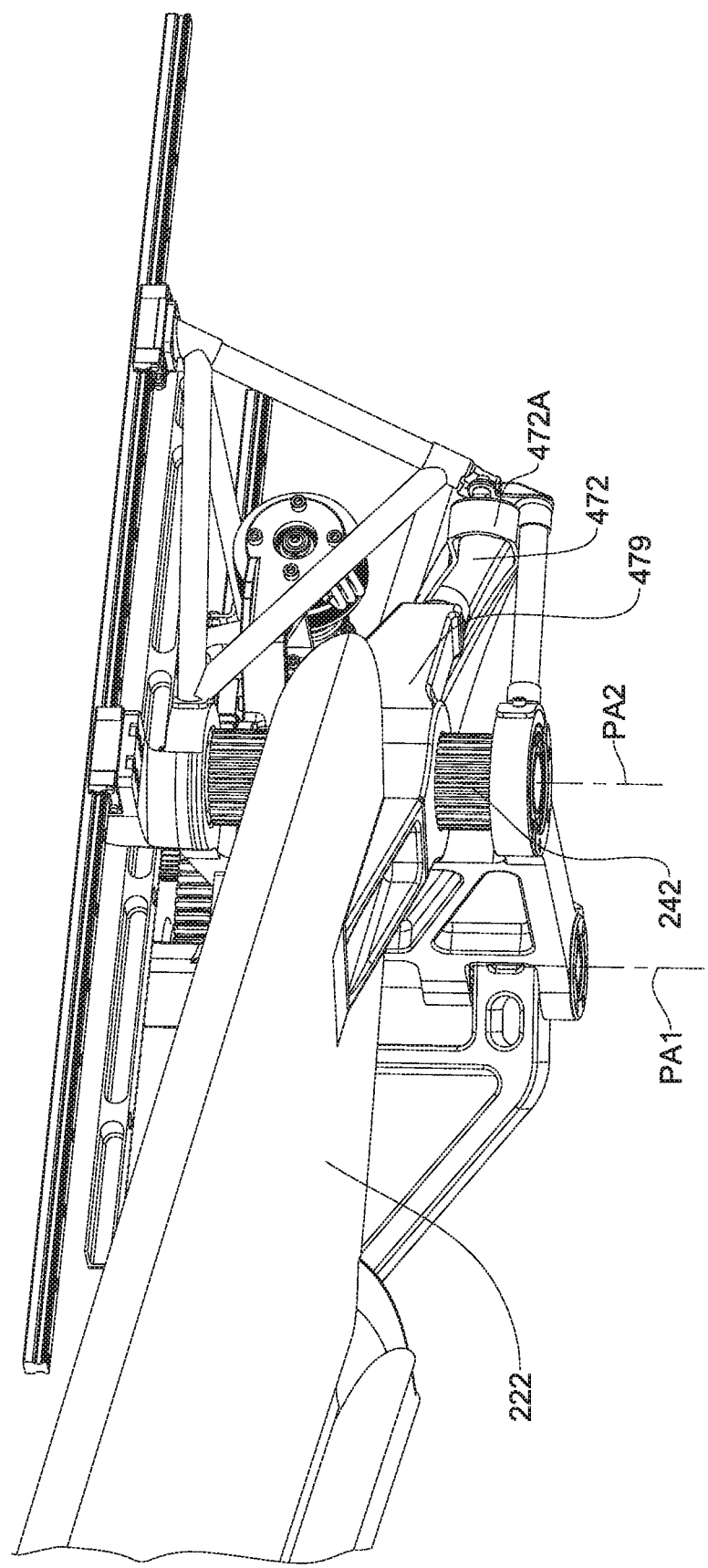
FIG. 9(b) shows in partial isometric bottom-aft-side view, the example of FIG. 9(a) in a first position intermediate the stowed configuration and the deployed configuration.
Figure 9C:
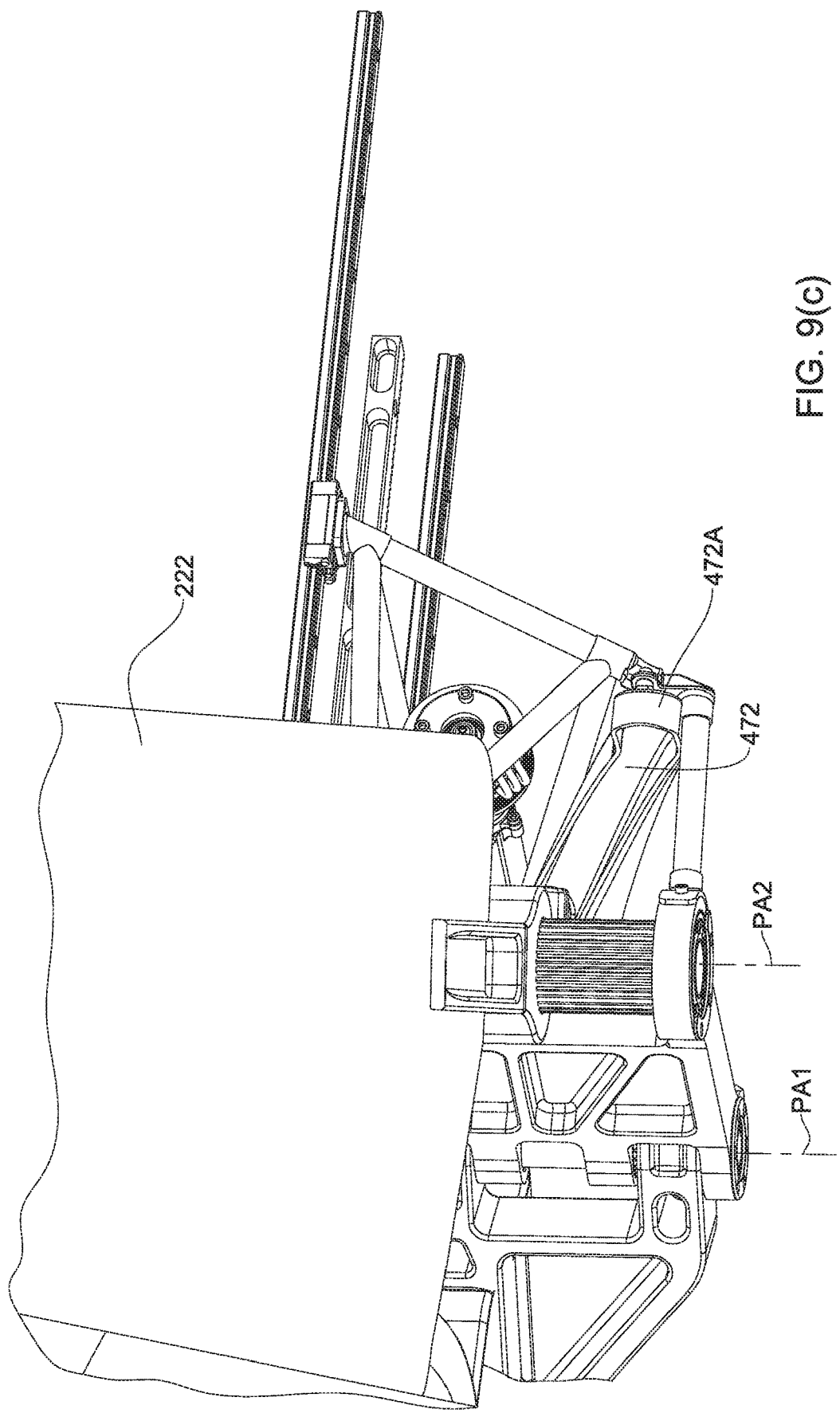
FIG. 9(c) shows in partial isometric bottom-aft-side view, the example of FIG. 9(a) in a second position intermediate the stowed configuration and the deployed configuration.
Figure 9D:
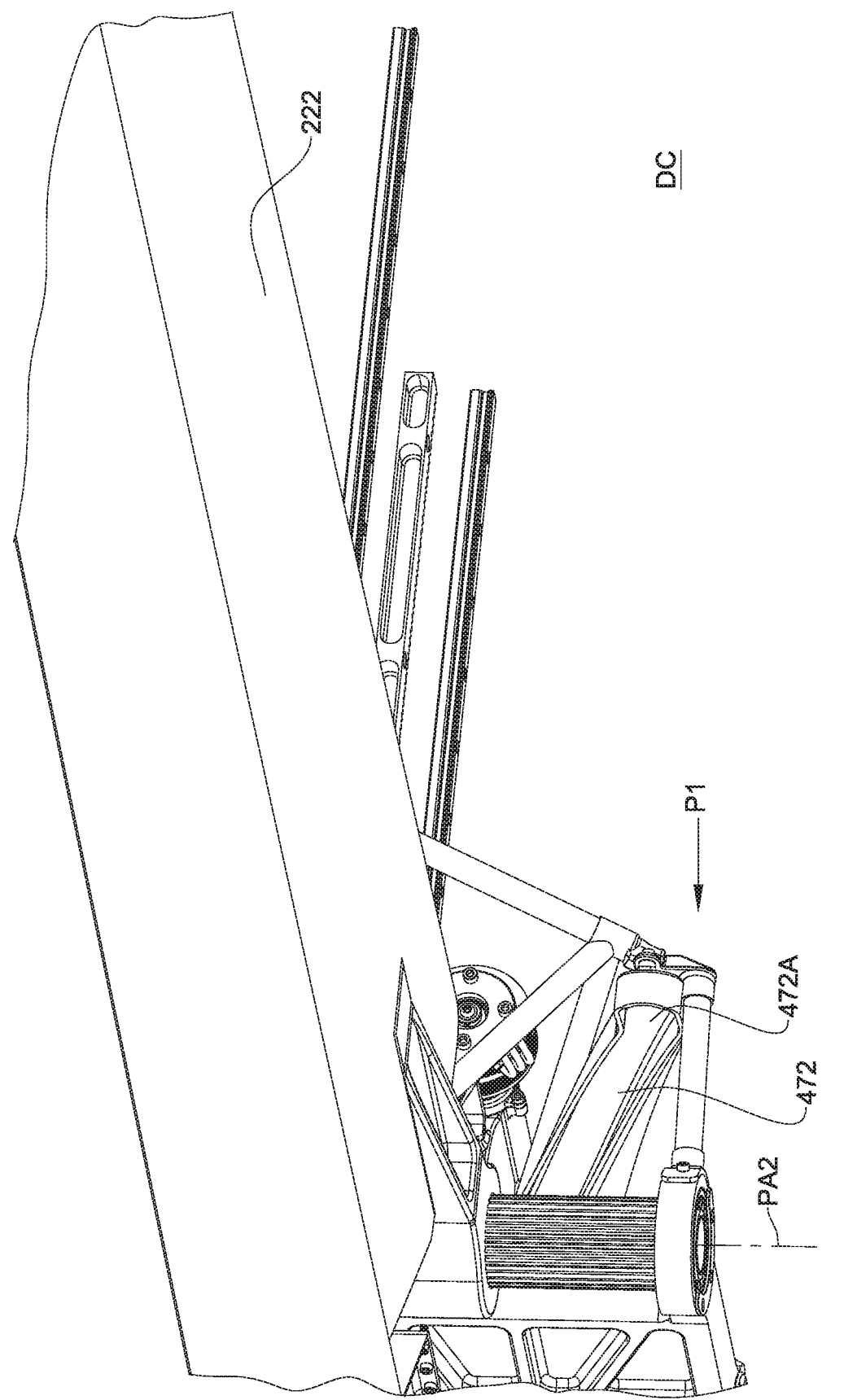
FIG. 9(d) shows in partial isometric bottom-aft-side view, the example of FIG. 9(a) in the deployed configuration.
Figure 10A:
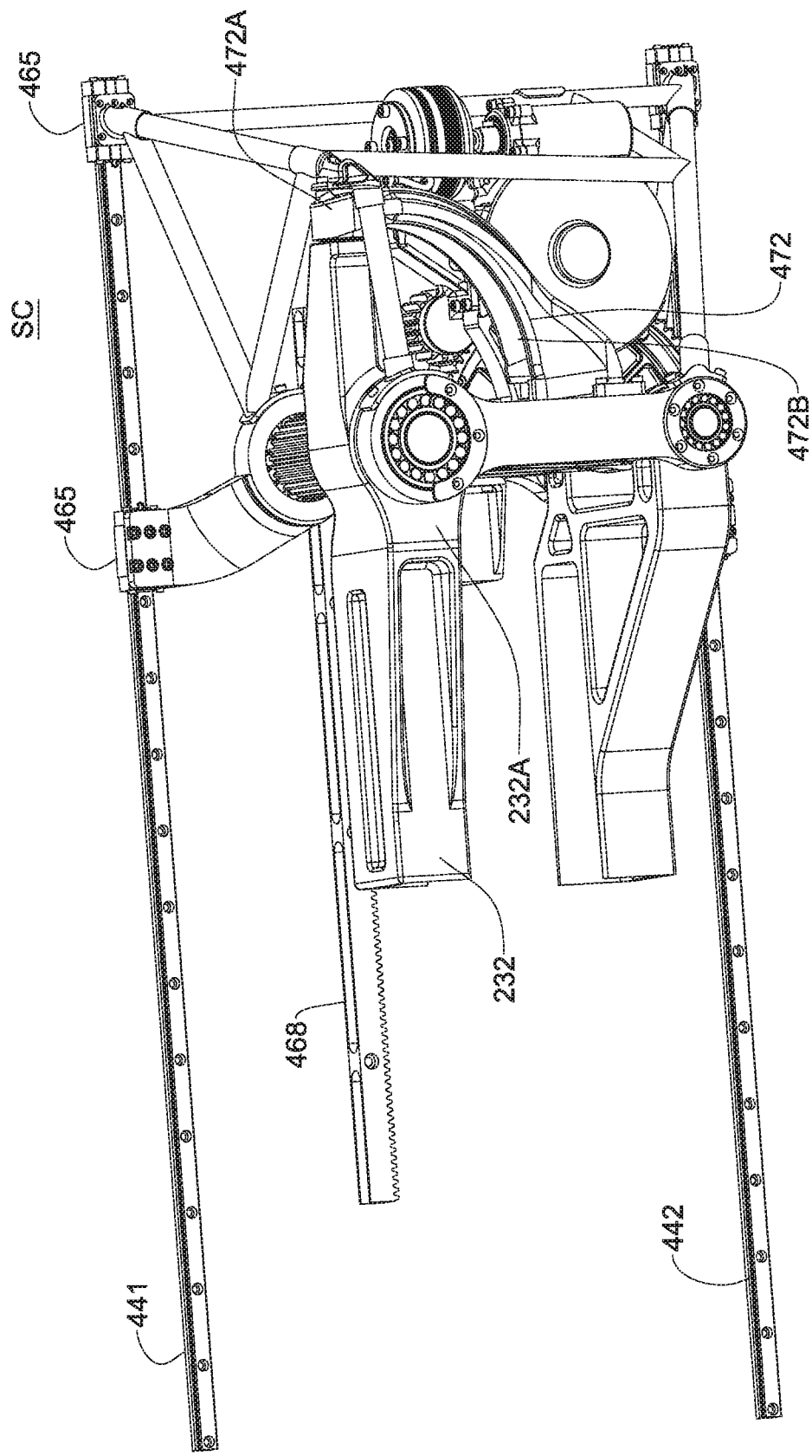
FIG. 10(a) shows in partial isometric bottom-aft-side view, the deployment mechanism, including the translation arrangement, and part of the wings of the example of FIGS. 4(a) to 4(d), in the stowed configuration.
Figure 10B:
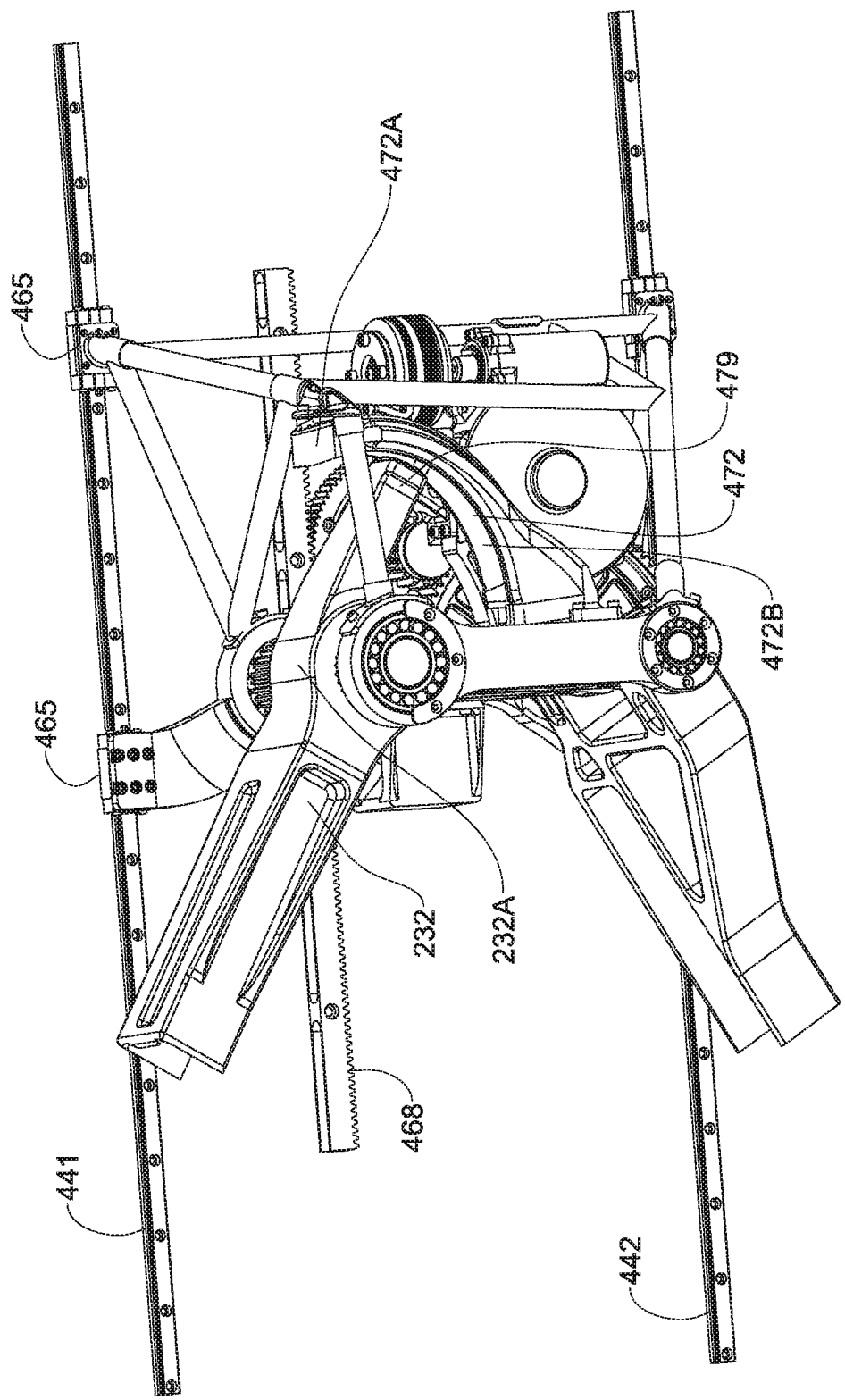
FIG. 10(b) shows in partial isometric bottom-aft-side view, the example of FIG. 10(a) in a first position intermediate the stowed configuration and the deployed configuration.
Figure 10C:
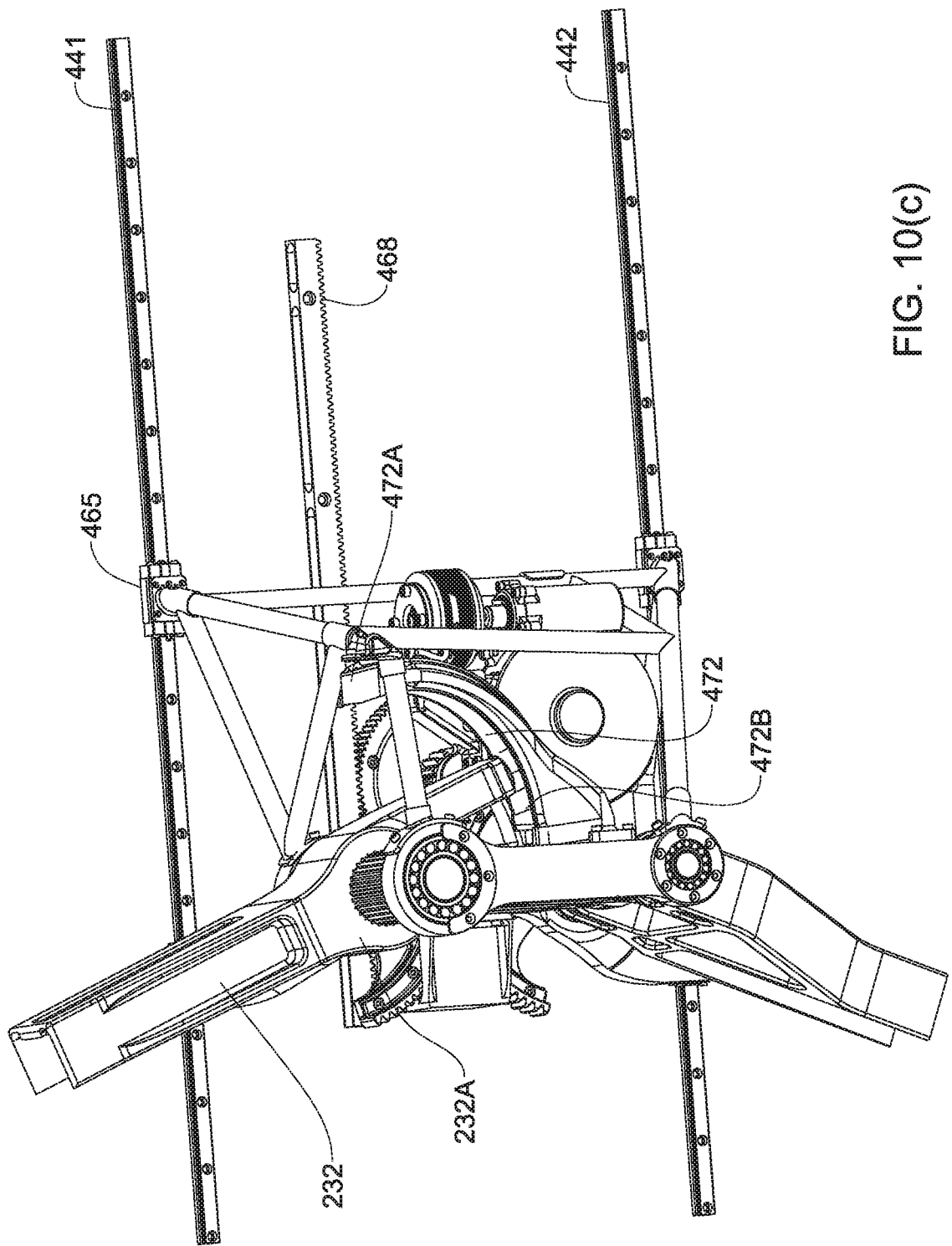
FIG. 10(c) shows in partial isometric bottom-aft-side view, the example of FIG. 10(a) in a second position intermediate the stowed configuration and the deployed configuration.
Figure 10D:
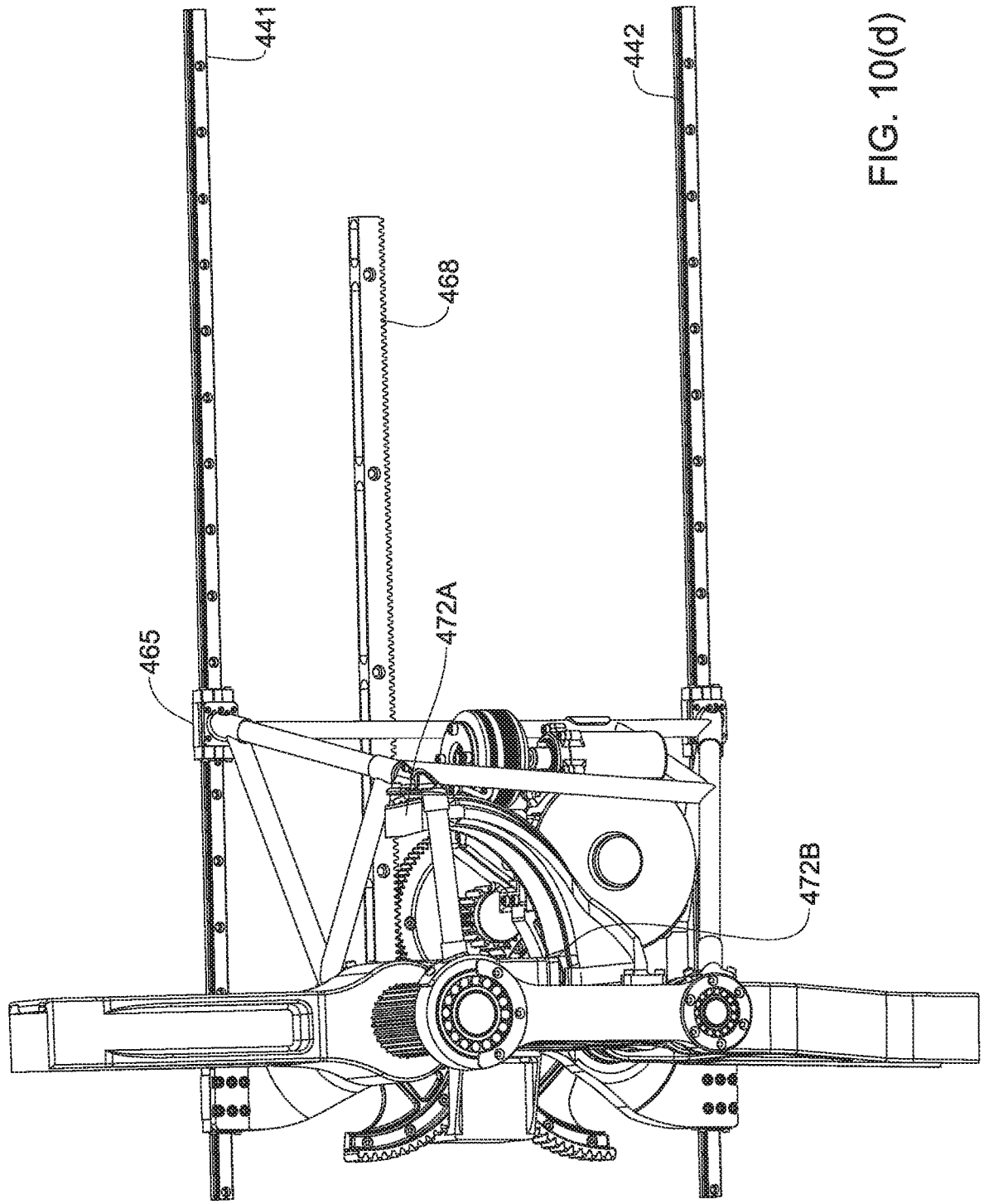
FIG. 10(d) shows in partial isometric bottom-aft-side view, the example of FIG. 10(a) in the deployed configuration.

Referring in particular to FIG. 5, FIG. 6(*a*), FIG. 8(*a*), FIG. 8(*b*) and FIG. 8(*c*), in at least this example, and according to an aspect of the presently disclosed subject matter, the deployment mechanism 400 comprises a leveling arrangement 470 configured for providing the aforesaid levelling operation, to enable said levelling the first wing 221 and the second wing 222 with respect to one another from the overlying relationship in the stowed configuration SC, to a leveled relationship in the deployed configuration DC. In at least this example, the leveling arrangement 470 is also configured for synchronizing said levelling operation with said pivoting operation.

It is to be noted that in at least in this example, the second shaft 242 can be considered to be part of the leveling arrangement 470. In particular, the configuration of the second shaft 242 having a spline arrangement or the like, for example being in the form of, or comprising, a male spline shaft 242M, and the female spline coupling 242F can be considered to be part of the leveling arrangement 470.

Referring the leveling arrangement 470 in at least this example comprises a cam arrangement 475 configured to be operatively coupled to the second wing 222 via the second shaft 242.

In at least this example, the cam arrangement 475 comprises a cam rail 472, fixedly mounted with respect to the load bearing bulkhead 410, for example via the support structure 488, which in at least this example in the form of frame 490.

In at least this example, cam rail 472 is helical, having a helical axis HA co-axial with the second pivot axis PA2.

In alternative variations of this example, the cam rail can have any other suitable shape. For example, the cam rail can be made from a combination of straight sections and helical sections, with varying helix angle. The shape of the cam rail can dictate the leveling motion profile of the wing that is being moved along the respective pivot axis. For example, a straight rail section can be provided for a given angle, in order to allow the wings 221, 222 to move away from one another, without having any concurrent leveling motion— i.e. only pivoting is occurring while each wing is maintained at its respective level. When wing clearance is achieved, i.e., when the majority of the wings are no longer in overlapping relationship (for example after 20° rotation about each respective pivot axis PA1, PA2), the cam rail can change shape to helical form and allow the leveling of the wings 221, 222.

The leveling motion profile can thus be designed in such manner that wings 221, 222 will not collide during deployment to the deployed configuration DC, and in such manner that lift force generated by the wings 221, 222 can assist to level the wings 221, 222, since in such cases such a lift force can be in the same direction as the direction of the leveling motion.

In at least this example, the helical cam rail 472 has a first end 472A corresponding to position P1, and a second end 472B corresponding to position P2. Furthermore, the first end 472A is angularly displaced from the second end 472B with respect to the second pivot axis PA2 by an angular displacement corresponding to the non-zero second angular displacement $\theta_2$.

In at least this example, the cam arrangement 475 comprises a cam follower 479 fixedly mounted to the second wing 222. More specifically, the cam follower 479 is fixedly mounted to projection 232A to which the second shaft 242 is movably mounted. The projection 232A projects generally radially and orthogonally with respect to the second pivot axis PA2, and the cam follower 479 comprises a roller 478 rotatably mounted at the free end of projection 232A.

In the deployment arrangement 400, the cam follower 479 and in particular the roller 478 is constrained to move only along the cam rail 472, which can only happen as the second shaft 242, and in particular the second shaft bracket 232 and projection 232A (and thus the second wing 222) are pivoted about the second pivot axis.

Thus, the cam arrangement 475 is configured such that movement of the cam follower 479 along the cam rail 472 causes the second shaft 242, and in particular the second shaft bracket 232 and projection 232A (and thus the second wing 222) to translate along the aforesaid degree of freedom parallel to the second pivot axis PA2 in said levelling operation, responsive to the second shaft 242 being pivoted about the second pivot axis PA2 non-zero second angular displacement $\theta_2$.

Thus, as the second shaft 242 is being pivoted about the second pivot axis PA2 non-zero second angular displacement $\theta_2$, the second shaft bracket 232 and projection 232A (and thus the second wing 222) are concurrently displaced from position P1 to position P2, thereby bringing the second wing 222 to the same level (along the yaw axis Y) as the first wing 221.

Referring in particular to FIGS. 4(a) to 4(d), and 10(a) to 10(d), in at least this example, and according to an aspect of the presently disclosed subject matter, the deployment mechanism 400 comprises a translation arrangement 440 configured for providing the aforesaid translation operation, to enable selectively translating the first wing 221 and the second wing 222 along the stroke direction ST through the stroke length SL, between the first axial position AX1 corresponding to the stowed configuration SC, and the second axial position AX2 corresponding to the deployed configuration DC. In at least this example, the translation arrangement 460 is also configured for synchronizing said translation operation with said pivoting operation.

In at least this example, the translation arrangement 440 comprises a rail system 445 configured to be fixedly mounted with respect to the air vehicle 100. Furthermore, the load bearing bulkhead 410, together with all the components of deployment mechanism 400 that are mounted to the load bearing bulkhead 410, in particular the first wing 221 and the second wing 222, is moveably mounted to said rail system 445 to enable the load bearing bulkhead 410 to be translated along said stroke direction ST through said stroke length SL, together with the first wing 221 and the second wing 222.

In at least this example, the load bearing bulkhead 410 carries with it in such a translation operation, the actuator 495, the meshed gear arrangement 450, and leveling arrangement 470, as well as the first wing 221 and the second wing 222.

In at least this example, the rail system 445 comprises two rail members 441, 442, laterally spaced by spacing RT. Furthermore, the rail members 441, 442 in at least this example are each rectilinear, and are aligned, typically parallel, with the centerline or longitudinal axis LA of the air vehicle 100.

In alternative variations of this example, the rail members 441, 442 can be concave or convex, for example, generating angular motion of the deployment mechanism when traveling on the rails. If rails are convex or concave, the wing incidence angle (wing chord angle with respect to the fuselage) can change concurrent with the travel of the wings. In such manner, the wing incidence, in the stowed configuration SC can be different from the wing incidence in the deployed configuration DC.

Furthermore, the translation arrangement 440 comprises a plurality of slider elements 465 configured for engaging with and concurrently moving with respect to the rail members 441, 442. For example, such slider elements 465 can include wheels, balls, rollers, or low friction surfaces that are configured to engage and run over the rail members 441, 442.

The slider elements 465 are fixedly mounted with respect to the load bearing bulkhead 410, in at least this example via the support structure 488, which in at least this example in the form of frame 490. For example, two slider elements 465 are fixedly mounted on one lateral side of frame 490, and two other slider elements 465 are fixedly mounted on the other lateral side of frame 490, as best seen in FIGS. 6(a) and 6(b).

In a least this example, the translation arrangement 440 comprises a suitable driving and synchronizing arrangement 460. The driving and synchronizing arrangement 460 is mounted directly or indirectly to the load bearing bulkhead 410, and is thus carried by the load bearing bulkhead 410 in the aforesaid translation operation.

The driving and synchronizing arrangement 460 is coupled to the rail system 440 via the sliders 465, and provides motive power to enable translation of the load bearing bulkhead 410, together with all the components of deployment mechanism 400 that are mounted to the load bearing bulkhead 410, in particular the first wing 221 and the second wing 222, with respect to the rails 441, 442.

Furthermore, the driving and synchronizing arrangement 460 is configured for synchronizing the translation operation with the pivoting operation, such that as the wings 221, 222 are pivoted about the respective first pivot axis PA1 and second pivot axis PA2 through the non-zero first angular displacement $\theta_1$ and the non-zero second angular displacement $\theta_2$, respectively, the wings 221, 222 are also translated concurrently from the first axial position AX1 to the second axial position AX2.

In a least this example, the driving and synchronizing arrangement 460 is in the form of, or comprises, a rack and pinion arrangement, including a pinion gear 462 rotatably mounted directly or indirectly to the load bearing bulkhead 410, and a rack gear 468 mounted in fixed spatial relationship with respect to the rail system 440 or in fixed spatial relationship with respect to the air vehicle 100. In at least this example, the rack gear 468 is rectilinear, and is aligned, typically parallel, with the centerline or longitudinal axis LA of the air vehicle 100.

The pinion gear 462 is meshed with the rack gear 468 and thus rotation of the pinion gear 462 translates the pinion gear 462 along the length of the rack gear 468.

The pinion gear 462 is coupled with the meshed gear arrangement 450, such that actuation of the meshed gear arrangement 450 causes rotation of the pinion gear 462, and in turn the pinion gear 462 rotates with respect to the rack gear 468 causing translation of the pinion gear 462, together with the load bearing bulkhead 410 and the wings 221, 222, along the stroke direction ST.

In at least this example, the pinion gear 462 is coaxial and fixedly mounted to a secondary gear 469 that is directly meshed with the meshed gear arrangement 450. As best seen in FIGS. 7(*a*) and 7(*b*), the secondary gear 469 is directly meshed in this example with the first gear 451. However, in other alternative variations of this example the secondary gear 469 is directly meshed with the second gear 452, or with both the first gear 451 and the second gear 452. In at least this example, the diameter of the second gear 452 is smaller than the diameter of each of the first gear 451 and the second gear 452, and furthermore, the diameter of the pinion gear 462 is larger than the diameter of the pinion gear 462. There is thus an amplification effect in that a given angular rotation of the first gear 451 about the first pivot axis PA1 results in a amplified angular rotation by the pinion gear 462.

For example, the number of teeth on the pinion gear 462 can define the magnitude of the axial distance the deployment mechanism travels per given angular displacement of the wings 221, 222. The number of teeth on the pinion gear 462 can be used to define the ratio between the angular (pivoting) displacement of the wings 221, 222 about the pivot axis PA1 and pivot axis PA2, respectively, and the axial (linear) displacement of the deployment mechanism 400.

For a given diameter for each of the first gear 451 and the second gear 452, and for a given diameter of the pinion gear 462, the diameter of the secondary gear 469 can be chosen such that the pivoting of first gear 451 about the first pivot axis PA1 through the non-zero first angular displacement $\theta_1$ results in the pinion gear 462 being translated with respect to the rack gear 468 by the desired stroke length SL. Moreover, the rack and pinion arrangement also ensures that the pivoting operation and the translation operation occur at the same time, i.e., start together and terminate together.

In other words, and according to an aspect of the presently disclosed subject matter, it is possible to provide a plurality of such pinion gears, including at least two such pinion gears, each of different diameter one from the other, only one such pinion gear being alternately rotatably mounted to the load bearing bulkhead 410 via the secondary gear 469 to correspondingly provide a correspondingly different magnitude for the stroke length ST, while unchanging (or without the need to change) the rest of the deployment mechanism 400 or the magnitude of the non-zero first angular displacement $\theta_1$ or of the non-zero second angular displacement $\theta_2$.

This feature enables essentially the same deployment mechanism 400 to be easily adapted for installation in a variety of air vehicles, in which the required stroke length can be different in each air vehicle, by essentially changing the pinion gear to suit the require stroke length.

In alternative variations of this example, the driving and synchronizing arrangement 460 can be in the form of, or comprises, a screw and nut mechanism in place of the rack and pinion arrangement. In such an example, the screw essentially replaces the rack gear, and the nut replaces the pinion gear, and the screw and nut mechanism is configured such that rotation of the nut causes linear motion along the screw. In such an example, the screw and nut mechanism is coupled with the meshed gear arrangement 450 such that actuation of the meshed gear arrangement 450 causes rotation of the nut, and in turn the nut rotates with respect to the screw causing translation of the nut, together with the load bearing bulkhead 410 and the wings 221, 222, along the stroke direction ST.

In operation, the controller selectively operates the deployment system 400 at the desired time to enable the wing system 200 and thus the air vehicle 100 to transition between the stowed configuration SC and the deployed configuration DC. For example, the controller is configured for switching on the actuator 495 to thereby initiate the deployment.

Safety protocols can optionally be implemented in the controller to ensure that such transitioning cannot occur other than according to preset conditions—for example that such transitioning cannot occur while the air vehicle is on the ground, or while being transported, or while still accommodated in the fairing. Furthermore, a suitable safety mechanism, for example a mechanical lock, can be configured for mechanically locking the deployment system 400, and thus the wing system 200, in the stowed configuration SC, at least until the air vehicle is separated from the fairing, or at least until prior to launch of the air vehicle for example while still in the fairing.

In alternative variations of the above examples, and according to another aspect of the presently disclosed subject matter, the translation mechanism can be omitted, mutatis mutandis and thus the deployment mechanism can be used in implementation of the presently disclosed subject matter, in which the pivoting mechanism is at a fixed location on the fuselage, resulting the wings leveling by the time they pivot to the deployed configuration.

In alternative variations of the above examples, and according to another aspect of the presently disclosed subject matter, the leveling mechanism can be omitted, mutatis mutandis and thus the deployment mechanism can be used in implementation of the presently disclosed subject matter, in which the pivoting mechanism translates along the fuselage, resulting the wings remaining unlevelled, but displacing through the desired stroke by the time they pivot to the deployed configuration.

In yet other alternative variations of the above examples, and according to another aspect of the presently disclosed subject matter, the levelling mechanism and the translation mechanism can be omitted, mutatis mutandis. In such examples, the deployment mechanism can be used in implementation of the presently disclosed subject matter, in which the deployment mechanism is configured for selectively providing a wing pivoting operation, without said displacement operation and without said levelling operation, while each wing is deployed from the stowed configuration to the deployed configuration about its respective pivot axis, where in the two pivot axes are non-coaxial.

In yet other alternative variations of the above examples, and according to another aspect of the presently disclosed subject matter, the levelling mechanism can be omitted, mutatis mutandis. In such examples, the deployment mechanism can be used in implementation of the presently disclosed subject matter, in which the deployment mechanism is configured for selectively providing a displacement operation concurrent with the wing pivoting operation, said displacement operation comprising translating the first wing and the second wing through a stroke length concurrent with said pivoting (with or without leveling), between a first axial position corresponding to the stowed configuration, and a second axial position corresponding to the deployed configuration; while the deployment mechanism is configured for enabling changing a magnitude of the stroke length while unaffecting the wing pivoting operation. In other words, for a given pivoting angular displacement, the stroke length for the specific deployment mechanism can be changed as desired.

It is to be noted that at least in some implementations of the presently disclosed subject matter, and according to an aspect of the presently disclosed subject matter, there is provided a method of operating an air vehicle, comprising:
(a) providing an air vehicle as defined herein, the air vehicle in the stowed configuration encapsulated in a fairing, for example as disclosed herein;
(b) launching the encapsulated air vehicle, for example to a predetermined altitude and a predetermined forward speed;
(c) separating the air vehicle from the fairing;
(d) selectively operating the respective wing system to transition the wing system from the stowed configuration to the deployed configuration.

Furthermore, step (b) can include any one of:
launching the encapsulated air vehicle via a launch barrel;
launching the encapsulated air vehicle using a booster rocket;
launching the encapsulated air vehicle from a carrier aircraft.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. A wing system for an air vehicle, the air vehicle having a fuselage including a fuselage longitudinal axis, the wing system comprising:

a set of wings, configured for transitioning between a stowed configuration and a deployed configuration, the set of wings including:
a first said wing having a first wing tip, a first wing longitudinal axis, and a first pivot axis;
a second said wing having a second wing tip, a second wing longitudinal axis, and a second pivot axis;
wherein said first pivot axis and said second pivot axis are non-coaxial;
wherein in the stowed configuration, the first wing and the second wing are in overlying relationship such that at least a majority of a pressure surface of one of said first wing and said second wing is facing a suction surface of the other one of said one of said first wing and said second wing, and said first wing tip is spaced from said second wing tip by a first lateral spacing, wherein in the stowed configuration the first wing and the second wing are generally aligned with the fuselage longitudinal axis; and
wherein in the deployed configuration, the first wing is oriented with respect to the second wing such that said first wing tip is spaced from said second wing tip by a second lateral spacing greater than said first lateral spacing;
wherein said transitioning comprises a pivoting operation, comprising:
pivoting said first wing about said first pivot axis between the stowed configuration and the deployed configuration;
pivoting said second wing about said second pivot axis between the stowed configuration and the deployed configuration;
wherein the wing system is configured for providing a levelling operation configured for levelling the first wing and the second wing with respect to one another from the overlying relationship in the stowed configuration, to a leveled relationship in the deployed configuration;
wherein the wing system is configured for providing a translation operation configured for selectively translating the first wing and the second wing along a stroke direction through a stroke length, between a first axial position corresponding to the stowed configuration, and a second axial position corresponding to the deployed configuration; and
wherein said levelling operation comprises translating at least one of said first wing or said second wing along the first pivot axis or said second pivot axis, respectively, between a respective first position, corresponding to the stowed configuration, to a second position, corresponding to the deployed configuration.

2. The wing system according to claim 1, wherein the wing system is configured for synchronizing said levelling operation with said pivoting operation.

3. The wing system according to claim 1, wherein the wing system is configured for synchronizing said translation operation with said pivoting operation.

4. The wing system according to claim 1, including one of the following:
wherein said first pivot axis is parallel with respect to said second pivot axis; or
wherein said first pivot axis is parallel with respect to said second pivot, and, wherein said first pivot axis is laterally spaced with respect to said second pivot axis by a lateral spacing.

5. The wing system according to claim 1, further comprising a deployment mechanism configured for selectively transitioning the first wing and the second wing between said stowed configuration and said deployed configuration.

6. The wing system according to claim 5, including one of the following:
   wherein said deployment mechanism comprises an actuator configured for selectively driving operation of the deployment mechanism; or
   wherein said deployment mechanism comprises an actuator configured for selectively driving operation of the deployment mechanism, and, wherein said deployment mechanism is configured for self-locking.

7. The wing system according to claim 5, including one of the following:
   wherein said first wing comprises a first pivot shaft coaxial with the first pivot axis, and wherein said second wing comprises a second pivot shaft coaxial with the second pivot axis;
   wherein said first wing comprises a first pivot shaft coaxial with the first pivot axis, and wherein said second wing comprises a second pivot shaft coaxial with the second pivot axis, and, wherein said deployment mechanism comprises a load bearing bulkhead, wherein said first wing is pivotably mounted to said load bearing bulkhead via said first pivot shaft, and said second wing is pivotably mounted to said load bearing bulkhead via said second pivot shaft;
   wherein said first wing comprises a first pivot shaft coaxial with the first pivot axis, and wherein said second wing comprises a second pivot shaft coaxial with the second pivot axis, and, wherein said deployment mechanism comprises a load bearing bulkhead, wherein said first wing is pivotably mounted to said load bearing bulkhead via said first pivot shaft, and said second wing is pivotably mounted to said load bearing bulkhead via said second pivot shaft, and, wherein said deployment mechanism is configured for providing in said pivoting operation a pivoting synchronization operation comprising synchronizing pivoting of said first wing about said first pivot axis in a first rotational direction with pivoting of said second wing about said second pivot axis in a second rotational direction, opposite to said first rotational direction;
   wherein said first wing comprises a first pivot shaft coaxial with the first pivot axis, and wherein said second wing comprises a second pivot shaft coaxial with the second pivot axis, and, wherein said deployment mechanism comprises a load bearing bulkhead, wherein said first wing is pivotably mounted to said load bearing bulkhead via said first pivot shaft, and said second wing is pivotably mounted to said load bearing bulkhead via said second pivot shaft, and, wherein said deployment mechanism is configured for providing in said pivoting operation a pivoting synchronization operation comprising synchronizing pivoting of said first wing about said first pivot axis in a first rotational direction with pivoting of said second wing about said second pivot axis in a second rotational direction, opposite to said first rotational direction, and, wherein said deployment mechanism comprises a meshed gear arrangement for providing said synchronization operation;
   wherein said first wing comprises a first pivot shaft coaxial with the first pivot axis, and wherein said second wing comprises a second pivot shaft coaxial with the second pivot axis, and, wherein said deployment mechanism comprises a load bearing bulkhead, wherein said first wing is pivotably mounted to said load bearing bulkhead via said first pivot shaft, and said second wing is pivotably mounted to said load bearing bulkhead via said second pivot shaft, and, wherein said deployment mechanism is configured for providing in said pivoting operation a pivoting synchronization operation comprising synchronizing pivoting of said first wing about said first pivot axis in a first rotational direction with pivoting of said second wing about said second pivot axis in a second rotational direction, opposite to said first rotational direction, and, wherein said deployment mechanism comprises a meshed gear arrangement for providing said synchronization operation, and, wherein said meshed gear arrangement comprises a first gear wheel fixedly mounted to said first pivot shaft and co-axial with said first pivot axis, and a second gear wheel fixedly mounted to said second pivot shaft and co-axial with said second pivot axis, wherein said first gear wheel is meshed with respect to said second gear wheel; or
   wherein said first wing comprises a first pivot shaft coaxial with the first pivot axis, and wherein said second wing comprises a second pivot shaft coaxial with the second pivot axis, and, wherein said deployment mechanism comprises a load bearing bulkhead, wherein said first wing is pivotably mounted to said load bearing bulkhead via said first pivot shaft, and said second wing is pivotably mounted to said load bearing bulkhead via said second pivot shaft, and, wherein said deployment mechanism is configured for providing in said pivoting operation a pivoting synchronization operation comprising synchronizing pivoting of said first wing about said first pivot axis in a first rotational direction with pivoting of said second wing about said second pivot axis in a second rotational direction, opposite to said first rotational direction, and, wherein said deployment mechanism comprises a meshed gear arrangement for providing said synchronization operation, and, wherein said meshed gear arrangement comprises a first gear wheel fixedly mounted to said first pivot shaft and co-axial with said first pivot axis, and a second gear wheel fixedly mounted to said second pivot shaft and co-axial with said second pivot axis, wherein said first gear wheel is meshed with respect to said second gear wheel, and, wherein said actuator comprises a motor operatively coupled to said meshed gear arrangement and configured for selectively providing a torque to at least one of said first gear wheel and said second gear wheel to drive said meshed gear arrangement to thereby provide said synchronization operation.

8. The wing system according to claim 5, including one of the following:
   wherein said deployment mechanism comprises a levelling arrangement for providing and for synchronizing said levelling operation with said pivoting operation;
   wherein said deployment mechanism comprises a levelling arrangement for providing and for synchronizing said levelling operation with said pivoting operation, and including one of the following: (a) wherein at least one of said first wing and said second wing is movably mounted to the respective said first shaft or said second shaft with respect to one degree of freedom in translation parallel to the respective said first pivot axis or said second pivot axis; (b) wherein said first wing is fixedly mounted to said first shaft, and wherein said second wing is movably mounted to said second shaft with respect to one degree of freedom in translation parallel to said second pivot axis; (c) wherein said first wing is fixedly mounted to said first shaft, and wherein said second wing is movably mounted to said second shaft with respect to one degree of freedom in translation parallel to said second pivot axis, and, wherein said second shaft is in the form of a male spline shaft, and wherein the said second wing is movably mounted to said second shaft via a female spline coupling complementary to said male spline shaft;

wherein said deployment mechanism comprises a leveling arrangement for providing and for synchronizing said levelling operation with said pivoting operation, and including one of the following: (a) wherein at least one of said first wing and said second wing is movably mounted to the respective said first shaft or said second shaft with respect to one degree of freedom in translation parallel to the respective said first pivot axis or said second pivot axis; (b) wherein said first wing is fixedly mounted to said first shaft, and wherein said second wing is movably mounted to said second shaft with respect to one degree of freedom in translation parallel to said second pivot axis; (c) wherein said first wing is fixedly mounted to said first shaft, and wherein said second wing is movably mounted to said second shaft with respect to one degree of freedom in translation parallel to said second pivot axis, and, wherein said second shaft is in the form of a male spline shaft, and wherein the said second wing is movably mounted to said second shaft via a female spline coupling complementary to said male spline shaft; and, wherein said leveling arrangement comprises a cam arrangement operatively coupled to the second wing;

wherein said deployment mechanism comprises a leveling arrangement for providing and for synchronizing said levelling operation with said pivoting operation, and including one of the following: (a) wherein at least one of said first wing and said second wing is movably mounted to the respective said first shaft or said second shaft with respect to one degree of freedom in translation parallel to the respective said first pivot axis or said second pivot axis; (b) wherein said first wing is fixedly mounted to said first shaft, and wherein said second wing is movably mounted to said second shaft with respect to one degree of freedom in translation parallel to said second pivot axis; (c) wherein said first wing is fixedly mounted to said first shaft, and wherein said second wing is movably mounted to said second shaft with respect to one degree of freedom in translation parallel to said second pivot axis, and, wherein said second shaft is in the form of a male spline shaft, and wherein the said second wing is movably mounted to said second shaft via a female spline coupling complementary to said male spline shaft; and, wherein said leveling arrangement comprises a cam arrangement operatively coupled to the second wing, and, wherein said cam arrangement comprises a cam follower and a cam rail; or wherein said deployment mechanism comprises a leveling arrangement for providing and for synchronizing said levelling operation with said pivoting operation, and including one of the following: (a) wherein at least one of said first wing and said second wing is movably mounted to the respective said first shaft or said second shaft with respect to one degree of freedom in translation parallel to the respective said first pivot axis or said second pivot axis; (b) wherein said first wing is fixedly mounted to said first shaft, and wherein said second wing is movably mounted to said second shaft with respect to one degree of freedom in translation parallel to said second pivot axis; (c) wherein said first wing is fixedly mounted to said first shaft, and wherein said second wing is movably mounted to said second shaft with respect to one degree of freedom in translation parallel to said second pivot axis, and, wherein said second shaft is in the form of a male spline shaft, and wherein the said second wing is movably mounted to said second shaft via a female spline coupling complementary to said male spline shaft; and, wherein said leveling arrangement comprises a cam arrangement operatively coupled to the second wing, and, wherein said cam arrangement comprises a cam follower and a cam rail, and, wherein said cam rail comprises at least one helical cam rail, fixedly mounted with respect to said load-bearing bracket and having a helical axis co-axial with said second pivot axis, and wherein said cam follower fixedly mounted to the second wing, such that movement of the cam follower along said cam rail causes the second wing to translate along said degree of freedom with respect to said second pivot shaft in said levelling operation.

9. The wing system according to claim 5, including one of the following:
wherein said deployment mechanism comprises a translation arrangement configured for synchronizing said translation operation with said pivoting operation;
wherein said deployment mechanism comprises a translation arrangement configured for synchronizing said translation operation with said pivoting operation, and, wherein said translation arrangement comprises a rail system configured to be fixedly mounted to the air vehicle, and wherein said bracket is moveably mounted to said rail system to enable said bracket to be translated along said stroke direction through said stroke length;
wherein said deployment mechanism comprises a translation arrangement configured for synchronizing said translation operation with said pivoting operation, and, wherein said translation arrangement comprises a rail system configured to be fixedly mounted to the air vehicle, and wherein said bracket is moveably mounted to said rail system to enable said bracket to be translated along said stroke direction through said stroke length, and, wherein said translation arrangement comprises a rack and pinion arrangement, comprising a pinion gear rotatably mounted to said bracket, and a rack gear mounted in fixed spatial relationship with respect to said rail system, wherein said pinion gear is coupled with said meshed gear arrangement, such that actuation of said meshed gear system causes rotation of said pinion gear, which in turn turns with respect to the rack gear causing translation of the load-bearing bracket along said stroke direction; or
wherein said deployment mechanism comprises a translation arrangement configured for synchronizing said translation operation with said pivoting operation, and, wherein said translation arrangement comprises a rail system configured to be fixedly mounted to the air vehicle, and wherein said bracket is moveably mounted to said rail system to enable said bracket to be translated along said stroke direction through said stroke length, and, wherein said translation arrangement comprises a rack and pinion arrangement, comprising a pinion gear rotatably mounted to said bracket, and a rack gear mounted in fixed spatial relationship with respect to said rail system, wherein said pinion gear is coupled with said meshed gear arrangement, such that actuation of said meshed gear system causes rotation of said pinion gear, which in turn turns with respect to the rack gear causing translation of the load-bearing bracket along said stroke direction, and, wherein said translation arrangement comprises at least two said pinion gears of different diameter one from the other, each said pinion gear being alternately rotatably mounted to said bracket to correspondingly provide a different said stroke length.

10. A deployment mechanism for a wing system for an air vehicle, the wing system comprising a set of wings including a first wing and a second wing, the deployment mechanism being configured for enabling transitioning the wing system between a stowed configuration and a deployed configuration, the deployment mechanism comprising:
   a first shaft configured for enabling the first wing to be mounted thereto, the first shaft having a first pivot axis, a second shaft configured for enabling the second wing to be mounted thereto, the second shaft having a second pivot axis, wherein said first pivot axis and said second pivot axis are non-coaxial, and wherein in the stowed configuration the first shaft and the second shaft are configured for mounting the first wing and the second wing, respectively, in overlying arrangement;
   a pivoting arrangement configured for providing a pivoting operation comprising pivoting of said first shaft about said first pivot axis in a first rotational direction and pivoting of said second shaft about said second pivot axis in a second rotational direction, opposite to said first rotational direction;
   a leveling arrangement for providing a levelling operation configured for transitioning the first wing and the second wing with respect to one another from a non-leveled relationship in the stowed configuration, to a leveled relationship in the deployed configurations; and
   a translation arrangement configured for providing a translation operation configured for selectively translating, in operation of the deployment system, the first wing and the second wing along a stroke direction through a stroke length, between a first axial position corresponding to the stowed configuration, and a second axial position corresponding to the deployed configuration; and
   wherein said levelling operation comprises translating at least one of said first wing and said second wing along the first pivot axis or said second pivot axis, respectively, between a respective first position, corresponding to the stowed configuration, to a second position, corresponding to the deployed configuration.

11. The deployment mechanism according to claim 10, wherein the deployment mechanism is configured for synchronizing said translation operation with said pivoting operation via a first synchronizing operation.

12. The deployment mechanism according to claim 10, wherein said leveling arrangement is configured for synchronizing a said levelling operation with said pivoting operation, and wherein the deployment mechanism is configured for synchronizing said levelling operation with said pivoting operation via a second synchronizing operation.

13. The deployment mechanism according to claim 10, wherein said first pivot axis is parallel with respect to said second pivot axis, and wherein said first pivot axis is laterally spaced with respect to said second pivot axis by a lateral spacing.

14. The deployment mechanism according to claim 13, wherein said deployment mechanism comprises an actuator configured for selectively driving operation of the deployment mechanism, and wherein optionally said deployment mechanism is configured for self-locking.

15. A wing system, comprising the deployment mechanism as defined in claim 10.

16. A wing system for an air vehicle, the air vehicle having a fuselage including a fuselage section and a fuselage longitudinal axis, the wing system comprising:
   a set of wings, including a first said wing having a first wing longitudinal axis, and a second said wing having a second wing longitudinal axis, and configured for transitioning between a stowed configuration and a deployed configuration;
   wherein in the stowed configuration, the first wing and the second wing are generally aligned with the fuselage longitudinal axis; and
   wherein in the deployed configuration, the first wing is oriented with respect to the second wing such that the wings tips are more spaced from one another than in the stowed configuration;
   a deployment mechanism including a pivoting arrangement configured for selectively providing a wing pivoting operation, comprising:
   pivoting said first wing about a first pivot axis between the stowed configuration and the deployed configuration;
   pivoting said second wing about a second pivot axis between the stowed configuration and the deployed configuration;
   wherein said first pivot axis and said second pivot axis are non-coaxial;
   wherein the deployment mechanism comprises a translation arrangement configured for selectively providing a displacement operation concurrent with the wing pivoting operation, said displacement operation comprising translating the first wing and the second wing through a stroke length concurrent with said pivoting, between a first axial position corresponding to the stowed configuration, and a second axial position corresponding to the deployed configuration;
   wherein said deployment mechanism is configured for enabling changing a magnitude of said stroke length while unaffecting said wing pivoting operation; and
   wherein the wing pivoting arrangement and the translation arrangement are coupled to be actuatable via a common actuator.

17. An air vehicle comprising at least one wing system as defined in claim 16.

18. A deployment mechanism for a wing system for an air vehicle, the wing system comprising a set of wings including a first wing and a second wing, the deployment mechanism being configured for enabling transitioning the wing system between a stowed configuration and a deployed configuration, the deployment mechanism comprising:
   a pivoting arrangement configured for selectively providing a wing pivoting operation, comprising:
   pivoting said first wing about a first pivot axis between the stowed configuration and the deployed configuration;
   pivoting said second wing about a second pivot axis between the stowed configuration and the deployed configuration;
   wherein said first pivot axis and said second pivot axis are non-coaxial;
   a translation arrangement configured for selectively providing a displacement operation concurrent with the wing pivoting operation, said displacement operation comprising translating the first wing and the second wing through a stroke length concurrent with said pivoting, between a first axial position corresponding to the stowed configuration, and a second axial position corresponding to the deployed configuration;

wherein said deployment mechanism is configured for enabling changing a magnitude of said stroke length while unaffecting said wing pivoting operation; and wherein the wing pivoting arrangement and the translation arrangement are coupled to be actuatable via a common actuator.

19. A method of operating an air vehicle, comprising:
providing an air vehicle as defined in claim 17;
providing a said magnitude of said stroke length while unaffecting said wing pivoting operation.

20. An air vehicle comprising at least one wing system as defined in claim 1.

21. A method of operating a wing system, the method comprising:
providing the wing system as defined in claim 1; and
selectively operating the respective wing system to transition the wing system from the stowed configuration to the deployed configuration.

22. A method of operating an air vehicle, the method comprising:
(a) providing an air vehicle comprising a wing system, the wing system as defined in claim 1, the air vehicle being encapsulated in a fairing with the wing system in the stowed configuration;
(b) launching the encapsulated air vehicle;
(c) separating the air vehicle from the fairing; and
(d) selectively operating the respective wing system to transition the wing system from the stowed configuration to the deployed configuration.

23. The method according to claim 22, wherein step (b) comprises any one of:
launching the encapsulated air vehicle via a launch barrel;
launching the encapsulated air vehicle using a booster rocket; or
launching the encapsulated air vehicle from a carrier aircraft.

24. A method of operating a wing system, comprising:
providing a wing system as defined in claim 16;
selectively operating the wing system to transition the wing system from the stowed configuration to the deployed configuration.

25. A method of operating an air vehicle, the method comprising:
(a) providing an air vehicle comprising a wing system, the wing system as defined in claim 16, the air vehicle being encapsulated in a fairing with the wing system in the stowed configuration;
(b) launching the encapsulated air vehicle;
(c) separating the air vehicle from the fairing; and
(d) selectively operating the respective wing system to transition the wing system from the stowed configuration to the deployed configuration.

* * * * *